United States Patent
Kimura et al.

(10) Patent No.: US 10,452,221 B2
(45) Date of Patent: Oct. 22, 2019

(54) LIQUID CRYSTAL DISPLAY DEVICE

(71) Applicant: TOPPAN PRINTING CO., LTD., Taito-ku (JP)

(72) Inventors: Yukihiro Kimura, Taito-ku (JP); Kenzo Fukuyoshi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 39 days.

(21) Appl. No.: 15/810,914

(22) Filed: Nov. 13, 2017

(65) Prior Publication Data

US 2018/0067592 A1    Mar. 8, 2018

Related U.S. Application Data

(63) Continuation of application No. PCT/JP2015/063761, filed on May 13, 2015.

(51) Int. Cl.
*G06F 3/047* (2006.01)
*G02F 1/1343* (2006.01)
(Continued)

(52) U.S. Cl.
CPC ............ *G06F 3/047* (2013.01); *G02F 1/1343* (2013.01); *G02F 1/1368* (2013.01); *G06F 3/044* (2013.01); *G06F 3/0412* (2013.01); *G06F 3/0416* (2013.01)

(58) Field of Classification Search
CPC ...... G06F 3/047; G06F 3/0412; G06F 3/0416; G06F 3/044; G02F 1/1343; G02F 1/1368
See application file for complete search history.

(56) References Cited

U.S. PATENT DOCUMENTS

| 5,550,659 A | 8/1996 | Fujieda et al. |
| 8,243,027 B2 | 8/2012 | Hotelling et al. |
| (Continued) | | |

FOREIGN PATENT DOCUMENTS

| JP | 4-22486 A | 1/1992 |
| JP | 7-36017 A | 2/1995 |
| (Continued) | | |

OTHER PUBLICATIONS

International Search Report dated Aug. 4, 2015 in PCT/JP2015/063761, filed May 13, 2015.
(Continued)

*Primary Examiner* — Mark Edwards
(74) *Attorney, Agent, or Firm* — Oblon, McClelland, Maier & Neustadt, L.L.P.

(57) ABSTRACT

A liquid crystal display device includes a display device substrate including a first touch sensing wiring, an array substrate including a second touch sensing wiring orthogonally intersecting the first touch sensing wiring, a liquid crystal layer disposed between the display device substrate and the array substrate, a controller that supplies a positive first image signal to the first source wiring, supplies a negative second image to the second source wiring, applies a liquid crystal display voltage between the pixel electrode and the common electrode being synchronized to supply of the first image signal and the second image signal, thereby driving the liquid crystal layer, performing an image display, and applying a voltage to the second touch sensing wiring after performing the image display.

27 Claims, 34 Drawing Sheets

(51) Int. Cl.
*G02F 1/1368* (2006.01)
*G06F 3/041* (2006.01)
*G06F 3/044* (2006.01)

(56) References Cited

U.S. PATENT DOCUMENTS

| | | | |
|---|---|---|---|
| 8,259,078 | B2 | 9/2012 | Hotelling et al. |
| 8,432,371 | B2 | 4/2013 | Hotelling et al. |
| 8,451,244 | B2 | 5/2013 | Hotelling et al. |
| 8,552,989 | B2 | 10/2013 | Hotelling et al. |
| 8,654,083 | B2 | 2/2014 | Hotelling et al. |
| 9,244,561 | B2 | 1/2016 | Hotelling et al. |
| 9,268,429 | B2 | 2/2016 | Hotelling et al. |
| 9,304,639 | B2 | 4/2016 | Ishizaki et al. |
| 9,575,610 | B2 | 2/2017 | Hotelling et al. |
| 9,626,060 | B2 | 4/2017 | Ishizaki et al. |
| 2008/0024712 | A1* | 1/2008 | Kim ............... G02F 1/13338 349/144 |
| 2008/0167526 | A1 | 7/2008 | Crank et al. |
| 2010/0149116 | A1 | 6/2010 | Yang et al. |
| 2012/0050217 | A1 | 3/2012 | Noguchi et al. |
| 2014/0118639 | A1* | 5/2014 | Matsushima ....... G02F 1/13338 349/12 |
| 2014/0168541 | A1* | 6/2014 | Zhao ............... G02F 1/13338 349/12 |
| 2014/0320767 | A1* | 10/2014 | Xu ................... G06F 3/0412 349/12 |
| 2015/0331531 | A1* | 11/2015 | Aoyama ............. G06F 3/044 345/174 |
| 2016/0342236 | A1* | 11/2016 | Xu ..................... G06F 3/044 |
| 2017/0147119 | A1 | 5/2017 | Hotelling et al. |
| 2017/0177133 | A1 | 6/2017 | Ishizaki et al. |

FOREIGN PATENT DOCUMENTS

| | | |
|---|---|---|
| JP | 2000-20033 A | 1/2000 |
| JP | 4584342 B | 11/2010 |
| JP | 5472373 B | 4/2014 |
| JP | 2014-109904 A | 6/2014 |
| JP | 5517611 B | 6/2014 |
| KR | 10-2012-0010071 A | 2/2012 |
| KR | 10-2012-0019371 A | 3/2012 |
| TW | I340953 | 8/2007 |

OTHER PUBLICATIONS

Office Action dated Mar. 7, 2017 in Taiwan application No. 104117098 (with English translation).
Korean Office Action dated Dec. 20, 2018 in Patent Application No. 10-2017-7034974 (with English translation), citing documents AO and AP therein, 13 pages.

* cited by examiner

LIQUID CRYSTAL DISPLAY DEVICE

CROSS-REFERENCE TO RELATED APPLICATIONS

The present application is a continuation of International Application No. PCT/JP2015/063761, filed May 13, 2015, the entire contents of which are incorporated herein by reference.

BACKGROUND OF THE INVENTION

Field of the Invention

The present invention relates to liquid crystal display devices capable of performing stable touch sensing operations and having high sensitivity in touch sensing. The present invention relates to liquid crystal display devices capable of operating with fast response.

Discussion of the Background

Liquid crystal display devices have been used for large display devices such as televisions, tablet devices, smartphones and the like. The liquid crystal display device may be configured such that a liquid crystal layer is disposed between two transparent substrates made of glass or the like. Major liquid crystal driving methods for such liquid crystal devices are roughly classified into a VA (vertical alignment) mode which is known as a vertical electric field type, an IPS (in-plane switching) mode which is known as a horizontal electric field type, and a fringe field switching FFS (fringe field switching) mode.

In the VA mode, liquid crystal molecules are vertically aligned with respect to the substrate surface of the liquid crystal display device, and an electric field is applied to the liquid crystal molecules in a vertical direction along a thickness direction of the liquid crystal layer, thereby driving the liquid crystals. In the IPS mode or FFS mode, liquid crystal molecules are horizontally aligned with respect to the substrate surface of the liquid crystal display device, and an electric field is applied to the liquid crystal molecules in a direction substantially parallel to the substrate surface, thereby driving the liquid crystals. Liquid crystal display devices using vertical alignment such as VA mode are excellent in producing black displays. The IPS mode or the FFS mode are liquid crystal driving methods used for liquid crystal display devices having wide viewing angle. The liquid crystal displays device using the FFS mode have great advantages in that the liquid crystal display can be driven faster by using a fringe electric field. For a method of driving liquid crystals, to reduce sticking of the liquid crystal display, polarity inversion driving (AC inversion driving) is performed, where the polarity of the voltage applied to the liquid crystal display is inverted between positive or negative after a predetermined image display period has elapsed. As methods of the polarity inversion driving, dot inversion driving, horizontal line inversion driving, column inversion driving, and frame inversion driving are known. Dot inversion driving inverts polarities of a plurality of pixels individually. The horizontal line inversion driving inverts the polarities of the pixels in row by row where a plurality of pixels are arranged along the horizontal direction of the screen. Column inversion driving inverts the polarities of the pixels column by column where a plurality of pixels are arranged. Frame inversion driving inverts the polarity of the pixels screen by screen, or inverts the polarity of the pixels block by block by dividing the screen into a plurality of blocks. These liquid crystal driving techniques are disclosed or mentioned in, for example, PTLs 1 to 5 and 7.

As such a liquid crystal display device, a liquid crystal display device having a touch sensing function provided with a means for detecting electrostatic capacitance is often used recently. As a touch sensing method, a method of detecting a change in electrostatic capacitance is mainly utilized. In this method, a change in electrostatic capacitance produced when a pointer such as a finger or a pen contacts or approaches a display screen is detected by, for example, touch sensing wirings (touch electrodes) arranged in the X-direction or the Y-direction. Structures of a display device having the touch sensing function include an out-cell type structure where a touch panel having a touch sensing function is attached to the surface of the display device, and an in-cell type structure where the display device has a touch sensing function in itself. In recent years, most display devices use in-cell type structures rather than out-cell type structures.

PTLs 2 to 6 disclose touch sensing techniques using in-cell structure. However, in the in-cell structure, a problem arises in the touch sensing technique which is not mentioned in the above-mentioned patent literature. In other words, there is a problem which is unlikely to arise in an external touch panel structure, that is, a new technical problem that noise is induced from the source wiring electrically coupled to the active elements provided in the liquid crystal cells.

PTL 1 discloses a technique of liquid crystal driving in which polarities of pixels are inverted row by row where a plurality of pixels are arranged in a vertical direction of the screen. PTL 1 does not include a touch sensing technique.

PTLs 2 and 3 include a description related to a dot inversion driving, and disclose a touch sensing technique. According to PTL 3, the drive electrode and the detection electrode serving as the touch sensing function are constituted substantially by metal wiring. The disclosure of PTL 3 is similar to the feature of claim 2 recited in PTL 6.

PTL 4 discloses a technique for an in-plane switching (IPS) liquid crystal display device, in which the touch sensing drive electrodes form an electrode pair used for detecting the touch sensing signal.

The PTL 5 discloses a configuration provided with a plurality of touch drive electrodes extending in the first direction and a plurality of touch detection electrode extending in the second direction which are made of transparent material, and either the touch drive electrodes or the touch detection electrodes serve as counter electrodes of the liquid crystal display device.

The techniques disclosed in PTLs 1 to 6 fail to suggest means for reducing noise coming from the source wiring to which image signals are applied to perform respective image displays, and do not provide highly sensitive touch sensing techniques. According to the techniques disclosed in PTLs 1 to 6, it is not sufficient to prevent production of noise due to liquid crystal driving.

Moreover, these items of patent literatures do not disclose means for rapidly resuming a display state of the liquid crystal layer with black display (black state) using the touch sensing wiring, after the liquid crystal drive voltage is applied to the liquid crystal.

The response time of the liquid crystal is defined as sum of a rise time (hereinafter referred to as $\tau_{ON}$) when the liquid crystal drive voltage is applied to the liquid crystal molecules (liquid crystal layer), and a fall time (hereinafter referred to as $\tau_{OFF}$) when the liquid crystal drive voltage is not applied to the liquid crystal molecules (liquid crystal drive voltage is off). As a liquid crystal drive method or a structure of the liquid crystal device for reducing the rise time $\tau_{ON}$, various methods or structures can be employed, including increasing liquid crystal drive voltage, using an overdriving method, making the thickness of the liquid crystal layer small, and using an electrode structure enabling fast operation of the liquid crystal molecules. However, generally, the fall time $\tau_{OFF}$ is defined as a time to return to the initial alignment in a state where no electric field is applied. Hence, the fall time $\tau_{OFF}$ varies depending on material properties of the liquid crystal, for example, electrical characteristics and viscosity of the liquid crystal. Accordingly, to reduce response time of the liquid crystal, reduction of the fall time $\tau_{OFF}$ becomes a major subject. PTLs 2 to 6 do not disclose a technique for reducing the fall time $\tau_{OFF}$ PTL 1: JP-A-H4-22486
PTL 2: JP-B-5472373
PTL 3: JP-A-2014-109904
PTL 4: JP-B-4584342
PTL 5: JP-B-5517611
PTL 6: JP-A-H7-36017
PTL 7: JP-A-2000-20033

SUMMARY OF THE INVENTION

According to an aspect of the present invention, a liquid crystal display device includes a display device substrate including a first touch sensing wiring, an array substrate including an insulation layer structure including a first insulation layer and a second insulation layer formed on one another, a pixel electrode positioned in each of pixel openings formed in the insulation layer structure and having a polygonal shape, a common electrode formed between the first and second insulation layers, a wiring structure including a first gate wiring, a second gate wiring, a first source wiring and a second gate wiring such that the first gate and source wirings orthogonally intersect with one another and the second gate and source wirings orthogonally intersect with one another in a plan view, and a second touch sensing wiring orthogonally intersecting the first touch sensing wiring in the plan view, a liquid crystal layer formed between the display device substrate and the array substrate; and a controller structured to supply a positive first image signal to the first source wiring, supply a negative second image signal to the second source wiring, apply a liquid crystal drive voltage between the pixel electrode and the common electrode being synchronized to the first image signal and the second image signal supplied to the first source wiring and the second source wiring respectively, thereby driving the liquid crystal layer, performing an image display, and applying a voltage to the second touch sensing wiring after performing the image display.

According to another aspect of the present invention, a liquid crystal display device includes a display device substrate including a first touch sensing wiring, an array substrate including an insulation layer structure including a first insulation layer and a second insulation layer formed on one another, a pixel electrode positioned in each of pixel openings formed in the insulation layer structure and having a polygonal shape, a common electrode formed between the first and second insulation layers, a wiring structure including a first gate wiring, a second gate wiring, a first source wiring and a second gate wiring such that the first gate and source wirings orthogonally intersect with one another and the second gate and source wirings orthogonally intersect with one another in a plan view, and a second touch sensing wiring orthogonally intersecting the first touch sensing wiring in a plan view, a liquid crystal layer formed between the display device substrate and the array substrate, and a controller structured to supply a positive first image signal to the first source wiring, supply a negative second image signal to the second source wiring, apply a liquid crystal drive voltage between the pixel electrode and the common electrode being synchronized to the first image signal and the second image signal supplied to the first source wiring and the second source wiring respectively, thereby driving the liquid crystal layer, and performing a touch sensing driving by the first touch sensing wiring and the second touch sensing wiring, during at least one of a stable period of an image display and a stable period of a black display after displaying an image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
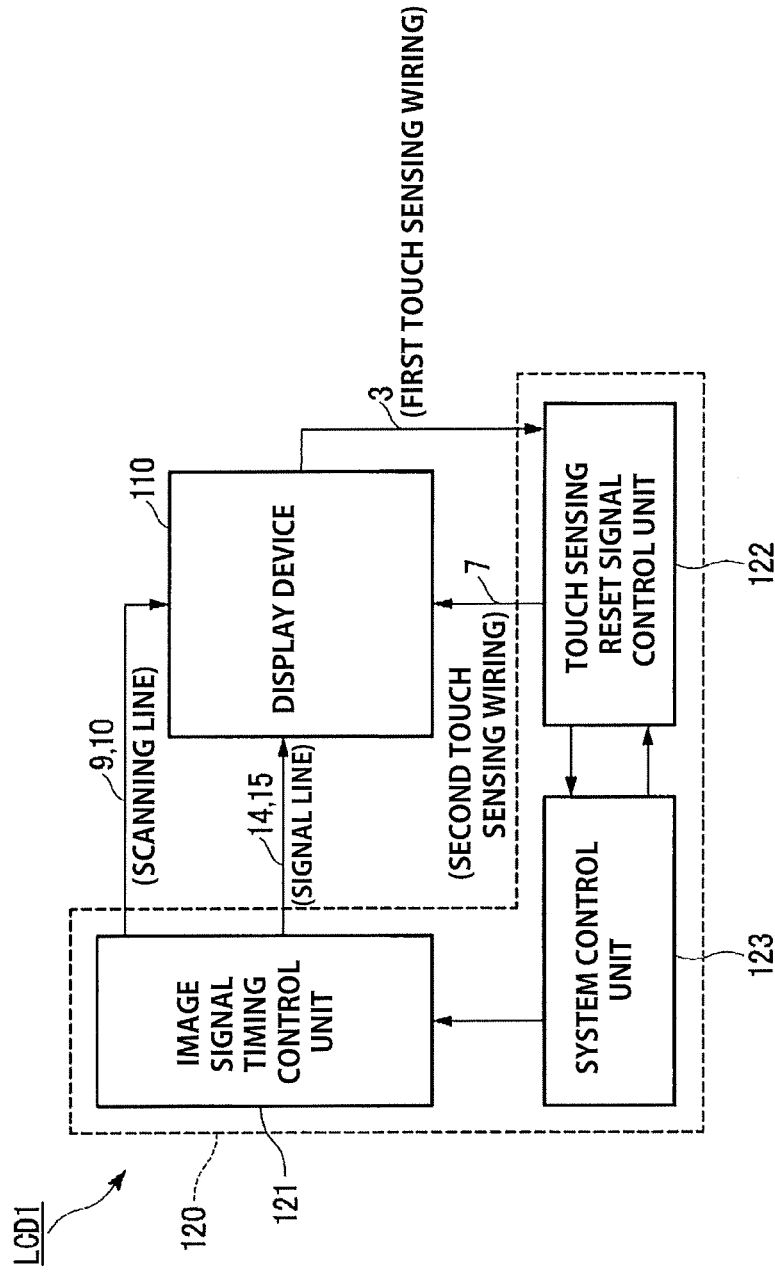
FIG. 1 is a block diagram showing a liquid crystal display device according to a first embodiment of the present invention.

The embodiments will now be described with reference to the accompanying drawings, wherein like reference numerals designate corresponding or identical elements throughout the various drawings.

With reference to the drawings, embodiments of the present invention will be described. In the following description, the same reference signs are given to the same or substantially the same functions and elements, and the description is omitted or simplified, or described as needed. In the drawings, dimensions and ratios of the elements are changed from the actual dimensions and ratios, in order to make the size of the elements to be recognizable on the drawings.

In the following embodiments, only characteristic portions will be described, and description will be omitted for other portions having no difference from the elements used in an ordinal display device. In the embodiments, examples of liquid crystal display devices or display device substrates will be described. However, the embodiments can be applied to other display devices such as organic EL display devices, other than liquid crystal display devices.

First Embodiment (Configuration of Liquid Crystal Display Device LCD1)

Hereinafter, with reference to FIGS. 1 to 15, a first embodiment of the liquid crystal display device of the present invention will be described.

FIG. 1 is a block diagram showing a liquid crystal display device according to the first embodiment of the present invention. As shown in FIG. 1, a liquid crystal display device LCD1 is provided with a display device 110 and a control unit 120 that controls the display device 110 and a touch sensing function. The control unit 120 has a publicly known configuration, including an image signal timing control unit 121 (first control unit), a touch sensing reset signal control unit 122 (second control unit) and a system control unit 123 (third control unit).

The image signal timing control unit 121 sets the common electrode 20 (described later) provided on the array substrate 200 to a constant potential, and transmits signals to the gate wirings 9 and 10 (scanning line which will be described later) and the source lines 14 and 15 (described later) which are provided on the array substrate 200. The image signal timing control unit 121 applies liquid crystal drive voltage used for a display between the common electrode 20 and the pixel electrode 17 (described later) to produce fringe electric field on the array substrate 200, whereby liquid crystal molecules are rotated along the fringe electric field and the liquid crystal layer 300 is driven. Thus, an image is displayed on the array substrate 200. For example, image signal having alternating current (AC) rectangular waves is applied to each of a plurality of pixel electrodes 17 via the source wiring (signal line) with a constant potential of the common electrode 20. The rectangular waves may be positive or negative direct current (DC) rectangular waves. The image signal timing control unit 121 transmits a positive first image signal and a negative second image signal to the source wiring, which will be described later.

The touch sensing reset signal control unit 122 applies the touch sensing drive voltage to either one of the first touch sensing wiring 3 (described later) and the second touch sensing wiring 7 (described later), and detects the touch sensing signal through the other of the wiring in the first touch sensing wiring 3 and the second touch sensing wiring 7. Thus, electrostatic capacitance (fringe capacitance) generated between the first touch sensing wiring 3 and the second touch sensing wiring 7 is detected, thereby performing the touch sensing operation. Further, the touch sensing reset signal control unit 122 can supply a reset voltage (reset signal which will be described later) to the second touch sensing wiring 7.

The first touch sensing wiring 3 used for such a touch sensing operation includes the touch drive wiring to which the touch sensing drive voltage is applied, and the touch detection wiring that detects touch sensing signal. When the second touch sensing wiring 7 serves as a touch detection wiring, the first touch sensing wiring 3 serves as a touch drive wiring. That is, in the touch sensing function, functions may be exchanged between the first touch sensing wiring 3 and the second touch sensing wiring 7.

The system control unit 123 controls the image signal timing control unit 121 and the touch sensing reset signal control unit 122, and is capable of driving liquid crystals and detecting a change in electrostatic capacitance in an alternate manner, that is, in a time-sharing manner. Further, synchronizing with the liquid crystal drive of the image signal timing control unit 121, the system control unit 123 controls supply of signal to the first touch sensing wiring 3 or the second touch sensing wiring 7 and controls supply of reset signal to the second touch sensing wiring 7, for the touch sensing reset signal control unit 122.

The touch sensing wiring 7 according to the embodiments of the present invention has a function of producing an electric field in the liquid crystal layer 300 (electric field extending in a direction traversing the liquid crystal layer 300 in plan view) in response to the reset voltage applied to the second touch sensing wiring 7, and a function, as a touch sensing wiring, of performing a touch sensing such as touch detection or touch driving. These two functions of the touch sensing wiring 7 are performed in a time-sharing manner, and the touch sensing wiring 7 can accomplish various roles (two functions) over time (on the time axis).

The reset voltage applied to the second touch sensing wiring 7 includes positive and negative voltages, in which the reset voltage may be inverted to have positive or negative voltage, every predetermined period of image display controlled by the image signal timing control unit 121. Thus, the direction of the electric field can be changed such that the electric field is inverted so as to extend in a direction traversing the liquid crystal display layer 300 in plan view. It should be noted that positive or negative polarity of the reset voltage refers to either a positive potential or a negative potential with respect to the ground potential (0 volts). Not being limited to this positive/negative definition, voltages may be applied to two second touch sensing wirings such that respective voltages of the two second touch sensing wirings are switched between positive and negative, which allows at least two different second touch sensing wirings (conductive wiring) in plan view to have opposite potentials. Also, an offset voltage may be applied to positive or negative reset voltage and the reset voltage may be slightly shifted to the lower voltage side or the higher voltage side.

The first touch sensing wiring and the second touch sensing wiring according to the present embodiment of the present invention can be formed of a metal layer having good conductivity. Hence, resistance value of the touch sensing wiring and the second touch sensing wiring can be lowered, whereby touch sensitivity can be improved.

As will be described later, the control unit 120 having the above-described configuration applies liquid crystal drive voltage between the pixel electrodes 17 and the common electrode 20, synchronized to supply of the first image signal and the second image signal, thereby driving the liquid crystal layer 300.

Further, image display is controlled, and voltage is applied to the second touch sensing wiring 7 after performing the image display. Further, the control unit 120 causes the first touch sensing wiring 3 and the second touch sensing wiring 7 to perform touch sensing driving, during at least one of a stable period of the image display and a black display stable period after performing the image display.

(Liquid Crystal Display Device LCD 1)

The liquid crystal display device according to the present embodiment can be provided with a display device substrate according to an embodiment which will be described later. Moreover, "plan view" described in the following refers to a plane as viewed by a viewer views, from a direction of observing a display surface of the liquid crystal display device (plane of the display device substrate). The shape of the display unit of the liquid crystal display device according to the embodiments of the present invention, or the shape of the pixel opening that defines the pixel, the number of pixels constituting the liquid crystal display device are not limited. In the embodiments detailed in the following, the short side direction of the pixel opening in plan view is defined as an X-direction, and the long side direction in plan view is defined as a Y-direction, and further the thickness direction of the transparent substrate is defined as a Z-direction, and the liquid crystal display device will be described based on these definitions. In the following embodiments, the liquid crystal display device may be configured by switching the X-direction and the Y-direction defined as above.

Figure 2:
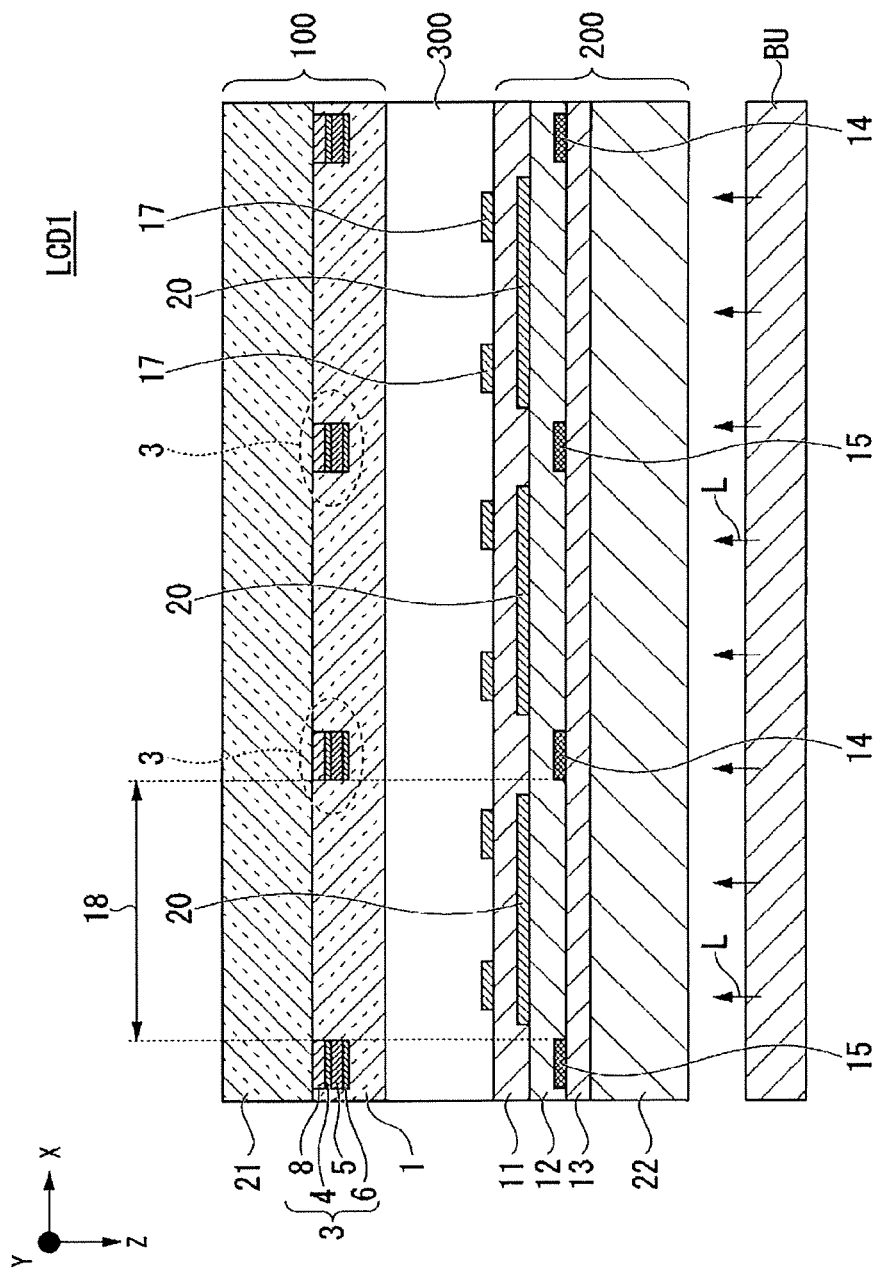
FIG. 2 is a cross-sectional view sectioned across the A-A' line shown in FIG. 3, showing a part of the liquid crystal display device according to the first embodiment of the present invention.

FIG. 2 is a cross-sectional view showing a part of the liquid crystal display device LCD1 according to the present embodiment. FIG. 2 is a cross-sectional view sectioned across the short side direction of the pixel openings, that is, sectioned across the A-A' line of FIG. 3.

The liquid crystal display device LCD1 is provided with a display device substrate 100 (counter substrate), an array substrate 200 attached to the display device substrate 100 face-to-face, and a liquid crystal layer 300 disposed between the display device substrate 100 and the array substrate 200.

A backlight unit BU that supplies light L to the inside of the liquid crystal display device LCD1 is disposed on the back surface of the array substrate 200 (surface of the transparent substrate of the array substrate 200 on a side opposite to the surface on which the liquid crystal layer 300 is provided). The backlight unit may be provided on a side surface of the liquid crystal display device LCD1. In this case, for example, a reflector that reflects light emitted from the backlight unit BU into the liquid crystal display device LCD1, a light-guide plate or a diffusion plate is provided on the back surface of the transparent substrate 22 of the array substrate 200.

The display device substrate 100 is provided with a transparent substrate 21 (first transparent substrate), a first touch sensing wiring 3 disposed on the transparent substrate 21, and a transparent resin layer 1 disposed on the transparent substrate 21 so as to cover the first touch sensing wiring

3. The first touch sensing wiring 3 (touch detection wiring, touch drive wiring) is formed of a conduction layer including at least a black layer 8 and a metal layer 5. Specifically, the first touch sensing wiring 3 has a two-layer structure composed of the black layer 8 and the metal layer 5. The metal layer 5 is formed on the black layer 8. Moreover, the conductive layer has a three-layer structure including a first conductive metal oxide layer 6, the metal layer 5 and a second conductive metal oxide layer 4. As the conductive metal oxide, a composite oxide may be used in which small amount of metal oxide such as of titanium, zirconium, magnesium, aluminum, or germanium, is added to a metal oxide of which the base material is indium oxide or tin oxide. Examples of the metal layer that can be used include a copper-containing layer which is a cooper layer or a copper alloy layer, and an aluminum alloy layer containing aluminum (aluminum containing layer). The transparent resin layer 1 is provided on the first touch sensing wiring 3. In other words, the first touch sensing wiring 3 is formed in a position close to the liquid crystal layer 300 of the display device substrate 100.

Next, advantages of the metal layer having the copper-containing layer will be described. When the metal layer includes a copper-containing layer (copper layer or copper alloy layer), the conductive metal oxide layers disposed to sandwich the metal layer are preferably composite oxide layers containing zinc oxide, indium oxide and tin oxide. The reason is as follows. In the above-described composite oxide, an etching rate in the wet etching can readily be adjusted by adjusting a composition ratio of the zinc oxide and tin oxide that constitute the composite oxide. Thus, in the case of the second touch sensing wiring 7 and the first touch sensing wiring 3 provided with a three-layer configuration where the copper-containing layer is sandwiched by conductive metal oxide layers constituted of the composite oxide, even though a plurality of layers is used, the patterns of the second touch sensing wiring 7 and the first touch sensing wiring 3 can readily be formed. Further, since the copper-containing layer has low adhesion to a resin which constitutes a color filter and to a substrate such as of glass, the copper-containing layer has not yet been in the practical level from the adhesion point of view. The composite oxide layer made of zinc oxide, indium oxide and tin oxide has sufficient adhesion to a color filter and glass, and has sufficient adhesion to the copper-containing layer as well. Thus, since the composite oxide layer sufficiently satisfies the practical level from the viewpoint of adhesion, a second touch sensing wiring 7 and a first touch sensing wiring 3 which accomplish high adhesion can be provided.

In addition, copper oxide is formed over time on the surface of the copper-containing layer. Hence, the copper oxide has properties in which ohmic contact in electrical connection is unlikely to be accomplished. On the other hand, a composite oxide layer made of zinc oxide, indium oxide and tin oxide can provide ohmic contact so that the composite oxide layer is excellent in stable mounting properties. Thus, in the case where the laminate structure having a copper-containing layer sandwiched between composite oxide layers is used for the second touch sensing wiring 7 and the first touch sensing wiring 3, excellent wiring structure can be achieved in view of ohmic contact.

A metal layer applicable to the second touch sensing wiring 7 and the first touch sensing wiring 3 will be described.

Materials applicable to the metal layer include copper, silver, gold, titanium, molybdenum, aluminum and alloys containing these metals. Since nickel is ferromagnetic, deposition rate decreases; however, vacuum deposition such as sputtering can be used for forming the metal layer. Although chrome has disadvantages such as of causing environmental pollution or having a higher electrical resistance; however, chrome can be used as a metal layer according to the present embodiment.

As a metal material for forming the metal layer, an alloy composed of copper or aluminum to which metal elements are added is preferably used to obtain adhesion to a glass substrate or a resin. As the metal elements one or more are selected from magnesium, calcium, titanium, molybdenum, indium, tin, zinc, neodymium, nickel and aluminum.

The amount of metal elements added to a material for forming the metal layer is preferably 3 at % or less, since the resistance of copper alloy or aluminum is not significantly lowered. As a process for forming the copper alloy, for example, vacuum deposition using sputtering can be performed to form a film of the copper alloy. In the case of forming a copper alloy thin film or an aluminum alloy thin film, with the film thickness being set to 100 nm or larger or 150 nm or more, almost no visible light is transmitted therethrough. Therefore, the film thickness of the metal layer according to the present embodiment may be, for example, 100 nm to 300 nm, inclusive, thereby obtaining sufficient light shielding properties.

Also, metal oxide imparted with absorbing properties is formed on the first touch sensing wiring 3, whereby light reflection on the metal layer used for the first touch sensing wiring 3 can be suppressed. Configurations of the metal oxide layer and the metal layer which are applicable for the embodiments of the present invention include the following. For example, a layer configuration may be obtained by forming, for example, a metal layer on a copper alloy layer, in a state where oxygen is insufficiently contained in, for example, ITO (indium tin oxide) or IZTO containing oxide indium as a center base material, or IZO (registered trade mark). Alternatively, a layer configuration obtained by laminating a metal layer on an aluminum alloy or a copper alloy with molybdenum oxide, tungsten oxide, mixed oxide of nickel oxide and copper oxide and titanium oxide or the like, can be employed. The layer configuration obtained by the metal oxide layer and the metal layer has an advantage that subsequent film-formation can be accomplished by a vacuum deposition apparatus such as a sputtering apparatus or the like.

Next, a black layer 8 that constitutes the first touch sensing wiring 3 will be described.

The black layer is composed of a colored resin in which black colorant is dispersed, for example. The oxide of copper or a copper alloy cannot obtain a sufficiently black appearance or low reflectivity. However, according to the present embodiment, the reflectivity of visible light on the boundary surface between the black layer and a substrate such as of glass is lowered to be 3% or less so that high visibility can be obtained.

As a black colorant, carbon, carbon nanotubes or mixture of plural organic pigments are applicable. For example, carbon is used at a ratio of 51 mass % relative to the entire amount of the colorant, that is, carbon is used as a major colorant. In order to adjust reflected color, a black colorant with blue or red organic pigments added thereto can be used. For example, by adjusting carbon density (lowering the carbon density) contained in the photosensitive black coating liquid which is a starting material, reproducibility of the black layer can be improved.

Even when a large-scale exposure apparatus which is a manufacturing apparatus of the display device is used, a black layer having a pattern of which the line width (thin line) is from 1 um to 6 um can be formed (patterned). The range of the carbon density according to the present embodiment is set to a range of from 4 to 50 mass % relative to the entire solid content including resin, curing agent and pigments. As an amount of carbon, the carbon density may exceed 50 mass %. However, when the carbon density exceeds 50 mass % relative to the entire solid content, coated film suitability tends to decrease. When the carbon density is set to 4 mass % or less, a sufficiently black appearance cannot be obtained so that reflective light produced in the underlying metal layer located under the black layer is visually recognized significantly so that the visibility may be lowered.

In the case where an exposure process is performed in photolithography as a post-process, positioning (alignment) is performed for the substrate to be exposed and the mask. At this point, the alignment may be prioritized so that the optical density of the black layer obtained through transmission measurement is 2 or less. Other than carbon, a mixture of a plurality of organic pigments may be used for adjustment of the color black to form the black layer. Taking account of the refractive index (approximately 1.5) of the base material made of glass or a transparent resin or the like, reflectivity of the black layer is set such that the reflectivity on the boundary surface between the black layer and the base materials is 3% or less. In this case, it is preferable to adjust the content and the type of the black colorant, the resin used for the colorant, and the film thickness. By optimizing these conditions, reflectivity on the boundary surface between the base material such as of glass having refractive index of approximately 1.5 can be 3% or less within wavelength region of visible light, and hence low reflectance can be achieved. Reflectivity of the black layer is preferably 3% or less, considering the necessity of preventing reflective light due to light emitted from the backlight unit BU from being re-reflected, and the improvement in the visibility to the viewer. It should be noted that the refractive indexes of acrylic resin used for the color filter and the liquid crystal material are approximately within a range from 1.5 to 1.7.

Since the first black layer 8 is provided between the transparent substrate 21 and the second conductive metal oxide layer 4, when the transparent substrate 21 is viewed from the viewer direction, light reflectivity at the boundary surface between the transparent substrate 21 and the first black layer 8 can be 3% or less. Thus, excellent configuration is accomplished with visibility in view.

The above-described first touch sensing wiring 3 has a laminated structure in which the first black layer 8, the second conductive metal oxide layer 4, the first metal layer 5 and the first conductive metal oxide layer 6 are laminated in this order on the transparent substrate 21. As a modification of the first touch sensing 3, a structure in which the second black layer is provided on the first conductive metal oxide layer 6 may be employed.

As the transparent resin used for the transparent resin layer 1, a resin having high heat resistance can be used, including an acrylic resin, polyimide resin, polyamide resin, epoxy resin, and the like. Application of such a transparent resin layer 1 to the embodiment of the present invention can provide a display device having high resolution and capable of responding high speed inputs, a display device substrate used for this display device, and a display device substrate provided with a color filter.

Next, referring back to FIG. 2, the liquid crystal display device LCD 1 will be further described.

The array substrate 200 is provided with the transparent substrate 22 (second transparent substrate), the gate wirings 9 and 10 (first gate wiring 10 and second gate wiring 9) and a common wiring 36 formed on the transparent substrate 22 (see FIG. 10), a third insulation layer 13 formed on the transparent substrate 22 so as to cover the gate wirings 9 and 10 and the common wiring 36, the source wirings 14 and 15 (first source wiring 14 and second source wiring 15) formed on the third insulation layer 13, a second insulation layer 12 formed on the third insulation layer 13 so as to cover the source wirings 14 and 15, the common electrode 20 formed on the second insulation layer, and a first insulation 11 formed on the second insulation layer 12 so as to cover the common electrode 20. Further, the array substrate 200 is provided with a plurality of pixel electrodes 17 formed on the first insulation layer 11.

That is, the first insulation layer 11 is provided under the pixel electrodes 17. The second insulation layer 12 is provided under the first insulation layer 11. The common electrode 20 is provided between the first insulation layer 11 and the second insulation layer 12.

In other words, the pixel electrodes 17 are provided on a surface of the array substrate 200 located at the position closest to the liquid crystal layer 300. The pixel electrodes 17 are respectively provided to a plurality of pixel openings 18, and connected to the active elements which will be described later.

Further, the second touch sensing wiring 7 is provided on a surface of the array substrate 200, that is, on the first insulation layer 11, located at the position closest to the liquid crystal layer 300. The second touch sensing wiring 7 orthogonally intersects the first touch sensing wiring 3 in plan view. In FIG. 2 which is a cross section along the A-A' line of FIG. 3, the second touch sensing wiring 7 is not shown. It should be noted that the second touch sensing wiring 7 is formed in a depth direction of the paper surface of FIG. 2 and in parallel to the gate wirings 9 and 10 (see FIG. 3).

Regions located between adjacent second touch sensing wirings 7 in the Y-direction (longitudinal direction of pixel) are defined as the pixel openings 18. The pixel openings 18 in the X-direction (short side direction of pixel) are located between adjacent first touch sensing wirings 3, or located between adjacent source wirings 14 and 15 shown in FIG. 4.

According to the present embodiment, the direction in which the second touch sensing wiring 7 and the first touch sensing wiring 3 extend is not limited. Either one of the first touch sensing wiring 3 and the second touch sensing wiring 7 may be provided to overlap the first gate wiring 10 and the second gate wiring 9. In this case, the other one of the first touch sensing wiring 3 and the second touch sensing wiring 7 is provided to overlap the first source wiring 14 and the second source wiring 15.

The first gate wiring 10 and the second gate wiring 9 are arranged parallel to each other so as to be located between two adjacent pixel openings 18 among the plurality of pixel openings 18.

Figure 4:
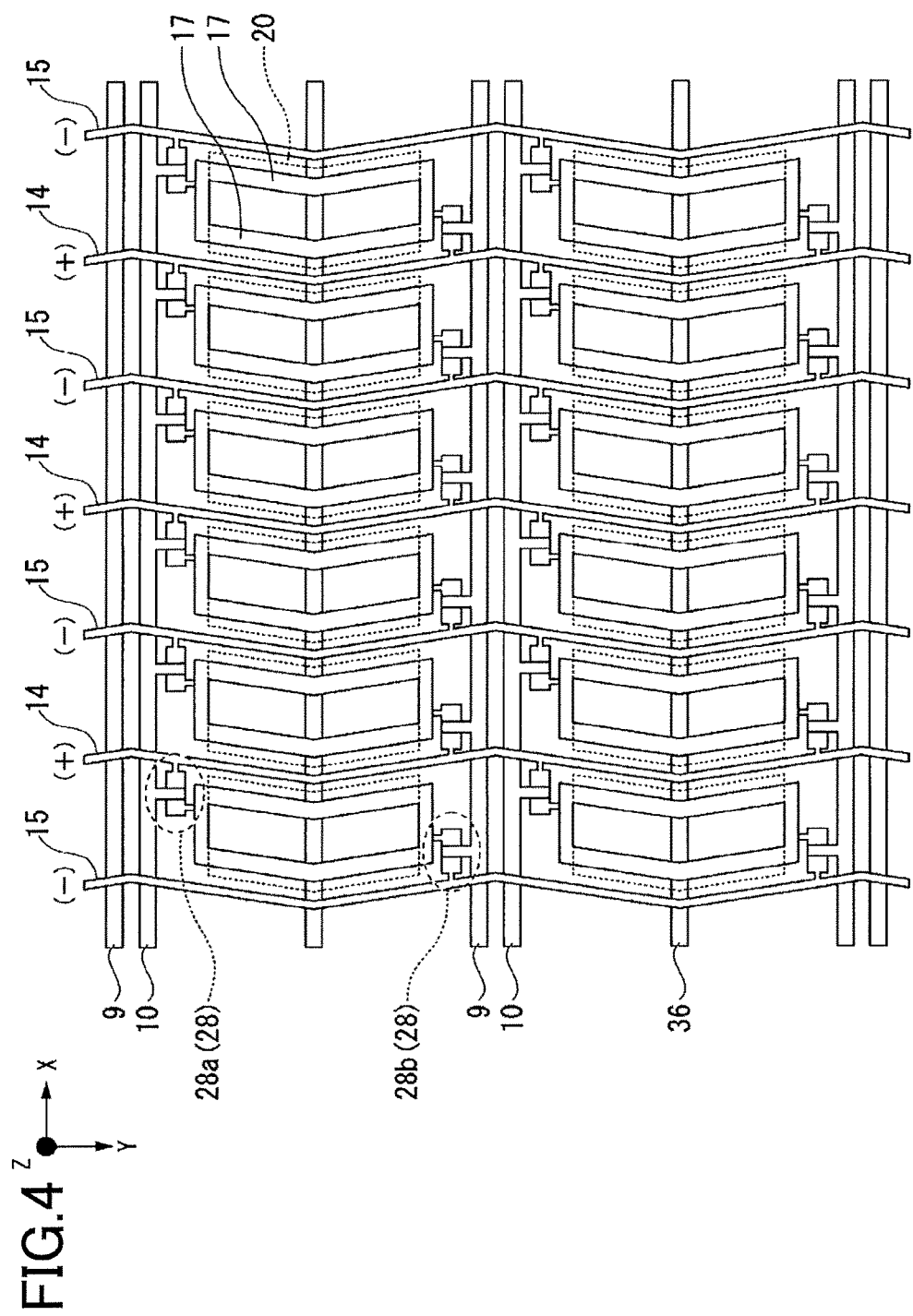
FIG. 4 is a plan view showing a part of an array substrate of the liquid crystal display device according to the first embodiment of the present invention as viewed from the viewer direction, in which an array structure is shown excluding the display device substrate, a second touch sensing wiring and a light shielding layer.

The pixel electrodes 17 and the common electrode 20 can be formed of a conductive metal oxide such as ITO. The shape of the pixel electrodes 17 and the common electrode 20 is rectangular. Further, the center portion of each pixel electrode has a slit. As shown in FIG. 4, the common electrode 20 and the pixel electrodes 17 are arranged, being overlapped with each other in plan view. As shown in FIG. 2, the common electrode 20 and pixel electrodes 17 face each other to sandwich the first insulation layer 11 in cross-sectional view. According to this electrode structure, a fringe electric field is produced in the periphery of the pixel electrodes 17 when the liquid crystal display voltage is applied between the common electrode 20 and the pixel electrodes 17, that is, the fringe electric field is produced in a region above the pixel electrodes 17, an outer region of the pixel electrodes 17 and an inner region, which is a slit forming region, of the pixel electrodes 17.

The liquid crystal layer 300 includes liquid crystal molecules 39 having positive dielectric anisotropy. The initial alignment of the liquid crystal molecules is horizontal with respect to the display device substrate 100 or the substrate surface of the array substrate 200. In the liquid crystal driving according to the first embodiment using the liquid crystal layer 300, a drive voltage is applied to the liquid crystal molecules so as to traverse the liquid crystal layer in plan view. Hence, this may be referred to as a horizontal field type. FIG. 2 omits an alignment film which imparts the initial alignment to the liquid crystal layer 300, optical films such as a deflection film and a phase-difference film, a protective cover glass or the like. The deflection films are respectively attached to the front surface and the back surface of the liquid crystal display device LCD1, so that crossed Nicols positional relationship is established between the optical axes.

Figure 3:
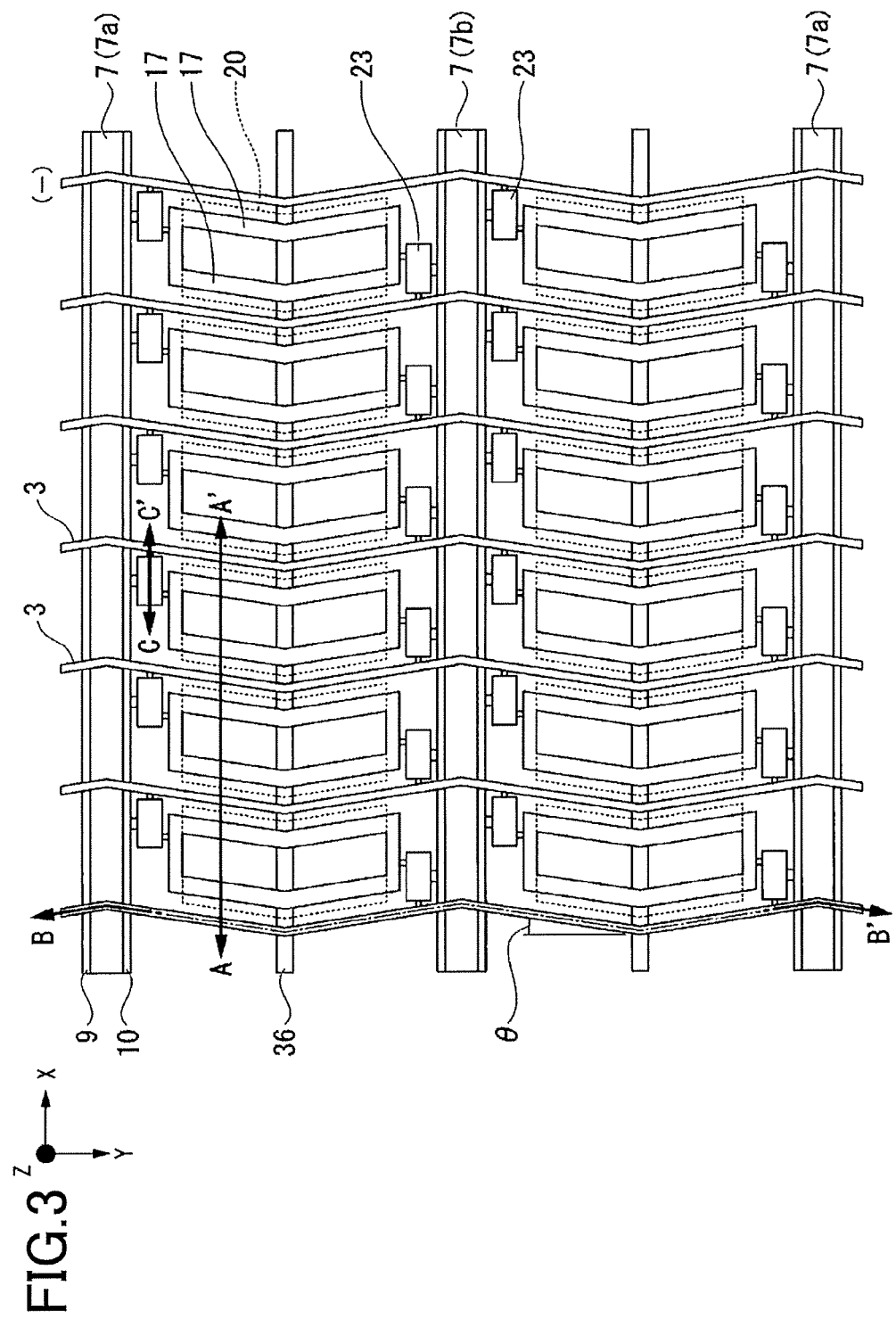
FIG. 3 is a plan view partly showing a pixel structure in which the liquid crystal display device according to the first embodiment of the present invention is viewed from a viewer direction.

FIG. 3 is a plan view showing a part of pixel structure when the liquid crystal display device LCD1 according to the present embodiment is viewed from the viewer side, and showing a structure in which the display device substrate 100 is attached to the array substrate 200.

Each pixel that constitutes the liquid crystal display device LCD1 has a polygonal shape, and a dog-legged pattern having an angle θ with respect to the alignment processing direction. As the alignment process of the alignment film, an optical alignment process or a rubbing treatment can be used. The angle θ has a range from 3° to 15°, for example.

The optical alignment process is detailed as follows.

Firstly, photosensitive alignment film material is applied to face-to-face surfaces of the display device substrate 100 and the array substrate 200, and the alignment film material is slightly dried. Further, a seal portion to seal the liquid crystal layer 300 is formed on at least one of the display device substrate 100 and the array substrate 200 so as to be located around the display screen. Thereafter, liquid crystal is dropped on either the display device substrate 100 or the array substrate 200 (ODF: one drop filling). The display device substrate 100 and the array substrate 200 are attached to each other so as to sandwich the dropped liquid crystal (liquid crystal layer 300) therebetween, thereby sealing the liquid crystal layer 300 (cell encapsulation). Thereafter, ultraviolet light is radiated to the substrate while voltage for driving the liquid crystal is applied to the liquid crystal layer 300, so as to cure and, at the same time, align the alignment film material. The ultra violet light may be polarized ultraviolet light or unpolarized ultraviolet light.

In the laminate structure (Z-direction) shown in FIG. 3, the first touch sensing wiring 3 is located as a topmost layer. The first touch sensing wiring 3 extends in the Y-direction along the pixel shape having a dog-legged pattern. Since the source wirings 14 and 15 shown in FIG. 2 are arranged, being overlapped with each other, under the first touch sensing wiring 3, the source wirings 14 and 15 are not shown but hidden by the first touch sensing wiring 3.

The second touch sensing wiring 7 is one of the topmost layers (except for the alignment film) among the plurality of layers which constitute the array substrate 200. The second touch sensing wiring 7 extends in the X-direction. The first gate wiring 10 and the second gate wiring 9 are provided under the second touch sensing wiring 7. The cross-sectional structure including the second touch sensing wiring 7, the first gate wiring 10 and the second gate wiring 9 will be described later with reference to FIG. 10. The second touch sensing wiring 7 includes at least a metal layer, and can be configured using the same structure as the first touch sensing wiring 3. That is, the touch sensing wiring 7 has a two-layer structure constituted of a black layer and the metal layer.

In a region surrounded by the second touch sensing wiring 7 and the first touch sensing wiring 3, the light shielding layer 23, the pixel electrodes 17 and the common electrode 20 are located.

The light shielding layer 23 (light shielding pattern) can be formed by a metal layer having the same layer structure as the second touch sensing wiring 7. The second touch sensing wiring 7 is electrically isolated from the light shielding layer 23.

Figure 5:
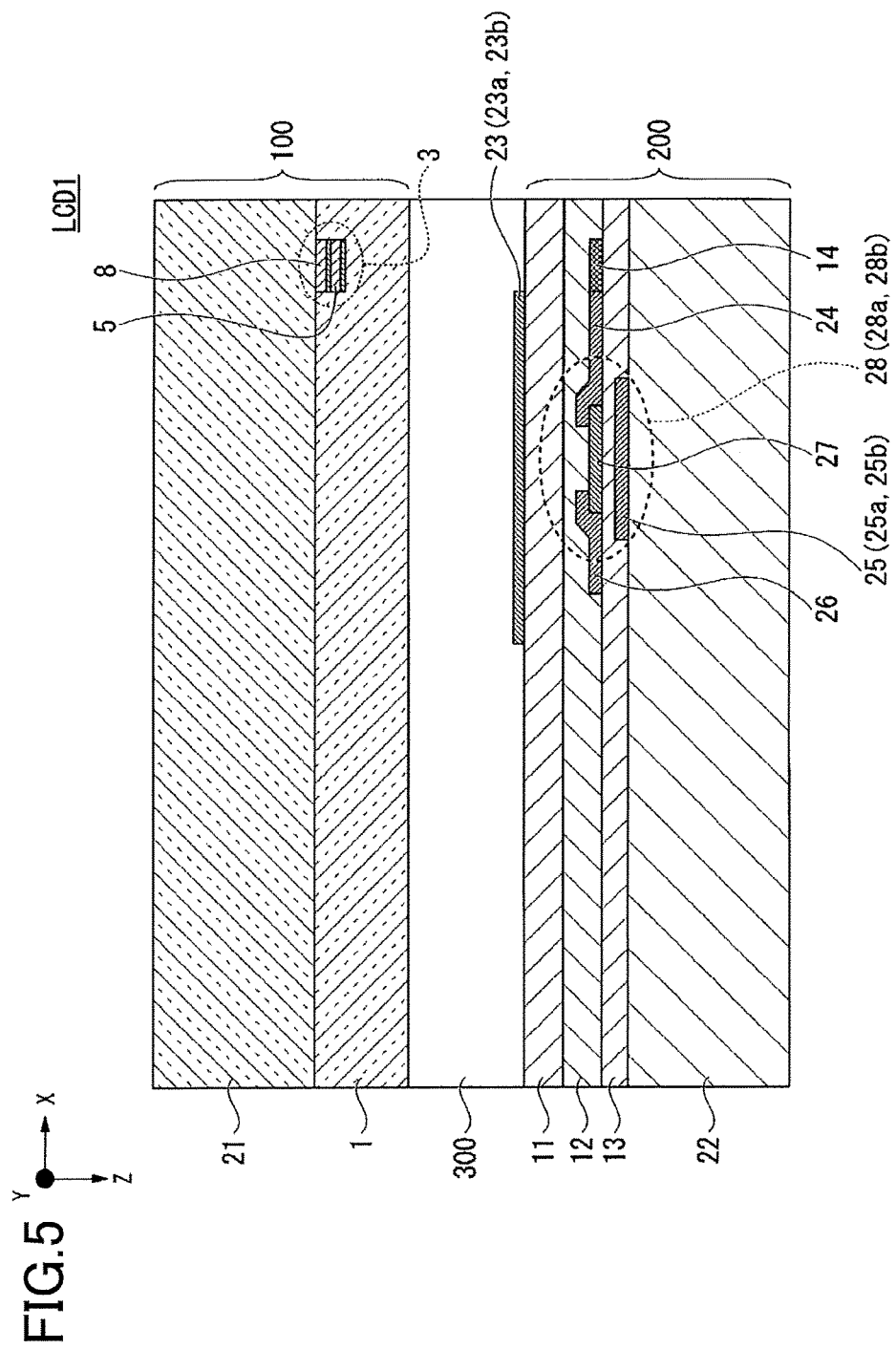
FIG. 5 is a cross-sectional view sectioned across the C-C' line of FIG. 3, showing a part of the liquid crystal display device according to the first embodiment of the present invention, that is, illustrating a structure where a light shielding layer (light shielding pattern) is arranged on the channel layer of the active element.

FIG. 5 is a cross sectional view showing a part of the liquid crystal display device LCD1. As shown in FIG. 5, the light shielding layer 23 is arranged to cover an upper portion of the channel layer 27 that constitutes active elements 28 (first active element 28a). Under the channel layer 27, the gate electrode 25 (first gate electrode) is provided via the third insulation layer 13. In other words, the channel layer 27 is located between the light shielding layer 23 and the gate electrode 25. Thus, the channel layer 27 of the active elements 28 overlaps the light shielding layer 23 and the gate electrode 25 in plan view. Therefore, the light L emitted from the backlight unit BU or reflected light or the like due to the light L is shielded by the light shielding layer 23 and the gate electrode 25, that is, the emitted or reflected light (stray light) is prevented from entering the channel layer 27. Accordingly, noise occurring in the active elements 28 caused by the stray light entering the channel layer 27 can be avoided so that malfunction in the active elements 28 can be avoided. As a result, image quality can be improved.

Especially, in a liquid crystal display device provided with high definition pixels of 300 ppi or more, the light is likely to enter the active elements 28 so that malfunction is likely to occur in the active elements 28. As a result, the display quality of the liquid crystal display device is likely to decrease. The light shielding layer 23 is provided so that such a decrease of the image quality can be avoided.

FIG. 5 shows a structure in which the light shielding layer 23 (first light shielding layer) covers the channel layer 27 of the first active element 28a. The light shielding layer 23 (second light shielding layer) is provided so as to cover the channel layer 27 that constitutes the second active element 28b which will be described later. Similarly, the gate electrode 25 (second gate electrode) is provided under the channel layer 27 of the second active element 28b, so as to avoid noise occurring in the second active element 28b caused by stray light entering the channel layer 27 of the second active element 28b. Accordingly, image quality can be improved.

The channel layer 27 is formed of oxide semiconductor or silicon semiconductor such as poly silicon. As the oxide semiconductor, metal oxide referred to as IGZO or the like can be used. When the channel layer is formed of oxide semiconductor, such as IGZO, containing two or more metal oxides selected from oxides of gallium, indium, zinc, tin, germanium, magnesium and aluminum, an influence of coupling noise produced in the dot inversion driving can be mostly cancelled. This is because, active elements using oxide semiconductor such as IGZO can process pulse signal, which is an image signal of liquid crystal driving, within extremely a short period of time (e.g., 2 msec). Also, such oxide semiconductors have memory effect that allows the voltage applied to the pixel electrodes to be retained in the liquid crystal display after application of the image signal. Hence, noise is not newly produced during the voltage retention period so that the influence of noise on the touch sensing can be further reduced, where the noise is produced during the liquid crystal driving.

Since oxide semiconductors such as IGZO have a high electrical breakdown voltage, liquid crystals can be driven at high speed. Hence, the oxide semiconductor such as IGZO is a predominant material for three-dimensional image displays. Transistors using oxide semiconductor such as IGZO for the channel layer have a high memory effect. Therefore, there is an advantage that even if a low frequency, ranging from 0.1 Hz to 60 Hz for example is used for liquid crystal drive frequency, flicker (display-flickering) is unlikely to occur. Accordingly, a liquid crystal display device having not only touch sensing function but also low power consumption and low flicker can be accomplished.

Transistors having a channel layer made of IGZO can be used with dot inversion driving at low frequency combined with touch sensing driving at frequency different from that of dot inversion driving. With this configuration, an image display having high image quality and a high precision touch sensing can be achieved with low power consumption. The transistor may have a multi gate structure such as a dual gate structure, or a bottom gate structure.

In the case where dot inversion driving is used as a liquid crystal drive method, with the use of IGZO having the good memory effect, it is possible to omit an auxiliary capacitance (storage capacitor) necessary for constant voltage driving to keep the voltage of each pixel electrode to be a constant (to keep constant potential).

Referring back to FIG. 4, description will be continued.

FIG. 4 is a plan view showing a part of a pixel structure, as viewed from the viewer, of the liquid crystal display device LCD1 according to the present embodiment. FIG. 4 shows a positional relationship between components which are arranged on the array substrate 200, excluding the display device substrate 100, the second touch sensing wiring 7 and the light shielding layer 23.

The two gate wirings 9 and 10 orthogonally intersect the two source wirings 14 and 15 on the transparent substrate 22 of the array substrate 200. In other words, the gate wirings 9 and 10 extend in the X-direction and the source wirings 14 and 15 extend in the Y-direction. The pixel openings 18 are each defined by the first gate wiring 10, the second gate wiring 9, the first source wiring 14 and the second source wiring 15. The long sides of the pixel openings 18 extend in a direction along the first source wiring 14 and the second source wiring 15.

Further, the common wiring 36 is provided on the transparent substrate 22 to be located at the center of each pixel, and to extend in parallel to the gate wirings 9 and 10. Moreover, a contact hole which is not shown is provided in the center of each of the plurality of pixels. The plurality of common electrodes 20 arranged in the X-direction are electrically connected to the common wiring 36 via the contact holes. Each of the pixels is provided with two active elements 28, that is, the first active element 28*a* and the second active element 28*b*.

The first gate wiring 10 is electrically associated with the first active element 28*a*. Specifically, the first gate electrode 25*a* connected to the first gate wiring 10 faces the channel layer 27 of the first active element 28*a* via the third insulation layer 13. The first active element 28*a* is driven to perform switching in response to the scanning signal supplied to the first gate electrode 25*a* from the image signal timing control unit 121.

The second gate wiring 9 is electrically associated with the second active element 28*b*. Specifically, the second gate electrode 25*b* connected to the second gate wiring 9 faces the channel layer 27 of the second active element 28*b* via the third insulation layer 13. The second active element 28*b* is driven to perform switching in response to the scanning signal supplied to the second gate electrode 25*b* from the image signal timing control unit 121.

A voltage as an image signal transmitted from the image signal timing control unit 121 is applied to the first source wiring 14 and the second source wiring 15. An image signal (first image signal) having positive potential is applied to the first source wiring 14, and an image signal (second image signal) having negative potential is applied to the second source wiring 15. The polarity, positive or negative, of the image signal in the first source wiring and the second source wiring 15 is fixed, and inversion of the image signal from positive to negative, or vice versa, is not performed at the source wirings 14 and 15. The liquid crystal driving in the source wirings 14 and 15, with the polarity being fixed to positive/negative, will be described with reference to FIGS. 14 and 15.

Figure 6:
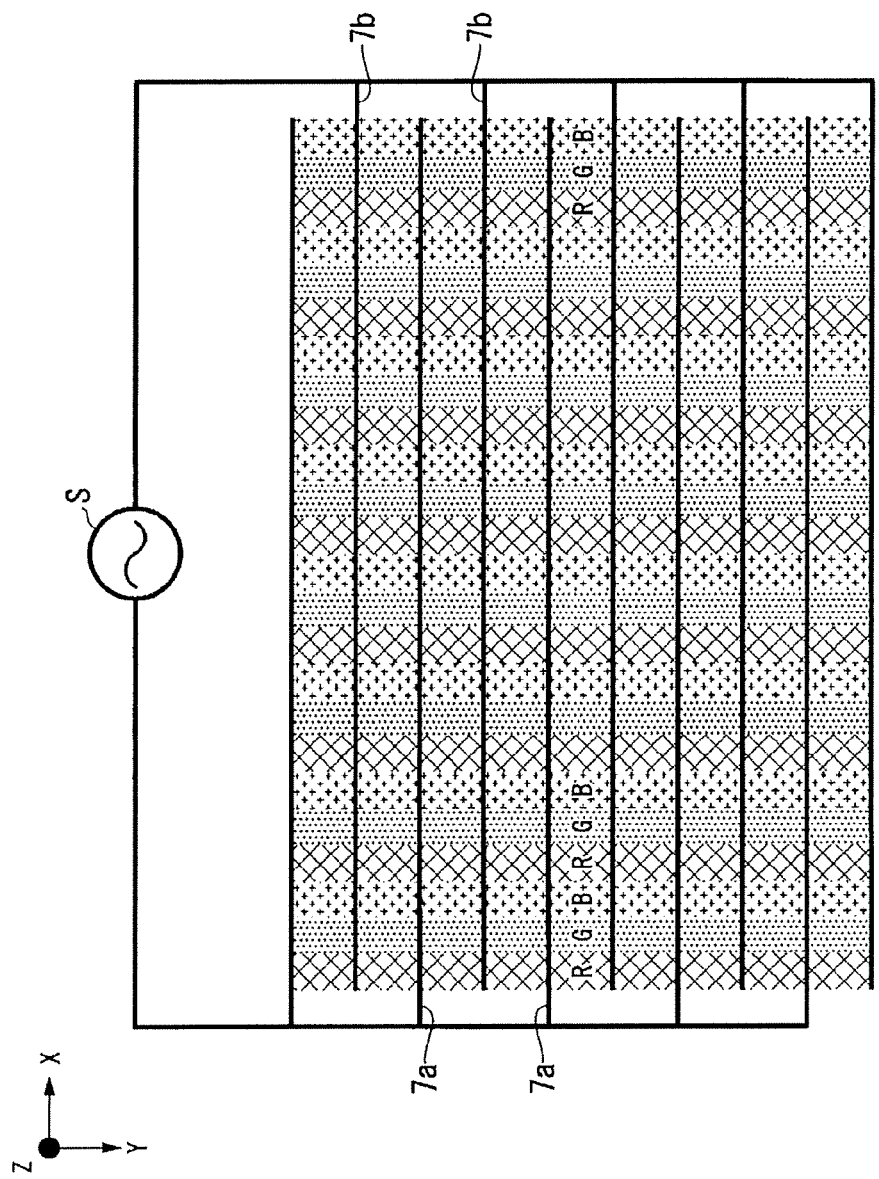
FIG. 6 is a plan view schematically showing a touch sensing wiring according to the first embodiment of the present invention, that is, illustrating electrical connections of the touch sensing wirings 7a and 7b.

FIG. 6 is a plan view schematically showing the touch sensing wirings according to the first embodiment of the present invention, that is, showing electrical connection between the second touch sensing wirings 7*a* and 7*b*. FIG. 6 is a diagram illustrating a conductive wiring to which the reset voltage is applied.

FIG. 6 omits illustration of the array substrate 200 including the pixel electrodes 17 or the first insulation layer 11, and shows positional relationship of red filters R, green filters G and blue filters B constituting the color filter, which will be described later, with the second touch sensing wirings 7*a* and 7*b*.

As shown in FIG. 6, the second touch sensing wiring 7 has a first wiring group including the second touch sensing wiring 7*a* (first conductive wiring) and a second wiring group including the second touch sensing wiring 7*b* (second conductive wiring). The first wiring group and the second wiring group are formed in a comb-teeth shape, with the two wiring groups meshing with each other.

At least any one of the red filter R, the green filter G and the blue filter B is provided at a position corresponding to each pixel opening 18, on the display device substrate 100.

An either positive or negative reset voltage Vr is applied to the first wiring group and the second wiring group. That is, the first and second wiring groups are applied with respective reset voltages of opposite polarities. Such a switching operation of the reset voltage is controlled by the touch sensing reset signal control unit 122 that uses switching elements or the like, and the system control unit 123. In the switching operation of the reset voltage, for example, driving operation is performed such that voltage is applied to one of the first and second wiring groups, and the other wiring group is connected to the ground, or that positive voltage is applied to one wiring group and negative voltage is applied to the other wiring group.

In the example shown in FIG. 6, alternating current (AC) power source S (virtual power source) is taken to be virtually connected to the first wiring group and the second wiring group. In this case, the reset voltage is AC voltage. In the first wiring group, each of the plurality of second touch sensing wirings 7*a* has an end portion so as to serve as an electrode (first conductive electrode). Similarly, in the second wiring group, each of the plurality of second touch sensing wirings 7b has an end portion so as to serve as an electrode (second conductive electrode).

It should be noted that the present invention is not limited to the specific circuit configuration shown in FIG. 6, in which the AC power source S is virtually provided between the first wiring group and the second wiring group. For example, one of the first and second wiring groups may be connected to the ground (grounded), while applying no positive or negative voltage to the other wiring group. The reset voltage applied to the wiring groups may be AC voltage or direct current (DC) rectangular waves.

FIG. 6 illustrates positional relationship of stripe shaped red filters, green filters and blue filters (three colors, R,G,B) which constitute the color filter, with the second touch sensing wirings 7a and 7b. In other words, the second touch sensing wirings 7a and 7b extend in a direction perpendicular to an extending direction of the stripe shaped color filters. Any of the red, green and blue filters is arranged between adjacent second touch sensing wirings 7a and 7b. Each color filter disposed between the second touch sensing wirings 7a and 7b constitutes a pixel. The present invention does not limit the positional relationship of the color filters with the second touch sensing wiring 7a and 7b, as shown in FIG. 6.

Figure 10:
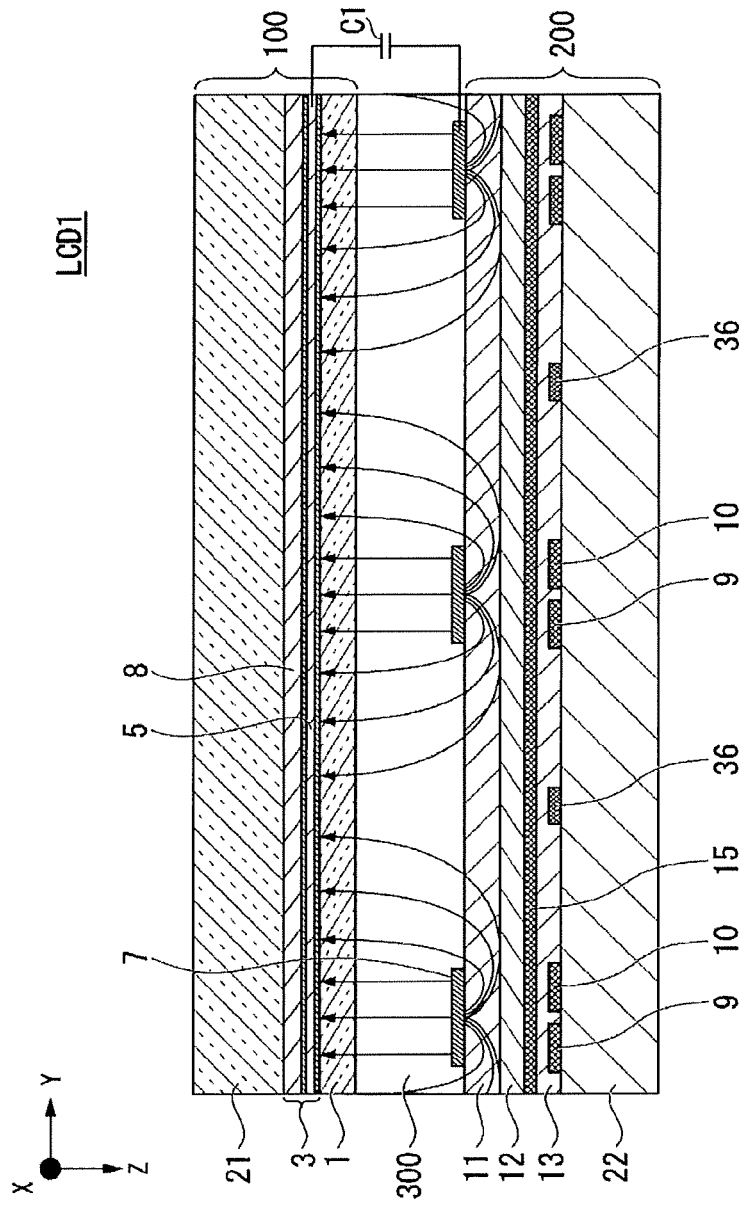
FIG. 10 is a cross-sectional view sectioned across the B-B' line (source wiring) of FIG. 3, showing a part of the liquid crystal display device according to the first embodiment of the present invention, that is, illustrating a state of the fringe electric field produced when a touch sensing drive voltage is applied between the first touch sensing wiring 3 and the second touch sensing wiring 7.

FIG. 10 is a cross-sectional view sectioned across the B-B' line (source wiring) of FIG. 3, showing a part of a liquid crystal display device according to the first embodiment of the present invention. FIG. 10 illustrates a state where touch sensing driving is performed. The touch sensing driving will be described later.

As shown in FIG. 10, the first touch sensing wiring 3 is provided on a surface of the transparent substrate 21, the surface facing the liquid crystal layer 300. The first touch sensing wiring 3 includes a black layer 8 provided on the first transparent substrate 21 of the display device substrate 100, and a metal layer 5 provided on the black layer 8. Also, a transparent resin layer 1 is provided on the transparent substrate 21 so as to cover the first touch sensing wiring 3.

The touch sensing wiring 7 is provided on the uppermost surface of the array substrate 200, the uppermost surface facing the liquid crystal layer 300. A plurality of insulation layers 11, 12 and 13 are formed on the transparent substrate 22 of the array substrate 200, together with the first gate wiring 10, the second gate wiring 9, the common wiring 36 and the above-described second touch sensing wiring 7.

The distance from the display surface (surface facing the viewer) of the display device substrate 100 to the second touch sensing wiring 7 is larger than the distance from the display surface of the display device substrate 100 to the first touch sensing wiring 3. Also, the second touch sensing wiring 7 may be provided at any location among a location on the first insulation layer 11, a location on the second insulation layer 12, and a location under the second insulation layer 12. An insulation layer may be further laminated on the second touch sensing wiring 7.

As the second touch sensing wiring 7, an alloy layer of aluminum and copper or the like can be used. In the plurality of layers constituting the first touch sensing wiring 3, the black layer 8 is provided as a layer observed by the viewer, whereby light reflection produced at the first touch sensing wiring 3 is reduced so that visibility can be improved. It should be noted that inorganic or organic insulation layer may be formed before forming the metal layer, or alternatively, inorganic or organic insulation layer may be formed on the metal layer after patterning the first touch sensing wiring 3.

(Operation of Liquid Crystal Display Device LCD1)

(1. Inversion Driving with Gate Wirings 9 and 10, and Source Wirings 14 and 15)

Figure 14:
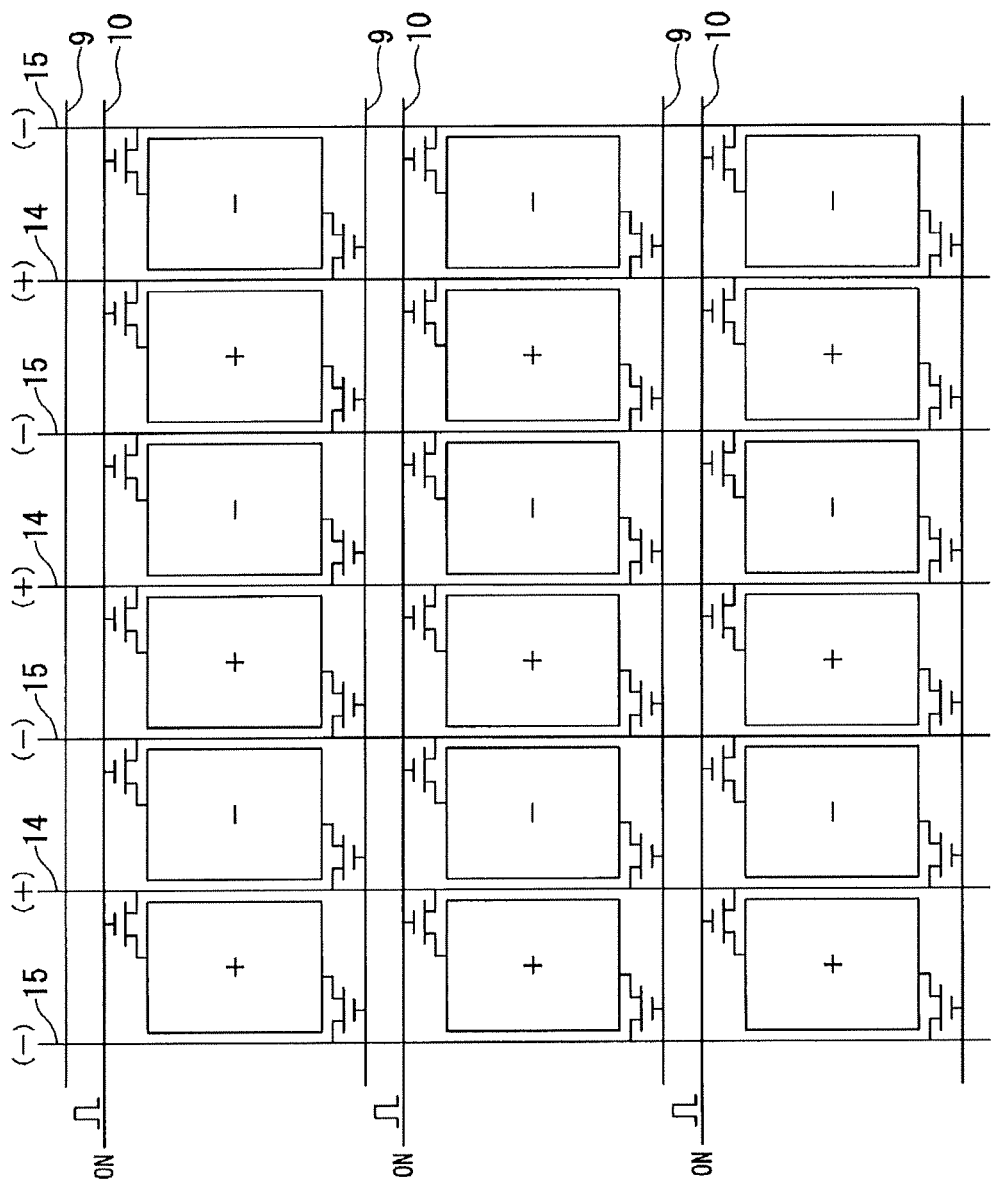
FIG. 14 is a circuit diagram showing a part of the liquid crystal display device according to the first embodiment of the present invention, that is, illustrating a wiring structure in which a plurality of first source wirings fixed to negative polarity and a plurality of second source wirings fixed to positive polarity are arranged alternately, and a part of a plan view showing an example of column inversion driving when selecting only the first gate wiring thereby using the gate signal for active element driving.
Figure 15:
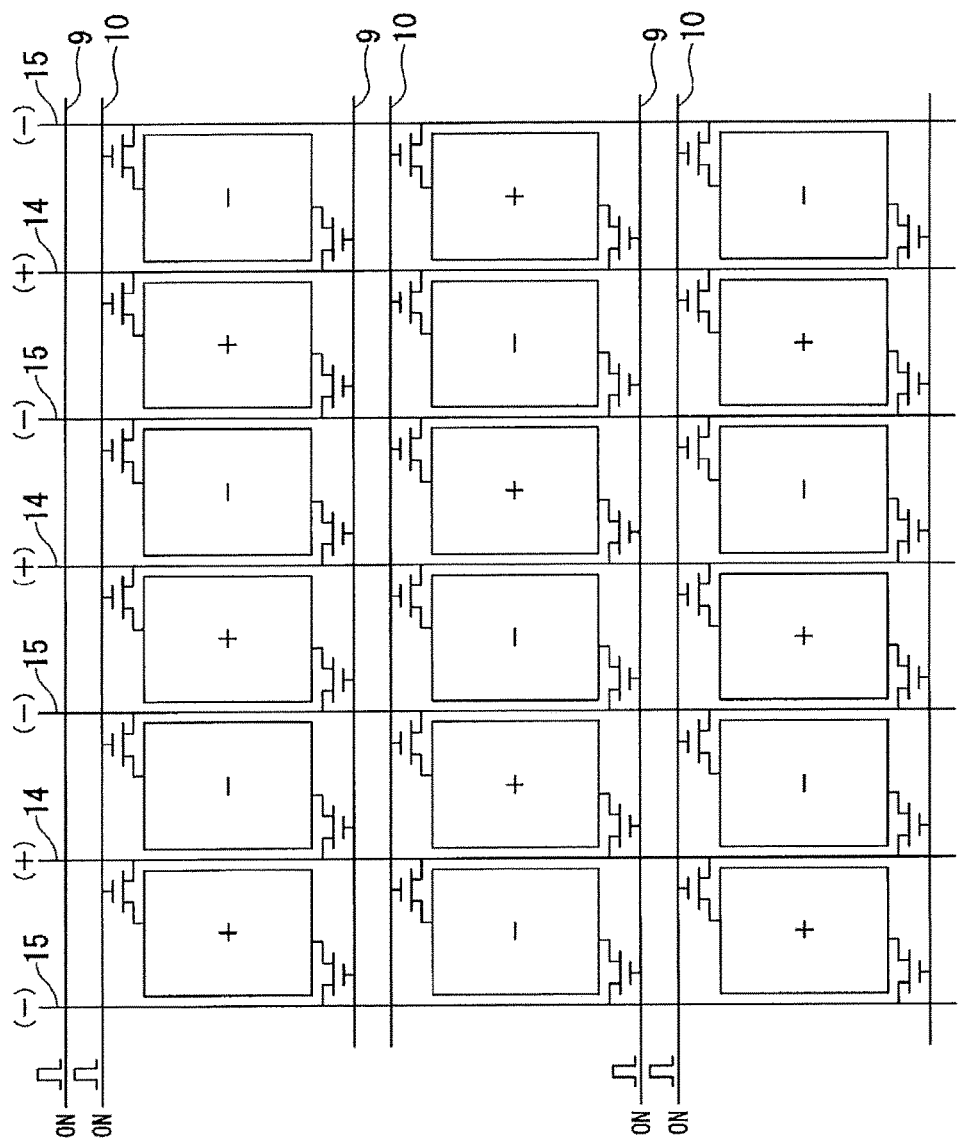
FIG. 15 is a circuit diagram showing a part of the liquid crystal display device according to the first embodiment of the present invention, that is, illustrating a wiring structure in which a plurality of first source wirings fixed to negative polarity and a plurality of second source wirings fixed to positive polarity are arranged alternately, and a part of a plan view showing an example of dot inversion driving when selecting a pair of gate wirings at intervals of two pairs, thereby using the gate signal for active element driving.

With reference to FIGS. 14 and 15, the inversion driving with the gate wirings 9 and 10 and the source wirings 14 and 15 will be described.

According to the present embodiment, as an example, pixel inversion driving is performed in each of the pixels, where the potential at the first source wiring 14 has positive polarity and the second source wiring 15 has negative polarity. The gate wirings selected when the inversion driving is performed may be a frame inversion which selects the gate wirings throughout the display screen, or half of the gate wirings of all the lines may be selected to perform the inversion driving. Further, inversion driving in which horizontal lines are sequentially selected, or inversion driving in which the horizontal lines are selected intermittently may be used.

FIG. 14 illustrates polarities of individual pixels in the case where even-number gate wirings 10 are selected from the plurality of gate wirings 10 (plural lines), and the gate signals are transmitted to the active elements through the selected gate wirings 10. Here, the polarity of the first source wiring 14 is positive and the polarity of the second source wiring 15 is negative. In this case, pixels having the same polarity are arranged in the vertical direction. For example, in the case where odd-number lines are selected for the gate wirings in the next frame, and the gate signals are transmitted to the active elements through the selected gate wirings 10, pixels having polarity opposite to the polarity shown in FIG. 14 are arranged similarly in the vertical direction and vertical line inversion driving is performed. When the vertical lines are inverted for every frame, frequency of occurrence of noise is further reduced.

FIG. 15 illustrates polarities of respective pixels in the case where a pair of two gate wirings 9 and 10 are selected at intervals of two lines from the plurality of gate wirings 10 (plural lines), and the gate signals are transmitted to the active elements through the selected gate wirings 9 and 10. Here, the polarity of the first source wiring 14 is positive and the polarity of the second source wiring 15 is negative in both vertical and horizontal directions. In this case, pixels having positive or negative polarity are arranged alternately. In the next frame, different pair of two gate wirings are selected, and the gate signals are transmitted to the active elements through the selected gate wirings 9 and 10, whereby pixels having polarity opposite to the polarity shown in FIG. 15 are alternately arranged similarly and dot inversion driving is performed. The inversion driving of pixels shown in FIGS. 14 and 15 is similarly performed in the following embodiments.

(2. Operation for Rapidly Resuming Liquid Crystal Alignment with Initial Alignment by Applying Voltage to Second Touch Sensing Wiring 7)

Figure 7:
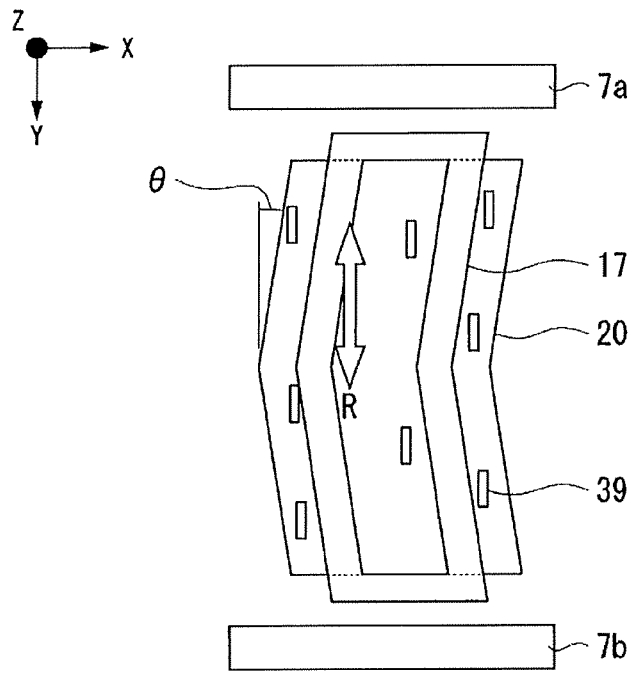
FIG. 7 is a plan view showing a part of the liquid crystal display device according to the first embodiment of the present invention, that is, illustrating behavior of the liquid crystals located between a common electrode and a pixel electrode in an opening of one pixel, and illustrating a relationship between liquid crystal molecules and an electrode structure, in a state of the initial alignment (black display state).
Figure 8:
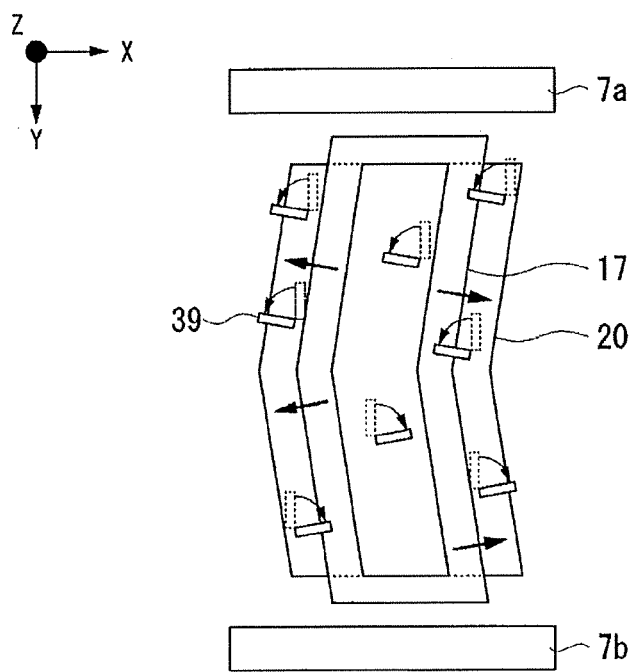
FIG. 8 is a plan view showing a part of the liquid crystal display device according to the first embodiment of the present invention, that is, illustrating behavior of the liquid crystals located between a common electrode and a pixel electrode in an opening of one pixel, and illustrating behavior of the liquid crystal molecules, when liquid crystal voltage is applied between the pixel electrode and the common electrode.
Figure 9:
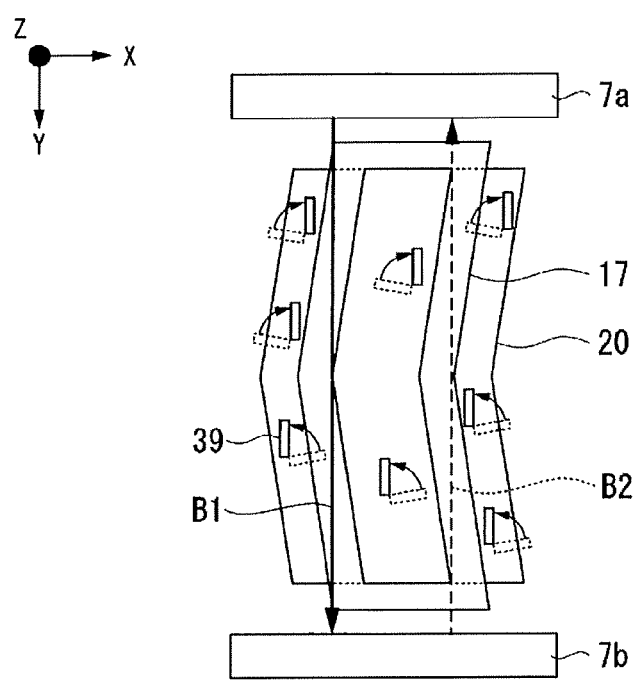
FIG. 9 is a plan view showing a part of the liquid crystal display device according to the first embodiment of the present invention, that is, illustrating behavior of the liquid crystals located between a common electrode and a pixel electrode in an opening of one pixel, and illustrating that a reset voltage is applied between the second touch sensing wirings 7a and 7b in a state where liquid crystal drive voltage is not applied between the pixel electrode and the common electrode (non-applied state), to produce electric field in a direction indicated by a reference sign B1 or a direction indicated by a reference sign B2, thereby rapidly turning the alignment state of liquid crystals to a black display state.

FIGS. 7 to 9 are plan views each showing a part of the liquid crystal display device according to the first embodiment of the present invention, that is, enlarged views each showing a relationship between the liquid crystal molecules and an electrode structure (pixel electrode 17 and common electrode 20) in a single pixel of the liquid crystal display device LCD1. FIG. 7 is an enlarged view showing a relationship between the liquid crystal molecules and the electrode structure in a state of initial alignment (black display state). FIG. 8 is a diagram showing rotational behavior of the liquid crystal molecules when the liquid crystal drive voltage is applied between the pixel electrode 17 and the common electrode 20. FIGS. 7 and 8 illustrate the second touch sensing wirings 7a and 7b arranged sandwiching a single pixel. FIG. 9 is a diagram illustrating that the alignment state of the liquid crystals rapidly turn to a black display state, by applying the reset voltage between the second touch sensing wirings 7a and 7b to produce electric field therebetween in a state where the liquid crystal drive voltage is not applied between the pixel electrode 18 and the common electrode 20 (non-applied state).

As shown in FIG. 7, when the liquid crystal drive voltage is not applied between the pixel electrode 17 and the common electrode 20, liquid crystal molecules 39 in the liquid crystal layer 300 are aligned towards an alignment direction R (direction of alignment processing, or alignment direction in the initial alignment state). In other words, liquid crystal molecules are aligned in the horizontal direction with respect to the display device substrate 100 and the array substrate 200 (initial alignment state). Also, the pixel electrode 17 and the common electrode 20 have a dog-legged pattern, that is, have sides inclined by an angle θ with respect to the alignment direction R.

Next, as shown in FIG. 8, when the liquid crystal drive voltage is applied between the pixel electrode 17 and the common electrode 20, fringe electric field is produced between the pixel electrode 17 and the common electrode 20. Being effected by the electric field, the liquid crystal molecules 39 are rotated on the pixel electrode 17 so as to display an image (white display) in the liquid crystal display device LCD1. Here, since the pixel electrode 17 and the common electrode 20 have sides inclined by an angle θ with respect to the alignment direction R, the liquid crystal molecules 39 rotate clockwise in an upper region of the pixel shown in FIG. 8 (a region closer to the second touch sensing wiring 7a than to the second touch sensing wiring 7b; first domain). On the other hand, in the lower region of the pixel (a region closer to the second touch sensing wiring 7b than to the second touch sensing wiring 7a; second domain), the liquid crystal molecules 39 rotates counterclockwise.

It should be noted that the voltage is not applied to the second touch sensing wirings 7a and 7b, when the liquid crystal drive voltage is ON.

Next, when the liquid crystal drive voltage applied between the pixel electrode 17 and the common electrode 20 is turned OFF, the liquid crystal molecules shown in FIG. 8 turn to a black display state which is in the initial alignment state shown in FIG. 7. The period during which the alignment state of the liquid crystal molecules is resumed with the initial alignment state is referred to as τoff.

Figure 13:
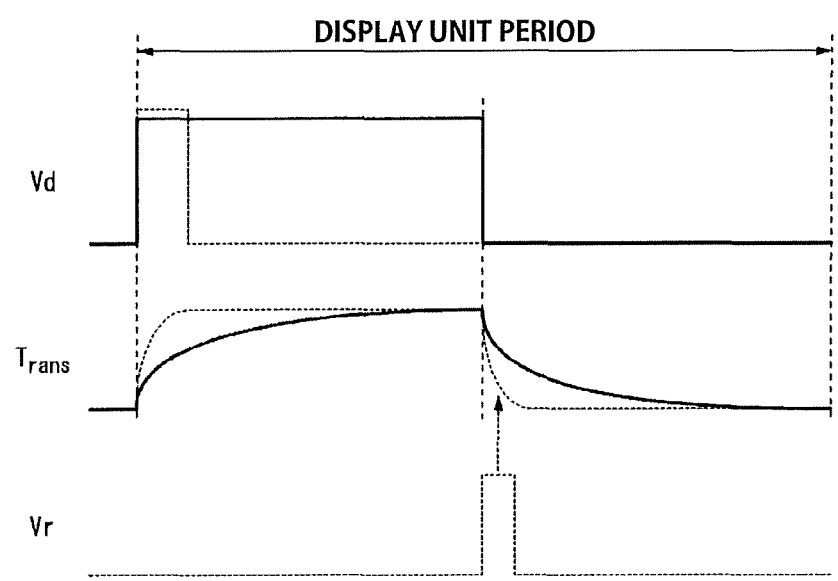
FIG. 13 is a diagram showing a comparison between a waveform related to the liquid crystal driving according to a conventional example and a waveform of the liquid crystal driving according to the liquid crystal display device according to an embodiment of the present invention, that is, illustrating the ON/OFF timing of the liquid crystal drive voltage, and a change in the pixel transmittance $T_{rans}$ of a conventional active element (e.g., active element provided with a channel layer constituted of a polysilicon semiconductor).

Especially, according to conventional liquid crystal display devices, since the second touch sensing wirings 7a and 7b are not provided, a white display state is gradually turned to a black display state. That is, as in FIG. 13 showing change in transmittance of a conventional liquid crystal display device, the transmittance $T_{rans}$ gradually decreases over time from a white display state (transmittance $T_{rans}$: 100%) to a black display state (transmittance $T_{rans}$: 0%).

Thus, according to the conventional liquid crystal display device, since the drive voltage used for turning to a black display of the liquid crystals is not applied to the liquid crystal molecules 39, the period τoff cannot be shortened.

According to the present embodiment, voltage is applied, as shown in FIG. 9, across the second touch sensing wirings 7a and 7b after displaying the image. One method for applying voltage, is that the second touch sensing wiring 7b is grounded and a 5V reset voltage is applied to the second touch sensing wiring 7a. Thus, by applying voltage between the second touch sensing wiring 7a and 7b, a reset electric field B1 is produced in a direction orthogonally intersecting the second touch sensing wirings 7a and 7b (direction parallel to the display device substrate 100 and the array substrate 200). The longitudinal axes of the liquid crystal molecules 39 are rapidly restored and oriented to the reset electric field B1. Thus, application of the reset voltage between the second touch sensing wirings 7a and 7b allows the display state of the liquid crystal layer 300 to rapidly turn to a black display state.

As described, after rapidly performing black display with the reset electric field B1, liquid crystal drive voltage is applied between the pixel electrode 17 and the common electrode 20 so that an image is displayed. Further, after displaying the image, the reset voltage is further applied between the second touch sensing wirings 7a and 7b to produce the reset electric field. In other words, the reset electric field is applied to the liquid crystal layer 300 before/after an image display operation performed once. This operation is repeatedly performed. Thus, when the reset electric field is repeatedly applied to the liquid crystal molecules 39 after the image display, it is preferable that the polarity of the reset voltage is inverted. Specifically, it is preferable that the reset voltage includes positive voltage and negative voltage, and the reset voltage is inverted to positive or negative at regular intervals.

Specifically, after rapidly performing black display with the reset electric field B1, the next image is displayed. Thereafter, for example, the second touch sensing wiring 7a is grounded and 5V-reset voltage is applied to the second touch sensing wiring 7b. Then, a reset electric field B2 is produced in a direction orthogonally intersecting the second touch sensing wirings 7a and 7b (a direction parallel to the display device substrate 100 and the array substrate 200). The longitudinal axes of the liquid crystal molecules 39 are rapidly restored and oriented to the reset electric field B2.

Thus, by inverting polarity of the reset voltage applied to the second touch sensing wirings 7a and 7b, the direction of the reset electric field B2 becomes opposite to the above-described electric field B1.

Even when the polarity of the reset voltage is inverted, the alignment state of the liquid crystal molecules 39 can be similarly rapidly resumed with the initial alignment state so that τoff can be shortened. The driving method of repeatedly inverting the polarity of the reset voltage is performed at every single display unit period which will be described later. This driving method contributes to reduction of sticking in the liquid crystal display. It should be noted that "single display unit period" refers to a minimum unit period of the image display operation with the image signal. In the case where dot inversion driving is performed, the minimum unit is an inverting period for one pixel. In the case where vertical line inversion driving is used, the minimum unit is an inversion period for one line. In the case where frame inversion driving is used, the minimum unit is an inversion period for one frame.

(3. Touch Sensing Operation Using Second Touch Sensing Wiring 7)

Figure 11:
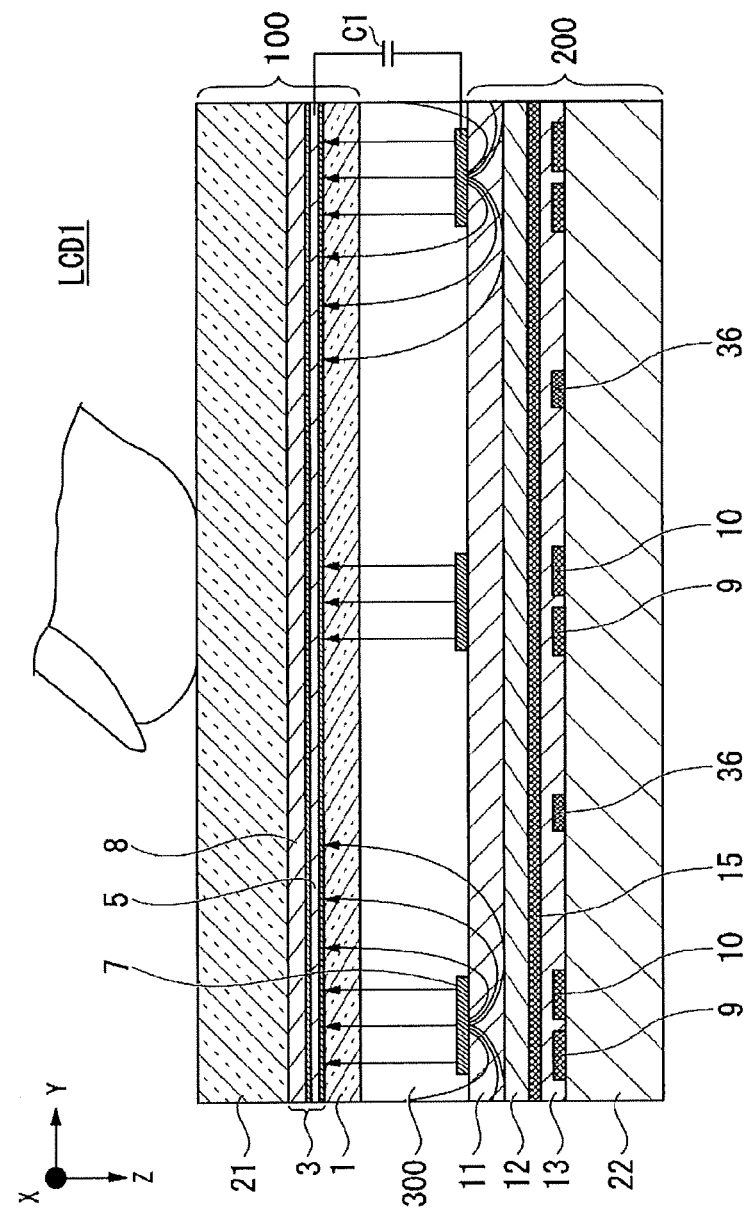
FIG. 11 is a cross-sectional view sectioned across the B-B' line (source wiring) of FIG. 3, showing a part of the liquid crystal display device according to the first embodiment of the present invention, that is, illustrating a change in the fringe electric field when a touch sensing drive voltage is applied between the first touch sensing wiring 3 and the second touch sensing wiring 7, and a pointer such as a finger contacts or approaches the surface on the viewer side of the display device substrate.

FIGS. 10 and 11 are cross-sectional views sectioned across the source line (B-B' line). FIG. 10 partially illustrates a state of fringe electric field produced when the touch sensing drive voltage is applied between the touch sensing wiring 3 and the second touch sensing wiring 7. FIG. 11 partially illustrates a change in the fringe electric field when the touch sensing drive voltage is applied between the touch sensing wiring 3 and the second touch sensing wiring 7, and when a pointer such as a finger contacts or approaches the surface of the display device substrate 100 which faces the viewer.

In FIG. 10, a fringe electric field is produced between the second touch sensing wiring 7 (touch drive wiring) and the first touch sensing wiring 3 (touch detection wiring) to which the touch sensing drive voltage is applied, and the line of electric force is produced from the second touch sensing wiring 7 so as to extend to the first touch sensing wiring 3. At this moment, electrostatic capacitance C1 is held between the second touch sensing wiring 7 and the first touch sensing wiring 3.

As shown in FIG. 11, when the pointer such as a finger contacts or approaches the transparent substrate 21, the first touch sensing wiring 3 detects a change in the electrostatic capacitance as a touch sensing signal.

In FIGS. 10 and 11, the first touch sensing wiring 3 serves as a touch detection wiring. However, the first touch sensing wiring 3 may serve as a touch drive wiring. In this case, the second touch sensing wiring 7 serves as a touch detection wiring. Thus, the role of the first touch sensing wiring 3 can be switched.

Moreover, an organic film or an inorganic film imparted with visible light absorbing properties may be laminated on the second touch sensing wiring 7. When the inorganic film having visible light absorbing properties is used, the inorganic film is constituted, for example, of a metal oxide film or a multilayer structure including the oxide film. When using an organic film having visible light absorbing properties, a black layer which will be described later can be used as the inorganic film. A part or the entirety of the second touch sensing wiring 7 can be used as a touch drive wiring. Alternatively, a part or the entirety of the second touch sensing wiring 7 can be used as a touch detection wiring.

When the second touch sensing wiring 7 is used as the touch drive wiring, the reset voltage Vr and the touch sensing drive voltage $V_{touch}$ are applied to the second touch sensing wiring 7 in a time-sharing manner.

When the second touch sensing wiring 7 is used as the touch detection wiring, the first touch sensing wiring 3 serves as the touch drive wiring. In this case, the touch sensing drive voltage $V_{touch}$ is applied to the first touch sensing wiring 3, and the reset voltage Vr is applied to the second touch sensing wiring 7, and the second touch sensing wiring 7 detects the touch sensing signal.

Potential at a part of wirings among the plurality of second touch sensing wirings 7 may be set to floating potential. Also, when the reset voltage is switched between positive voltage and negative voltage (for example, when the state of produced electric field (electric field direction) is changed to a state where the electric filed B2 is produced from a state where the electric field B1 is produced shown in FIG. 9), either one of the two second touch sensing wirings 7 may be grounded. Using switching elements selection for the second touch wiring 7 can be made such as from application of the reset voltage to the second touch sensing wiring 7, change of potential of the second touch sensing wiring 7 to floating potential, and connection of the second touch sensing wiring 7 to the ground (grounding).

In the above-described touch sensing operation, not all of the touch sensing wirings which constitute the liquid crystal display device are necessarily used for touch sensing operation. In this case, firstly, all of the touch sensing wirings are divided into a plurality of groups. The number of groups is less than the total number of touch sensing wirings. For example, the number of wirings which constitutes one group is taken to be 6. Here, for example, two wirings are selected from among all the wirings (the number of wirings is 6) (the number of selected wirings is smaller than all the wirings, 2 wirings<6 wirings). In one group, the selected two wirings are used for touch sensing, and potentials of the remaining four wirings are set to be floating potential (thinning driving). Since the liquid crystal display device includes a plurality of groups, touch sensing operation can be performed for every group in which the functions of the wirings are defined as described above.

Next, drive frequency of the touch sensing operation will be described.

For example, in the case where the potential of the transparent electrode serving as the common electrode of the liquid crystal driving is set to constant potential (i.e., zero volts) and dot inversion driving is performed in each of the plurality of pixels, the transparent electrode serves as electrical shielding in liquid crystal driving and touch sensing driving.

When the first touch sensing wiring 3 provided on the display device substrate 100 is used as a touch drive electrode, and the second touch sensing wiring 7 provided on the array substrate 200 is used as a touch detection electrode, the driving condition of the touch sensing operation can be different from the driving condition of the liquid crystals (frequency, voltage or the like).

For example, the driving frequency of the touch sensing can be set to a range from 60 Hz to several tens of KHz, and the frequency of the liquid crystal driving can be set to a range from 0.1 Hz to 480 Hz. In the case where liquid crystal driving is performed by TFT in which the channel layer of the active elements is formed of an oxide semiconductor such as IGZO, the liquid crystal drive frequency can be set to 60 Hz or less. Further, touch driving and liquid crystal driving can be performed in a time-sharing manner.

In the case where either the first touch sensing wiring 3 provided on the display device substrate 100 or the second touch sensing wiring 7 provided on the array substrate 200 serves as a touch driving electrode (scan electrode), the scanning frequency when detecting the electrostatic capacitance can be arbitrarily adjusted, so as to meet the required touch input speed.

(4. Time-Sharing Driving Between Voltage Application to Second Touch Sensing Wiring 7 and Touch Sensing Operation)

Hereinafter, a time point at which the reset voltage Vr is applied to the second touch sensing wiring 7, and a time point at which the touch sensing driving is performed will be described.

Figure 12:
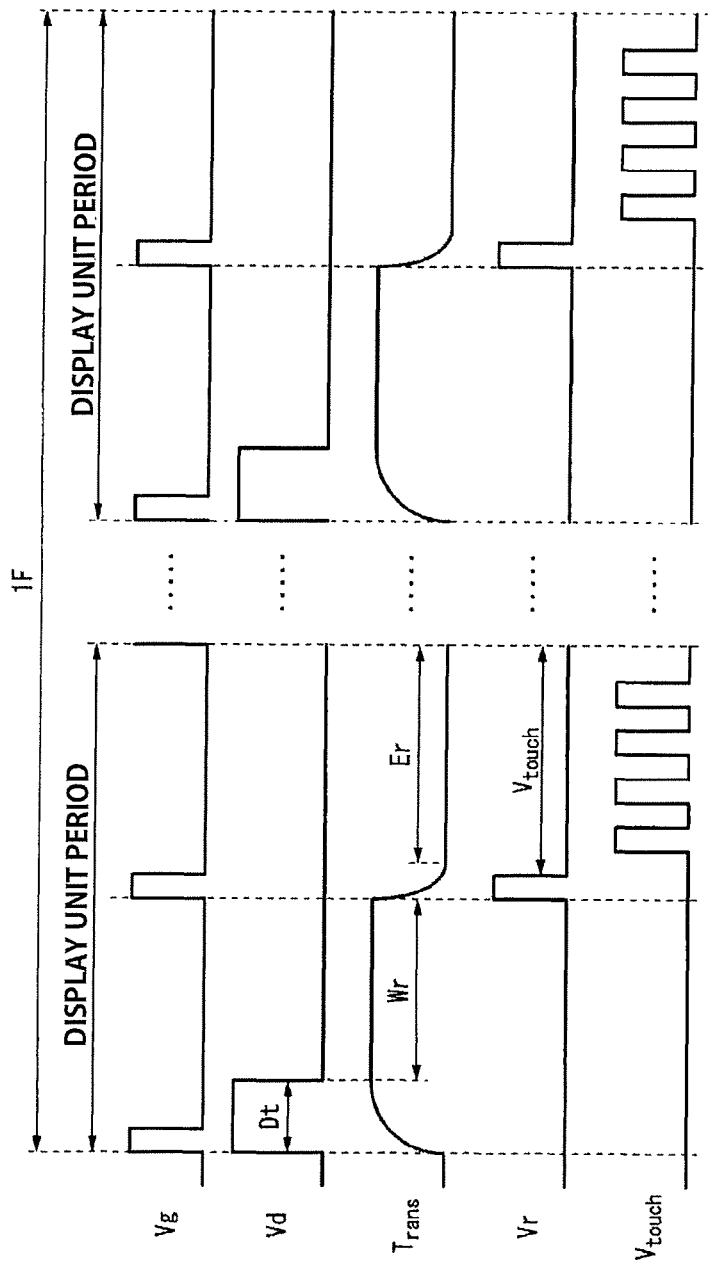
FIG. 12 is a signal timing diagram showing the liquid crystal display device according to the first embodiment of the present invention, that is, illustrating an ON/OFF timing of the liquid crystal of the liquid crystal voltage and timing of the touch sensing driving.

FIG. 12 is a signal timing diagram showing the liquid crystal display device LCD1 according to the embodiments of the present invention, that is, showing an example of waveforms such as signals when liquid crystal driving and touch sensing driving are performed in a time-sharing manner.

The display period shown in FIG. 12 corresponds to one frame period (1F). For example, in the display period, image-writing corresponding to 60 Hz is performed. FIG. 12 illustrates timings, where a white display (liquid crystal drive voltage, ON) and the black display (liquid crystal drive voltage, OFF) are performed in one pixel unit period (one display unit period) during the one frame period.

The following description addresses the case where a gate signal is supplied to the first gate wiring 10 among the first and second gate wirings 10 and 9, an image signal is supplied to the first source wiring 14 among the first source and second source wirings 14 and 15, to drive the first active element 28a and write the image to the pixel electrode 17.

When the second active element 28b is driven, the gate signal is supplied to the second gate wiring 9 and the image signal is supplied to the second source wiring 15, whereby the image is written into the pixel electrode 17.

In FIG. 12, the reference sign Vg represents a signal (gate signal) supplied to the first gate wiring 10 and the signal waveform. The reference sign Vd represents a signal (image signal) supplied to the first source wiring 14 (image signal) and the signal waveform. The reference sign $T_{rans}$ shows a state where the first active element 28*a* is writing image to the pixel electrode 17. Specifically, the reference sign $T_{rans}$ shows the transmittance of liquid crystals. The reference sign Vr represents a signal applied to the second touch sensing wiring 7 and the signal waveform. The reference sign $V_{touch}$ represents a signal of the touch sensing drive voltage and the signal waveform.

In a display unit period, the signal Vg is supplied to the first gate wiring 10 twice at regular intervals. When the image is written into the pixel electrode 17 through the active element 28*a*, the signal Vd is supplied to the first source wiring 17, synchronized to the signal Vg. Thus, the first active element 28*a* turns ON, and starts writing an image into the pixel electrode 17. As the liquid crystal molecules of the horizontal alignment rotate, the transmittance $T_{rans}$ increases. The signal Vd is continuously supplied to the first source wiring 14 until the transmittance $T_{rans}$ reaches a specified level. Thereafter, a white display is maintained. A period Dt where the signal Vd is supplied refers to a period where the liquid crystal drive voltage is applied. Once the transmittance $T_{rans}$ reaches the specified level, the transmittance $T_{rans}$ is maintained during a stable white display period Wr. The stable white display period refers to a period where the transmittance of a white display is stable (constant). After that, when the reset voltage Vr is applied to the second touch sensing wiring 7, the alignment of the liquid crystal molecules rapidly resumes with the initial alignment so as to be oriented to the reset electric field shown in FIG. 9. Then the transmittance $T_{rance}$ decreases and thereafter, display is brought into a black display state. The reference sign Er shown in FIG. 12 represents a black display stable period, where the transmittance of the black display is stable (constant). During the black display stable period, the signal $V_{touch}$ is generated in a pulse-like shape, the touch sensing drive voltage is applied to the second touch sensing wiring 7, and the first touch sensing wiring 3 detects the touch sensing signal. In the case where the first touch sensing wiring 3 serves as the touch drive wiring, and when the signal $V_{touch}$ is generated, the touch sensing drive voltage is applied to the first touch sensing wiring 3 and the second touch sensing wiring 7 detects the touch sensing signal.

In other words, the control unit 120 applies the reset voltage to the second touch sensing wiring 7, after completion of applying the liquid crystal drive voltage to the pixel electrode 17 and when the liquid crystal drive voltage is not being applied to the pixel electrode 17.

It should be noted that the stable white display period Wr varies depending on types of the semiconductor material that constitutes the channel layer 27 of the first active element 28*a*. For example, in the case where the first active element 28*a* having the channel layer 27 is formed of an oxide semiconductor, the period for applying the signal Vd can be shortened so that the first active element 28*a* can favorably hold the voltage even after elapse of the period Dt. Hence, high transmittance can be maintained. The relationship between the signal Vd and the transmittance $T_{rance}$ will be described later.

The time point at which the reset voltage Vr is applied to the second touch sensing wiring 7 is any one of timings described as below.

(1) Timing after performing image-writing for one pixel (after image display in the display unit period)
(2) Timing after performing image-writing for one horizontal line
(3) Timing after performing image-writing for one vertical line
(4) Timing after performing image-writing for one frame.

In the case where the liquid crystal display device is driven with a dot inversion driving method, the reset voltage is preferably applied to the second touch sensing wirings 7 in the respective pixel electrodes, after the image-writing is performed for the pixel electrodes. The display unit period refers to a period including the period of image-wiring and resetting for one pixel, when dot inversion driving is performed, or refers to a period including the period of image-writing and resetting for one horizontal line, when one horizontal line driving is performed, or refers to a period including the period of image-writing and resetting for one screen, when frame inversion is performed for the one screen.

The timing for applying the reset voltage Vr can be set after such a display unit period is elapsed and when the liquid crystal display voltage is turned OFF (voltage is applied to the conductive wiring after completion of applying the liquid crystal drive voltage to the pixel electrode and when the liquid crystal drive voltage is not being applied to the pixel electrode). Alternatively, the touch sensing driving can be performed during the stable white display period Wr (stable period of image display). Specifically, according to the present embodiment, the touch sensing driving is performed with the first touch sensing wiring and the second touch sensing wiring during at least either a stable period of the image-display or the black display stable period after the image-display is performed.

For frequency of occurrence of noise produced when the image is written to the pixels, the frequency of occurrence in dot inversion driving performed for some of pixels, such as one vertical line inversion driving (column inversion driving), is lower than that of the frequency of occurrence in dot inversion driving performed for individual pixel.

As described, one pixel unit period is composed of a white display (ON) period and a black display (OFF) period. The reset voltage Vr is applied to the second touch sensing wiring 7, synchronizing with the signal of the black display (OFF). In FIG. 12, the touch sensing period $T_{touch}$ is defined as a period from a time point when the reset voltage Vr is applied to the second touch sensing wiring 7 to a time point when the next Vg signal becomes active. In other words, in FIG. 12, the touch sensing period $T_{touch}$ is set in the black display stable period Er which follows application of the reset voltage Vr to the second touch sensing wiring 7. Any one of the timing for applying the reset voltage to the second touch sensing wiring 7, the timing for applying the signal to the first source wiring 14, and the timing for applying the gate signal to the first gate wiring 10 can be delayed by 20 nsec to 2 msec using a delay circuit so as to prevent noise from being superposed on the touch sensing operation.

When comparing an active element (thin film transistor) provided with a channel layer, for example, formed of an oxide semiconductor such as IGZO, with an amorphous semiconductor provided with a channel layer, for example, formed of an amorphous semiconductor, there is a significant difference in the transmittance $T_{trans}$ of the pixels (liquid crystal display device).

When the channel layer is formed of an oxide semiconductor, the transmittance $T_{trans}$ rapidly rises as shown in FIG. 12, after the image-writing is performed with the active element.

In the case where the channel layer is formed of an amorphous semiconductor, after the image-writing is performed by the active element, the transmittance $T_{trans}$ gradually rises as shown in FIG. 13.

Therefore, when the channel layer is formed of an amorphous semiconductor, leakage current of the transistor increases. To compensate voltage drop due to the leakage current, it is required to continuously apply the signal Vd (liquid crystal drive voltage) to the first source wiring 14 during the stable white display period Wr.

When the channel layer is formed of an oxide semiconductor, voltage is retained with the leakage current being around 3 orders of magnitude lower than that of the amorphous semiconductor. Accordingly, the period Dt for applying the liquid crystal drive voltage can be shortened. The touch sensing frequency of the touch sensing period $T_{touch}$ is required to be higher than the liquid crystal drive frequency. This is because the timing of the touch sensing is irregular and only lasts for a short period of time. Therefore, to avoid undetected sensing, the touch sensing frequency (detection frequency) is preferably high.

When the touch sensing driving is performed with high frequency, and an integrated value of the touch sensing signal is obtained, stable touch sensing detection can be performed. To reduce the amount of noise affecting the touch sensing signal, detection of the touch sensing signal is preferably avoided at a timing immediately after the liquid crystal drive voltage is turned ON and OFF for performing the image-writing with the active element. Accordingly, the touch sensing signal can be detected during a stable white display period Wr where the transmittance of a white display is stable (constant) and a black display stable period Er where the transmittance of the black display is stable (constant).

As shown in the timing diagram of FIG. 12, in the black display stable period Er, the touch sensing signal is detected with high frequency. During the black display stable period Er, emission from the light emitting element, such as LED, of the back light unit BU can be stopped.

Also, for the 3D display (stereo image display) which switches between the right-eye image and the left-eye image, a black display which is performed when the right-eye image and the left-eye image are switched, may be performed during the black display stable period Er after application of the reset voltage Vr to the second touch sensing wiring 7.

The above-described liquid crystal display device LCD1 can provide a liquid crystal display device provided with a touch sensing function, capable of being driven with low power consumption, and reducing occurrence of flickers.

Further, according to the embodiments of the present invention, the potential of the common electrode 20 (common wiring 36) is not required to be inverted, but can be set to a constant voltage such as zero volts. Moreover, the potential of the image signal in the source wiring is not required to be inverted to positive or negative. Therefore, noise affecting the touch sensing driving can be greatly reduced. Since the light shielding layer shields light incident on the active elements, occurrence of noise induced by the active elements can be reduced.

Furthermore, comparing to the conventional liquid crystal display device in which the potential is inverted to positive or negative, amplitude (range of the maximum voltage) of the potential supplied to the source wiring can be halved. Therefore, a driver having high breakdown voltage does not have to be used so that cost of the driver can be lowered. Since the amplitude of the potential (voltage) supplied to the source wiring is halved, the power consumption related to the touch sensing operation can be greatly reduced.

Second Embodiment

The liquid crystal display device according to the second embodiment will be described with reference to FIGS. 1, 12 and 16 to 28.

According to a liquid crystal display device LCD2, a transparent electrode is provided on the display device substrate 100, liquid crystal molecules having negative dielectric anisotropy constitute the liquid crystal layer 300, and the common electrode 20 is not provided on the array substrate 200. Hence, a vertical electric field method is used for the liquid crystal display device LCD2. In the method, vertical electric field is applied to the liquid crystal layer 300 sandwiched between the transparent electrode and the pixel electrode, thereby driving the liquid crystal layer 300. Further, the liquid crystal driving is controlled by the first active element 28a and the second active element 28b which are connected to the pixel electrode 17.

In the liquid crystal display device LCD2, the image signal timing control unit 121 shown in FIG. 1 allows the transparent electrode 2 (a plurality of transparent electrode patterns described later) provided on the display device substrate 100 to have specified potential, and transmits signals to the gate wirings 9 and 10 (scanning line described later) and the source wirings 14 and 15 (signal line, described later). The image signal timing control unit 121 applies the liquid crystal drive voltage, which is used for display on the pixel electrode 17 (described later), across the transparent electrode 2 and the pixel electrodes 17 in the lamination direction Z, thereby performing liquid crystal driving which drives liquid crystal molecules in the liquid crystal layer 300. Thus, image is displayed on the array substrate 200. The transparent electrode 2 is set to be a specified potential, and the plurality of pixel electrodes 17 are individually applied with, for example, an image signal having alternating current (AC) pulse waves via the source wiring (signal line). The pulse waves may be positive or negative direct current (DC) pulse waves.

Figure 16:
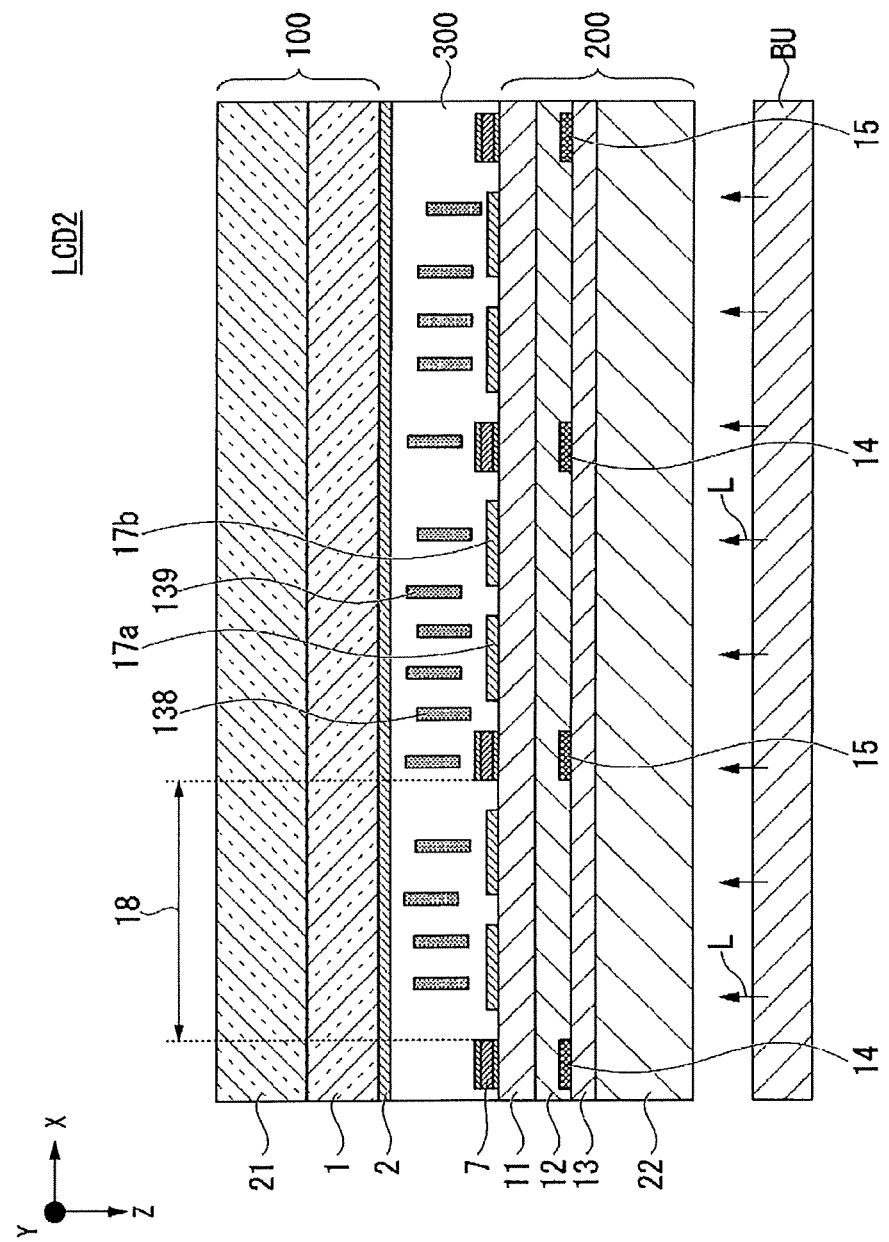
FIG. 16 is a cross-sectional view sectioned across the H-H' line of FIG. 17, showing a part of a liquid crystal display device according to a second embodiment of the present invention.

FIG. 16 is a cross-sectional view showing a part of the liquid crystal display device LCD2 according to the present embodiment. FIG. 16 is a cross-sectional view sectioned across the line H-H' of FIG. 17, that is, a cross-sectional view along the short side of the pixel openings.

The liquid crystal display device LCD2 is provided with a display device substrate 100 (counter substrate) and an array substrate 200 laminated to face the display device substrate 100, and a liquid crystal layer 300 sandwiched between the display device substrate 100 and the array substrate 200.

The display device substrate 100 is provided with a transparent substrate 21, and a transparent resin layer 1 and a transparent electrode 2 which are disposed on the transparent substrate 21. Further, the first touch sensing wiring 3 (touch detection wiring or touch drive wiring) located in a depth direction of the drawing sheet of FIG. 16 is formed on the display device substrate 100. The first touch sensing wiring 3 is shown by a reference sign 3 of FIGS. 17 and 27. The first touch sensing wiring 3 is composed of a first black layer 8 (black layer) formed on the transparent substrate 21 and a first metal layer 5 (metal layer) formed on the first black layer 8.

The array substrate 200 is provided with a transparent substrate 22, a third insulation layer 13 formed on the transparent substrate 22, source wirings 14 and 15 formed on the third insulation layer 13, a second insulation layer 12 formed on the third insulation layer 13 to cover the source wirings 14 and 15, and the first insulation layer 11 formed on the second insulation layer 12. Further, the array substrate 200 is provided with a plurality of pixel electrodes 17 formed on the first insulation layer 11, a second touch sensing wiring 7 formed on the first insulation layer 11 so as to be located between the plurality of pixel electrodes 17 (having electrodes 17a and 17b).

The plurality of pixel electrodes 17 are formed on a surface nearest the liquid crystal layer 300. The second touch sensing wiring 7 is formed extending in the direction (Y-direction) vertical to the drawing sheet of FIG. 16 and in parallel to the source wirings 14 and 15. The second touch sensing wiring 7 is configured to have at least a second metal layer (metal layer).

The second metal layer that constitutes the second touch sensing wiring 7 is a containing layer that contains copper, for example, a copper layer or a copper alloy layer. The second touch sensing wiring 7 may have a configuration in which the second metal layer is sandwiched between two conductive metal oxide layers.

Figure 17:
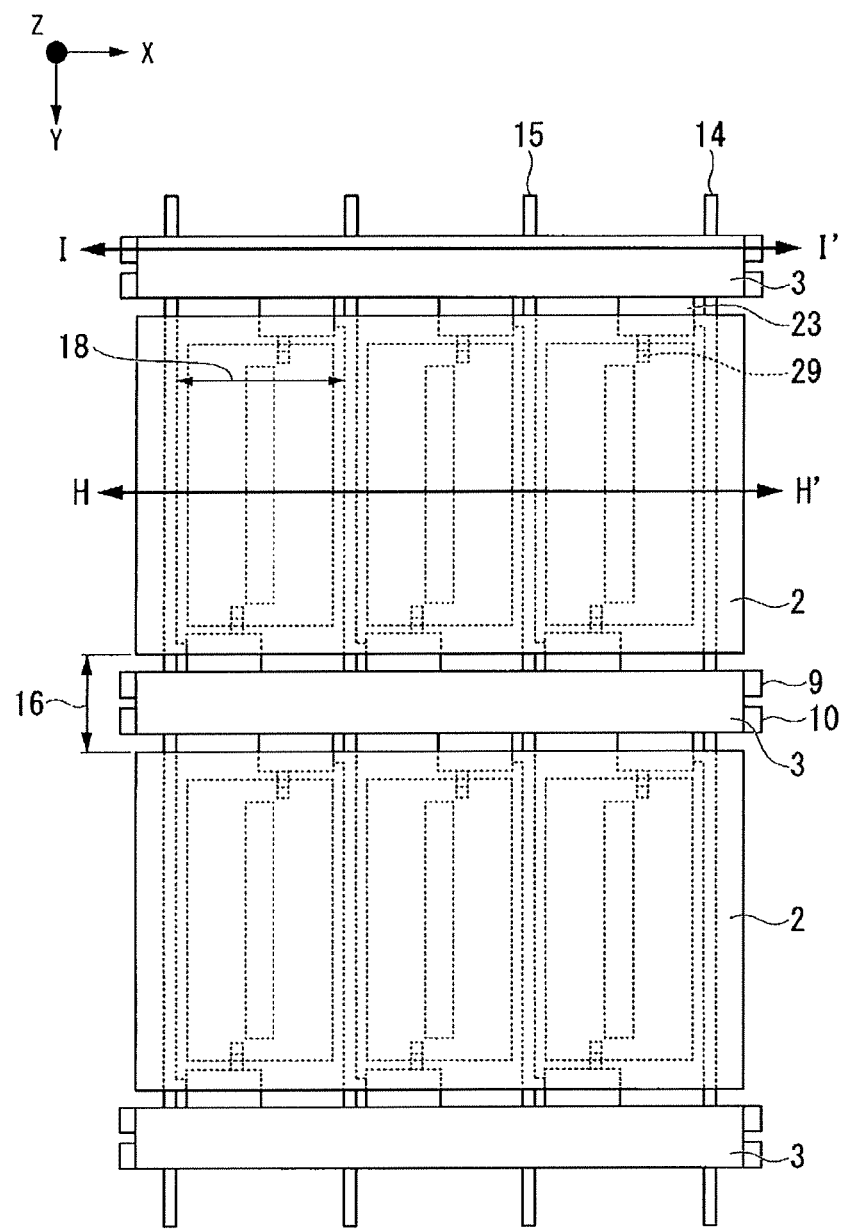
FIG. 17 is a plan view showing a pixel structure of the liquid crystal display device as viewed from the viewer direction, according to the second embodiment of the present invention.

The pixel openings 18 correspond to regions in the X-direction located between adjacent second touch sensing wirings 7 (regions in the X-direction located between adjacent source wirings 14 and 15). As shown in FIG. 17, the pixel openings 18 in the Y-direction are each located between adjacent first touch sensing wirings 3.

FIG. 16 omits an alignment film which imparts the initial alignment to the liquid crystal layer 300, optical films such as a deflection film and a phase-difference film, a protective cover glass or the like. The deflection film is attached to each of the front surface and the back surface of the liquid crystal display device LCD2, so that crossed Nicols positional relationship is established between the optical axes.

The liquid crystal layer 300 includes liquid crystal molecules 138 and 139 having negative dielectric anisotropy. The initial alignment of the liquid crystal molecules 138 and 139 is perpendicular to the substrate surface of the display device substrate 100 or the array substrate 200. The vertical alignment of the liquid crystal molecules refers to an inclination approximately in a range from 0° to 5° with respect to the normal direction of the substrate surface, that is, refers to a pretilt angle. The above-described light alignment process is used as a method for forming the pretilt angle, and the alignment process can be applied to an alignment film material such that the liquid crystal molecules have any small pretilt angle, for example, from 0.1° to 1.5°. From a viewpoint of obtaining better black displays, the inclination (pretilt) of the initial alignment of the liquid crystal molecules is preferably a small inclination which is approximate to the normal direction.

FIG. 17 is a partial plan view showing the liquid crystal display device LCD2 according to the present embodiment. FIG. 17 omits illustration of the above-described transparent substrate 21 and the transparent resin layer 1.

The transparent electrode 2 is made of, for example, a conductive metal oxide such as ITO. The transparent electrode 2 is formed into a stripe pattern (strip shape) in plan view. A slit 16 is formed between adjacent transparent electrodes 2 each having a strip shape. The first touch sensing wiring 3 is located between the strip-shaped transparent electrodes 2. The gate wirings 9 and 10 shown in FIG. 17 are located in a bottom portion (in Z-direction) of the first touch sensing wiring 3. The gate wirings 9 and 10 are provided extending in parallel to the first touch sensing wiring 3, and located at almost the same position as the first touch sensing wiring 3 in plan view. It should be noted that the first touch sensing wiring 3 is disposed on the transparent substrate 21 of the display device substrate 100. The gate wirings 9 and 10 are disposed on the transparent substrate 22 of the array substrate 200.

Figure 18:
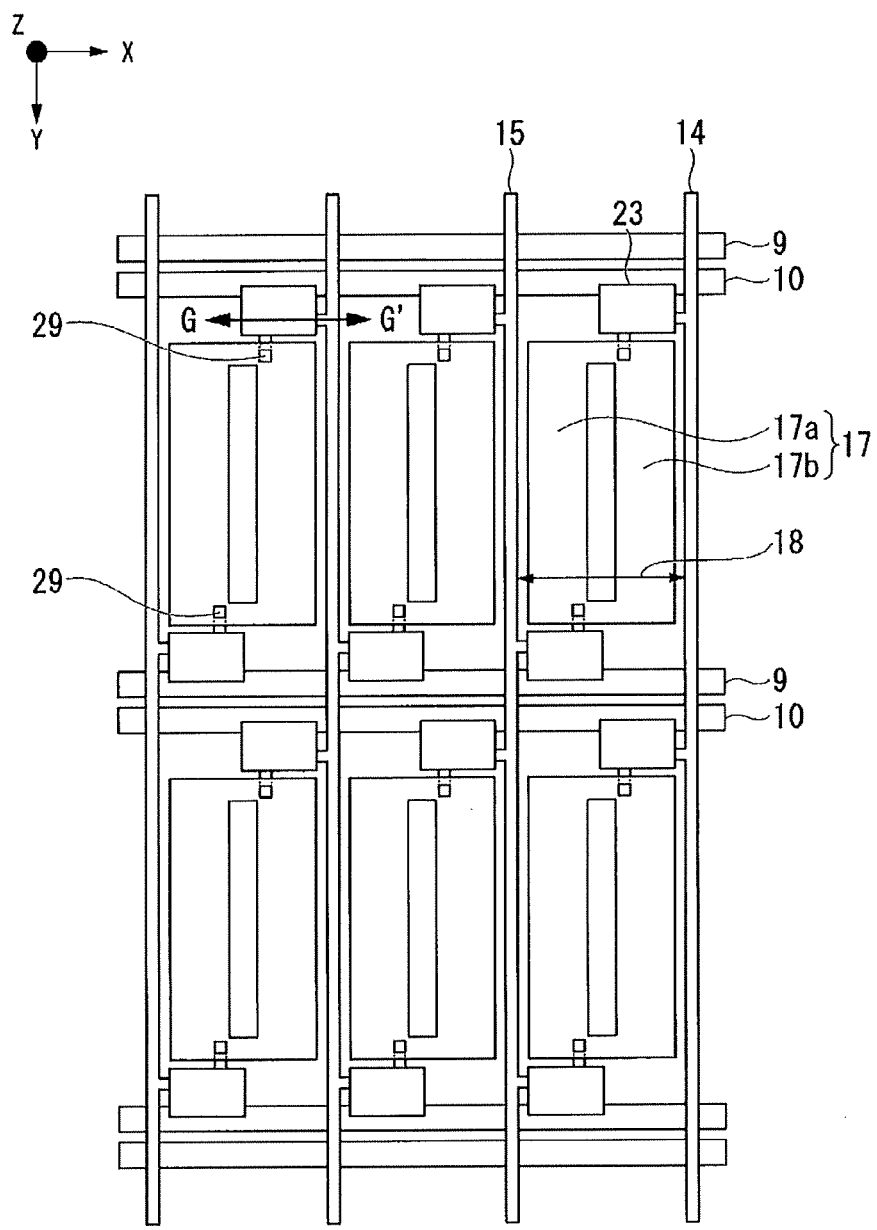
FIG. 18 is a plan view showing a part of an array substrate the liquid crystal display device as viewed from the viewer direction, according to the second embodiment of the present invention.

FIG. 18 is plan view showing a part of the array substrate 200 when the liquid crystal display device LCD2 according to the present embodiment is viewed from the viewer side.

For the sake of clarity, FIG. 18 omits illustration of the above-described display device substrate 100 and the second touch sensing wiring 7.

In the pixel opening 18, electrodes 17a and 17b are provided that constitute the pixel electrode 17. The second touch sensing wiring 7 (not shown, see FIG. 16) and a light shielding layer 23 (light shielding pattern) formed of the same layer as the metal layer that constitutes the second touch sensing wiring 7 are provided on the array substrate 200. The second touch sensing wiring 7 and the light shielding layer 23 are electrically isolated. The source wirings 14 and 15 are located in a bottom portion (in Z-direction) of the second touch sensing wiring 7 shown in FIG. 18. The source wirings 14 and 15 are provided extending in parallel to the second touch sensing wiring 7, and located at almost the same position as the second touch sensing wiring 7 in plan view.

Each of the pixel electrodes 17 has a pixel electrode pattern in which the transparent conductive film positioned in the center of the pixel electrode 17 is removed in a slit shape along the longitudinal direction. The pixel electrode 17 includes electrodes 17a and 17b having a shape conforming to the pixel electrode pattern. The electrodes 17a and 17b that constitute the pixel electrode 17 are electrically connected to each other. The electrodes 17a and 17b of the pixel electrode 17 are electrically connected to the drain electrode 26 of the active element 28 shown in FIG. 19 via a contact hole 29.

Similar to the above-described first embodiment, two active elements, that is, first active element 28a and the second active element 28b are connected to the pixel electrode 17. Hence, in one pixel, the pixel electrode 17 has two contact holes 29, and a drain electrode 26 that constitutes the first active element 28a and a drain electrode 26 that constitutes the second active element 28b are connected to the pixel electrode 17 via the contact holes 29.

Figure 19:
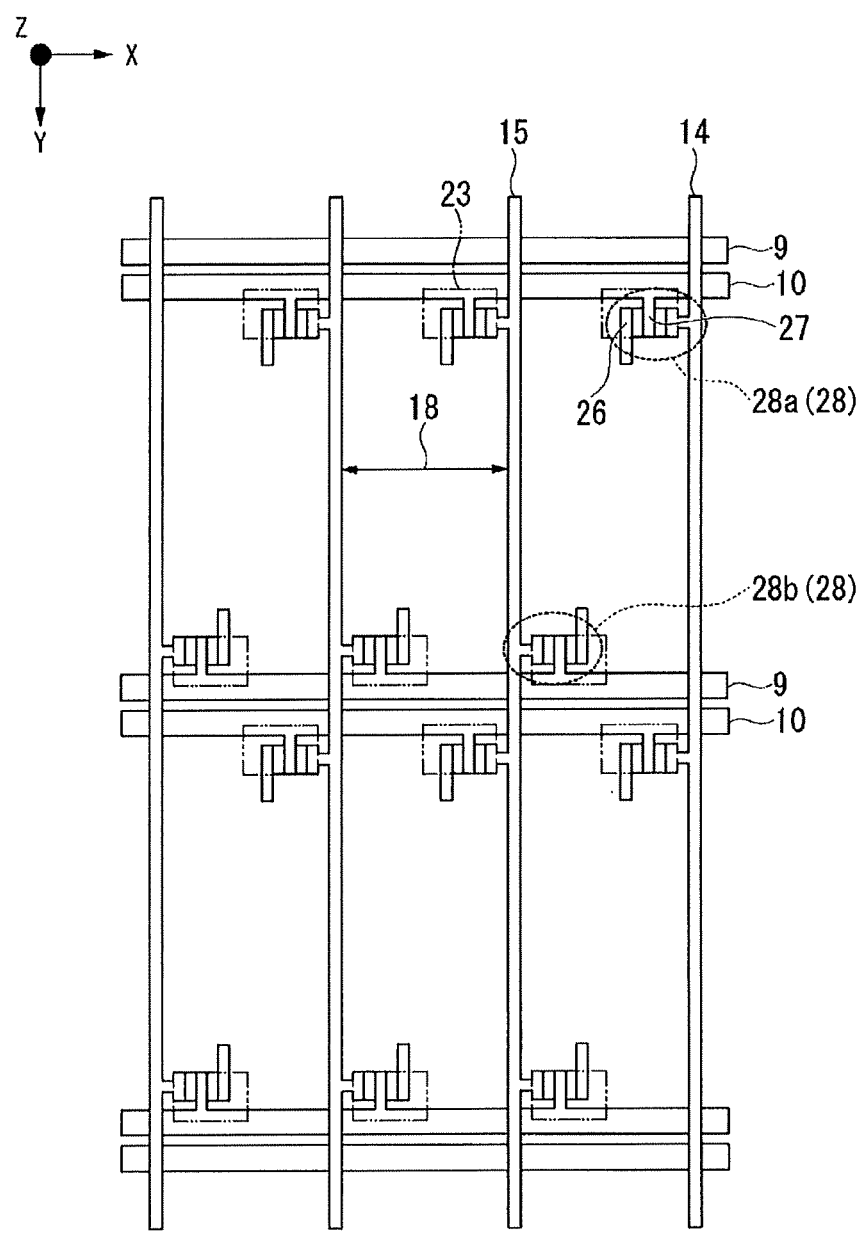
FIG. 19 is a plan view showing a part of an array substrate of the liquid crystal display device as viewed from the viewer direction, according to the second embodiment of the present invention, that is, illustrating an example of an arrangement of active elements, gate wirings and source wirings, excluding the display device substrate, the second touch sensing wiring, the light shielding layer and the pixel electrode.

FIG. 18 is plan view showing a part of the surface of the array substrate 200 when the liquid crystal display device LCD2 is viewed from the viewer side. For the sake of clarity, FIG. 19 omits illustration of the above-described display device substrate 100, the pixel electrode 17, the second touch sensing wiring 7 and the light shielding layer 23. In other words, FIG. 19 is a plan view showing a part of an example of arrangement of the active elements 28 (28a, 28b), the gate wirings 9 and 10, and the source wirings 14 and 15. In FIG. 19, the location of the light shielding layer 23 is shown by two dot chain line.

The pixel opening 18 is formed in a rectangular shape which is a kind of polygonal shape. The source wirings 14 and 15 orthogonally intersect the gate wirings 9 and 10 in plan view, to form a matrix pattern along the sides of the pixel openings 18. The channel layer 27 is located in the center portion of the active element (TFT).

Figure 20:
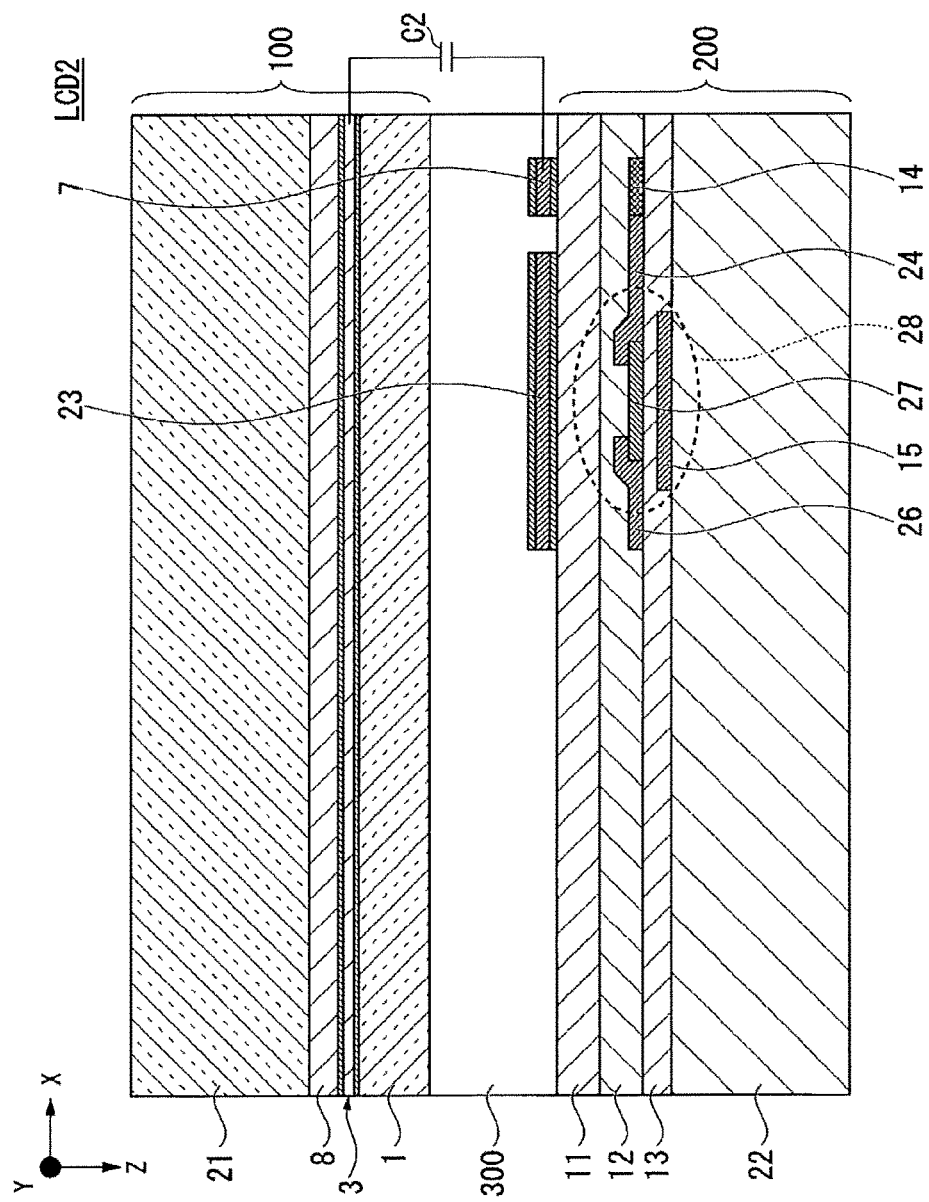
FIG. 20 is a cross-sectional view sectioned across the G-G' line of FIG. 18, showing a part of the liquid crystal display device according to the second embodiment of the present invention, in which a light shielding layer (light shielding pattern) is provided on the channel layer of the active element.

FIG. 20 is a cross-sectional view sectioned across the G-G' line of FIG. 18, showing a part of the liquid crystal display device LCD2 according to the second embodiment of the present invention.

As shown in FIG. 20, the active element 28 is covered with the light shielding layer 23 which is a second metal layer. Specifically, the active element 28 is a thin film transistor having a source electrode 24 connected to the source wirings 14 and 15, a gate electrode 25 connected to the gate wirings 9 and 10, and the channel layer 27 formed of semiconductor. The width of the light shielding layer 23 in the X-direction is set such that the active element 28 is covered with the light shielding layer 23 in plan view.

By covering the channel layer 27 with the light shielding layer 23, effect similar to the first embodiment can be obtained.

The second metal layer is a metal layer formed on the surface of the array substrate 200, forming the second touch sensing wiring 7 and the light shielding layer 23. The first metal layer is arranged above the display device substrate 100 (above the first black layer 8), forming the first touch sensing wiring 3 (serving as a touch drive wiring or touch detection wiring). These first metal layer and the second metal layer may be made of the same metal material, or may be made of different metal materials. Materials preferably used for the first metal layer and the second metal layer include good conductors made of copper, aluminum, or an alloy containing these metals. It should be noted that an organic insulation layer or an inorganic insulation layer may be formed as a layer (under layer) located under the first metal layer or the second metal layer, before forming the first metal layer and the second metal layer. The organic insulation layer or the inorganic insulation layer may be formed so as to cover the first metal layer and the second metal layer, after the patterning of the first touch sensing wiring and the second touch sensing wiring.

Figure 21:
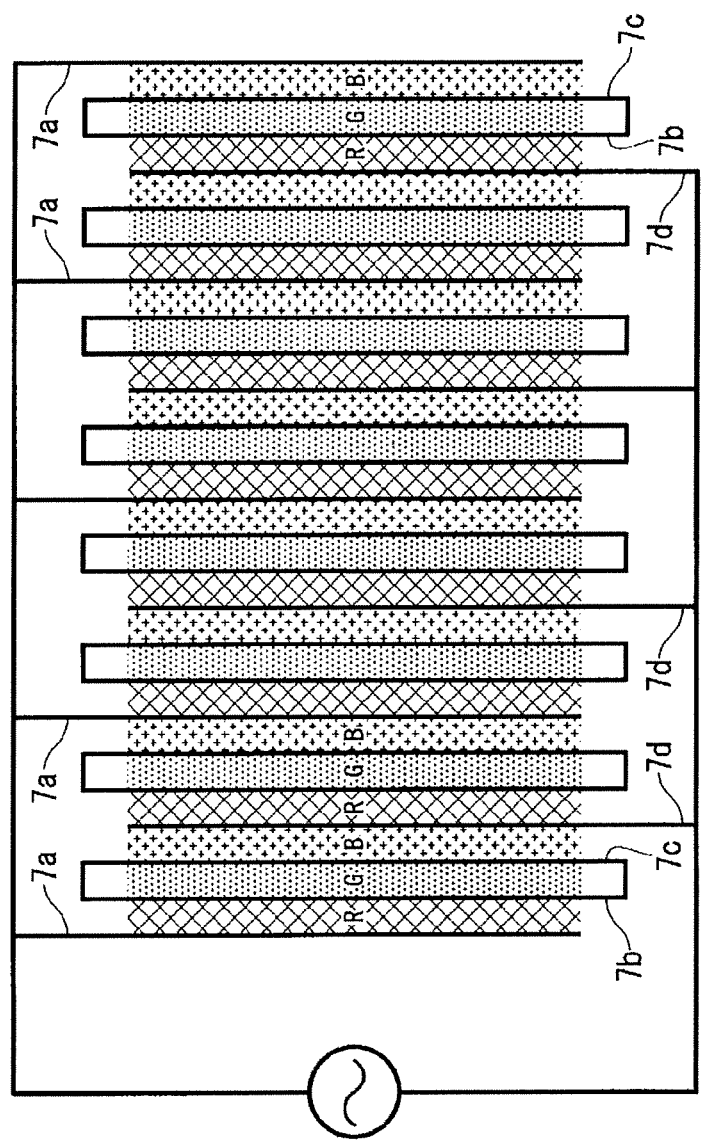
FIG. 21 is a plan view schematically showing second touch sensing wirings according to the second embodiment of the present invention, that is, illustrating the second touch sensing wirings to which the reset voltage is applied.

FIG. 21 is a plan view schematically showing the second touch sensing wiring according to the embodiments of the present invention, that is, illustrating the second touch sensing wiring to which the reset voltage is applied.

FIG. 21 omits illustration of the array substrate 200 including the pixel electrode 17, the first insulation layer 11, but shows a positional relationship between the red filter R, the green filter G, and blue filter B which constitute the color filter.

As shown in FIG. 21, the second touch sensing wiring 7 is provided with a first wiring group including the first wiring 7a (first conductive wiring), a second wiring group including the second wiring 7d (second conductive wiring), and a dummy wiring group including dummy wirings 7b and 7c provided between the first wiring 7a and the second wiring 7d. The first wiring group and the second wiring group are formed into a comb-teeth shape in which two wiring groups mesh with each other.

Either positive or negative reset voltage Vr is applied to the first wiring group and the second wiring group. When the positive voltage is applied to one wiring group, the negative voltage is applied to the other wiring group. Alternatively, either one of the first and second wiring groups may be grounded (connected to the ground), and positive or negative voltage may be applied to the other wiring group. Also, the reset voltage may be AC or DC pulse waves.

Accordingly, as shown in FIG. 21, virtually, AC power source S (virtual power source) is taken to be connected to the first wiring group and the second wiring group. In this case, the reset voltage is AC voltage. In the first wiring group, since each of the plurality of first wiring 7a has an end portion, the first wiring 7a serves as an electrode (first conductive electrode). Similarly, in the second wiring group, since each of the second wiring 7d has an end portion, the second wiring 7d serves as an electrode (second conductive electrode).

The dummy wirings 7b and 7c have electrically floating potential (floating potential). In the dummy wiring group, the lower end of the dummy wiring 7b is electrically connected to the lower end of the dummy wiring 7c, and the upper end of the dummy wiring 7b is electrically connected to the upper end of the dummy wiring 7c.

The pattern shape of the dummy wirings 7b and 7c can be appropriately adjusted depending on the noise filter connected to the first wiring 7a and the second wiring 7d, the impedance, and the frequency used for touch sensing operation. The pattern shape of the dummy wirings 7b and 7c has to be determined considering frequencies of noise produced due to liquid crystal driving and noise externally entering the liquid crystal display device LCD2.

As shown in FIG. 21, the dummy wirings 7b and 7c form a loop antenna. The shape of the dummy wirings 7b and 7c is not limited to the loop antenna shape. For example, dipole antenna may be employed, which is configured by opening the lower ends of the dummy wirings. The dummy wirings 7b and 7c may have a monopole antenna shape. The width, length and pitch or the like of the dummy wirings 7b and 7c can be adjusted according to the purpose thereof.

The second touch sensing wiring 7 (first wiring group and the second wiring group) to which the reset voltage is applied as described above may serve as a touch detection wiring that detects touch sensing signal. In this case, the shape of the touch detection wiring is not necessarily a linear shape. As a structure of the touch detection wiring that favorably detects the touch sensing signal while being less likely to be affected by noise, the touch detection wiring (first wiring 7a and the second wiring 7d) may have an antenna structure. When the first touch sensing wiring 3 serves as a touch detection wiring that detects the touch sensing signal, the first touch sensing wiring 3 may have an antenna structure.

The touch detection wiring may have a loop antenna shape, a dipole antenna shape or a monopole antenna shape. For designing the line width of the wiring which constitutes the antenna, the length of the wiring, pitch of adjacent wirings, these values can be adjusted depending on the condition for the touch sensing detection, amount of noise around the portion where the touch sensing detection is performed. By using an antenna structure as the touch detection wiring, the touch detection wiring is unlikely to be affected by the noise frequency.

Further, the distance (for example in X-direction) between the first wiring 7a and the second wiring 7d to which the reset voltage Vr is applied is determined depending the width of the red filter R, the green filter G and the blue filter B which constitute the color filter and extend in a stripe shape. For example, in the design of the color filter, when the width of the blue filter B is set to be larger than the width of the green filter G, depending on the width thereof, the distance between the first wiring 7a and the second wiring 7d is determined. The wiring pattern of the second touch sensing wiring 7 which is determined relatively to the red filter R, the green filter G and the blue filter B shown in FIG. 21 is appropriately changed based on the design of the liquid crystal display device LCD2. According to the present invention, the wiring pattern of the second touch sensing wiring 7 is not limited.

Figure 27:
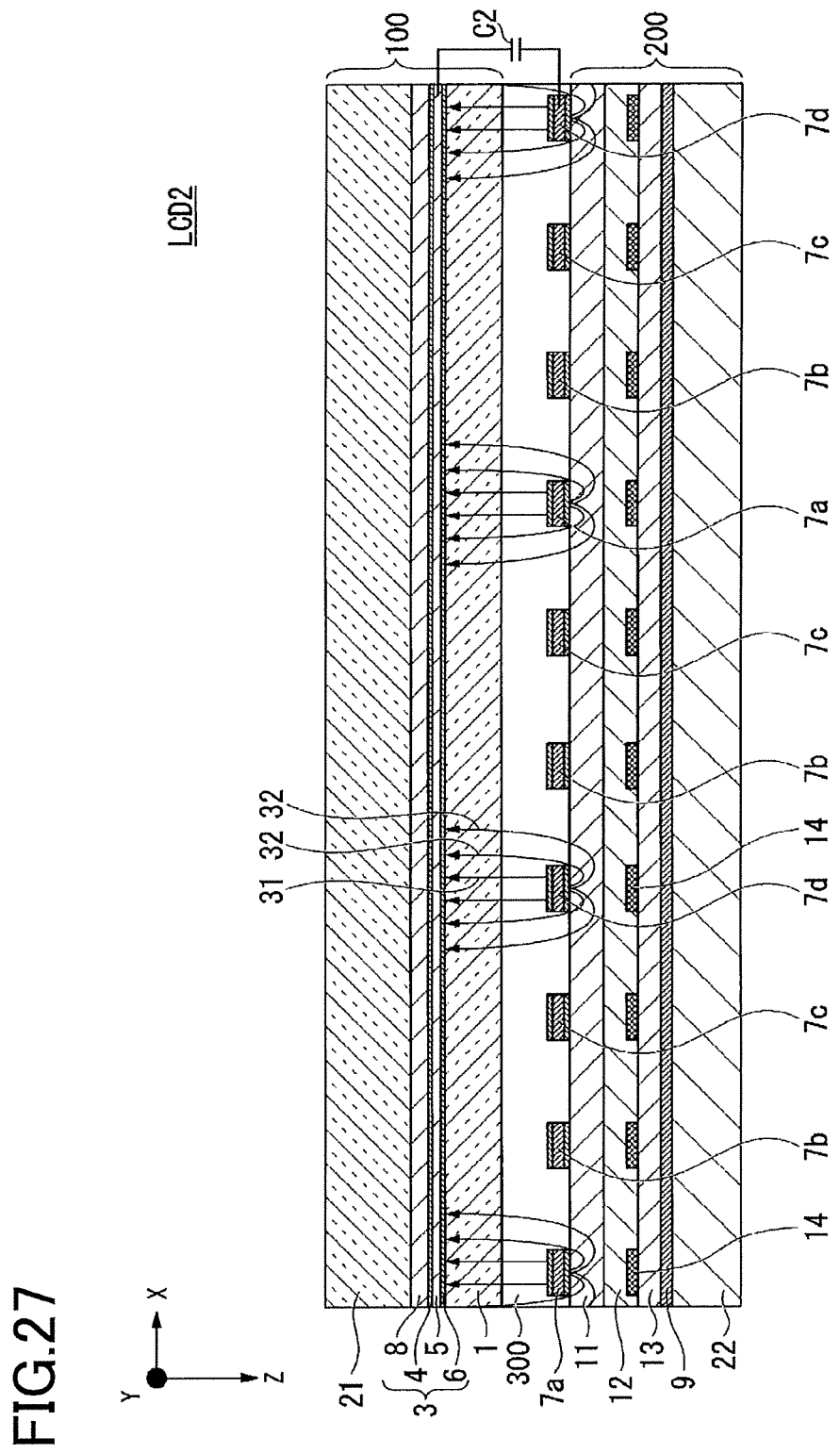
FIG. 27 is a cross-sectional view sectioned across the line I-I' of FIG. 17, showing a part of the liquid crystal display device according to the second embodiment of the present invention, that is, illustrating a state where the fringe electric field produced when the touch sensing drive voltage is applied between the first touch sensing wiring and the second touch sensing wiring.

Next, with reference to FIG. 27, the first touch sensing wiring 3 provided on the display device substrate 100 will be described. FIG. 27 is a cross-sectional view sectioned across the I-I' line of FIG. 17. As shown in FIG. 27, the first touch sensing wiring 3 at least includes the first black layer 8 and the first metal layer 5 which are formed on the transparent substrate 21.

The first touch sensing wiring 3 is provided with the first black layer 8 disposed on the transparent substrate 21, the second conductive metal oxide layer 4 disposed on the first black layer 8, the first metal layer 5 disposed on the second conductive metal oxide layer 4, and the first conductive metal oxide layer 6 disposed on the first metal layer 5. The first metal layer 5 is a copper containing layer, such as a copper layer or a copper alloy layer. Thus, the first touch sensing wiring 3 has a configuration in which the first metal layer 5 is sandwiched between the second conductive metal oxide layer 4 and the first conductive metal oxide layer 6. As described later, a black layer 19 (second black layer) may be formed on the first conductive metal oxide layer 6.

Figure 22:
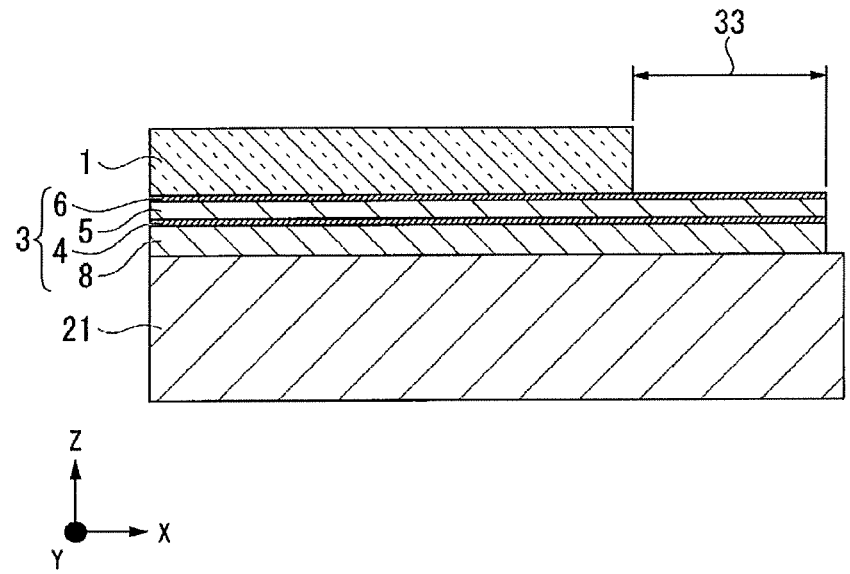
FIG. 22 is a cross-sectional view showing a part of the liquid crystal display device according to the second embodiment of the present invention, that is, illustrating a part of a terminal portion having a configuration in which a first metal layer is sandwiched between conductive metal oxide layers.

Next, with reference to FIG. 22, a structure of the first touch sensing wiring 3 in the end portion (terminal portion) of the display device substrate 100 will be described. FIG. 22 is a cross-sectional view showing a part of a terminal portion 33 having a structure in which the first metal layer 5 is sandwiched between the conductive metal oxide layers.

Figure 23:
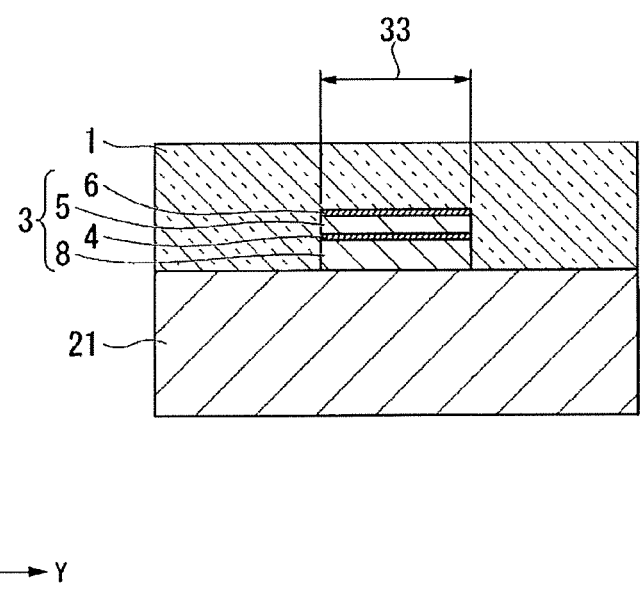
FIG. 23 is a cross-sectional view showing a part of the liquid crystal display device according to the second embodiment of the present invention, that is, illustrating a structure of the first touch sensing wiring.

FIG. 23 is a cross-sectional view of the touch sensing wiring shown in FIG. 22, showing the line width of the touch sensing wiring in the Y-direction. As shown in FIGS. 22 and 23, in the terminal portion 33 formed at the end portion of the transparent substrate 21, the second conductive metal oxide layer 4, the first metal layer 5 (copper alloy layer) and the first conductive metal oxide layer 6 are laminated in this order on the first black layer 8 formed on the transparent substrate 21. In other words, the first touch sensing wiring 3 has a three-layer structure. The transparent resin layer 1 is coated and formed, in plan view, on the transparent substrate 21 so as to have an area corresponding to the display surface having a rectangular shape. The transparent resin layer 1 is not formed on the terminal portion 33. The surface of the terminal portion 33 is covered with the first conductive metal oxide layer 6 which is exposed at the terminal portion 33. The terminal portion 33 is able to provide stable electrical connection.

A terminal portion is provided, in the end portion of the array substrate 200, corresponding to the terminal portion 33 of the display device substrate 100, in plan view. The terminal portion of the array substrate 200 is electrically connected to the terminal portion 33 of the display device substrate 100.

The electrical connection (conduction) between both terminal portions in the display device substrate 100 and the array substrate 200 can be accomplished by forming a conductive column (connection conductor) having a size of several μm to several tens of μm in a seal portion (seal portion) to seal the liquid crystal layer 300, for example.

Thus, the first touch sensing wiring 3 is connected, as shown in FIG. 1, to the touch sensing/reset signal control unit 122. Specifically, signals are received and transmitted between the touch sensing/reset signal control unit 122 and the first touch sensing wiring 3 through the conductive column provided between the terminal portion 33 of the display device substrate 100 and the terminal portion of the array substrate 200. Therefore, a display device substrate enabling a stable electrical mounting can be provided.

(Operation of the Liquid Crystal Display Device LCD2)

(1. Inversion Driving with Gate Wirings 9 and 10, Source Wirings 14 and 15)

In the liquid crystal display device LCD2, similar to the above-described first embodiment, an inversion driving is performed by the gate wirings 9 and 10 and the source wirings 14 and 15.

(2. Operation for Rapidly Resuming the Liquid Crystal Alignment to be Vertical Alignment by Applying Voltage to Second Touch Sensing Wiring 7)

Figure 24:
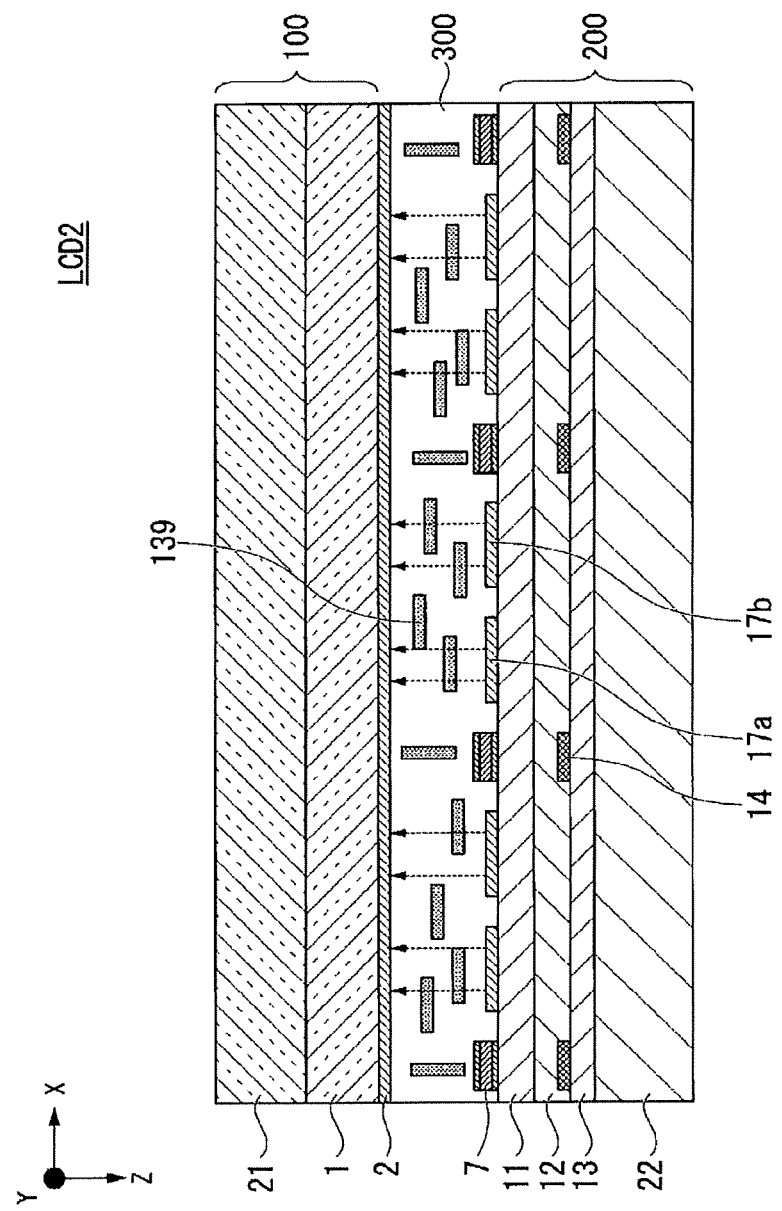
FIG. 24 is a cross-sectional view snowing a part of the liquid crystal display device according to the second embodiment of the present invention, that is, illustrating a part of a white display state when a liquid crystal display drive voltage is applied between the transparent electrode, which is a common electrode and the pixel electrodes.

FIG. 24 is a cross-sectional view showing a part of state of white display when the liquid crystal drive voltage is applied (liquid crystal drive voltage ON) between the transparent electrode 2 and the pixel electrode 17.

When the liquid crystal drive voltage is applied between the electrodes 17a and 17b of the pixel electrode 17 and the pixel electrode 17, electric field is produced between the pixel electrode 17 and the transparent electrode 2. Because of such an effect of the electric field, the liquid crystal molecules 139 are inclined, and fall in parallel to the substrate surface of the array substrate 200, whereby a white display is performed on the liquid crystal display device LCD2. It should be noted that the voltage is not applied to the second touch sensing wiring 7 when the liquid crystal drive voltage is ON.

Figure 25:
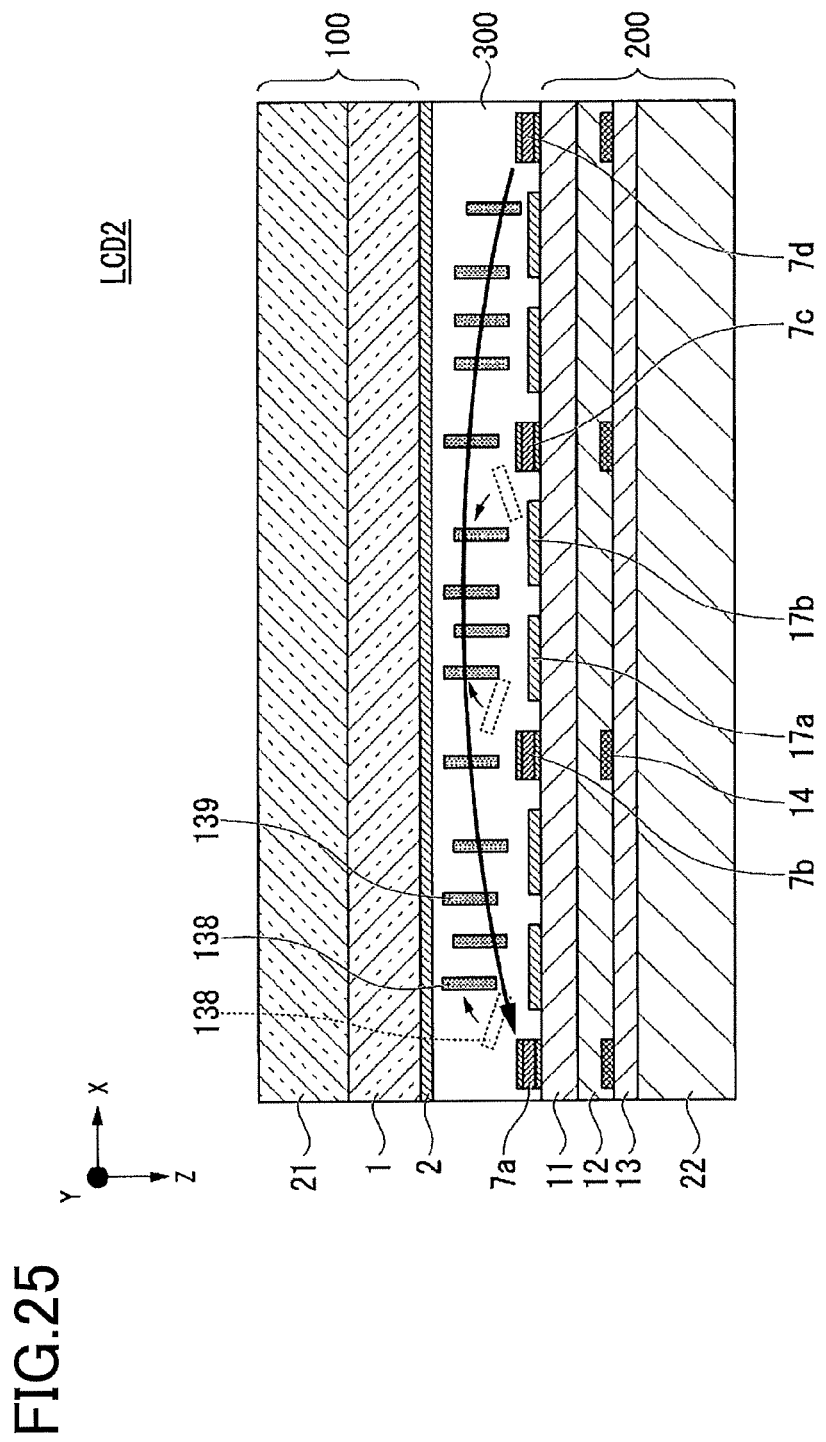
FIG. 25 is a cross-sectional view showing a part of the liquid crystal display device according to the second embodiment of the present invention, that is, illustrating recovery of the liquid crystal molecules when the reset voltage is applied between the second touch sensing wirings, immediately after stopping the application of the liquid crystal drive voltage (when liquid crystal drive voltage is off), and partially illustrating a state where the liquid crystals rapidly turn to a black display state.

FIG. 25 is a cross-sectional view showing a state where liquid crystal molecules are restored when the reset voltage is applied to liquid crystal molecules immediately after application of the liquid crystal drive voltage is stopped between the transparent electrode 2 and the pixel electrode 17. In FIG. 25, reset voltage is applied between two touch sensing wirings 7, that is, the first wiring 7a and the second wiring 7d. Thus, an electric field is produced between the first wiring 7a and the second wiring 7d (in a direction from the second wiring 7d toward the first wiring 7a) such that the alignment of the liquid crystal molecules fallen in parallel to the substrate surface of the array substrate 200 is rapidly resumed to be the vertical alignment. As a result, the liquid crystal display turns to a black display state from a white display state.

Specifically, when the liquid crystal drive voltage is turned OFF, the potential of the first wiring 7a is set to 0 volts (grounded) and the reset voltage is applied to the second wiring 7d, that is, the reset voltage is applied between the first wiring 7a and the second wiring 7d, whereby electric field is produced from the second wiring 7d to the first wiring 7a. In plan view, the electric field is produced in a direction that crosses the liquid crystal layer 300 located between the first wiring 7a and the second wiring 7d, and the source wirings 14 and 15. In this case, in the liquid crystal molecules 138 having negative dielectric anisotropy, the longitudinal axes of the molecules become perpendicular relative to the applied electric field direction. Therefore, as shown in FIG. 25, the liquid crystal molecules 138 are vertically aligned, which is the initial alignment so that a black display state can be obtained in a short period of time.

The reset voltage applied between the first wiring 7a and the second wiring 7d may be set to be lower than the liquid crystal drive voltage (e.g., 6 volts), or the same voltage as the liquid crystal drive voltage. Since the threshold voltage enabling the liquid crystal molecules to move is set to, for example, 0.5 V to 6 V, the reset voltage may be set to fall within a range from 0.5 V to 6 V (liquid crystal drive voltage). The reset voltage is used for rapidly restoring the alignment of the liquid crystal molecules fallen in parallel to the substrate surface, to the vertical alignment (initial alignment). Hence, the reset voltage can be lowered. The reset voltage is applied between the first wiring 7a and the second wiring 7d, whereby time $\tau_{OFF}$ can be significantly shortened.

Figure 26:
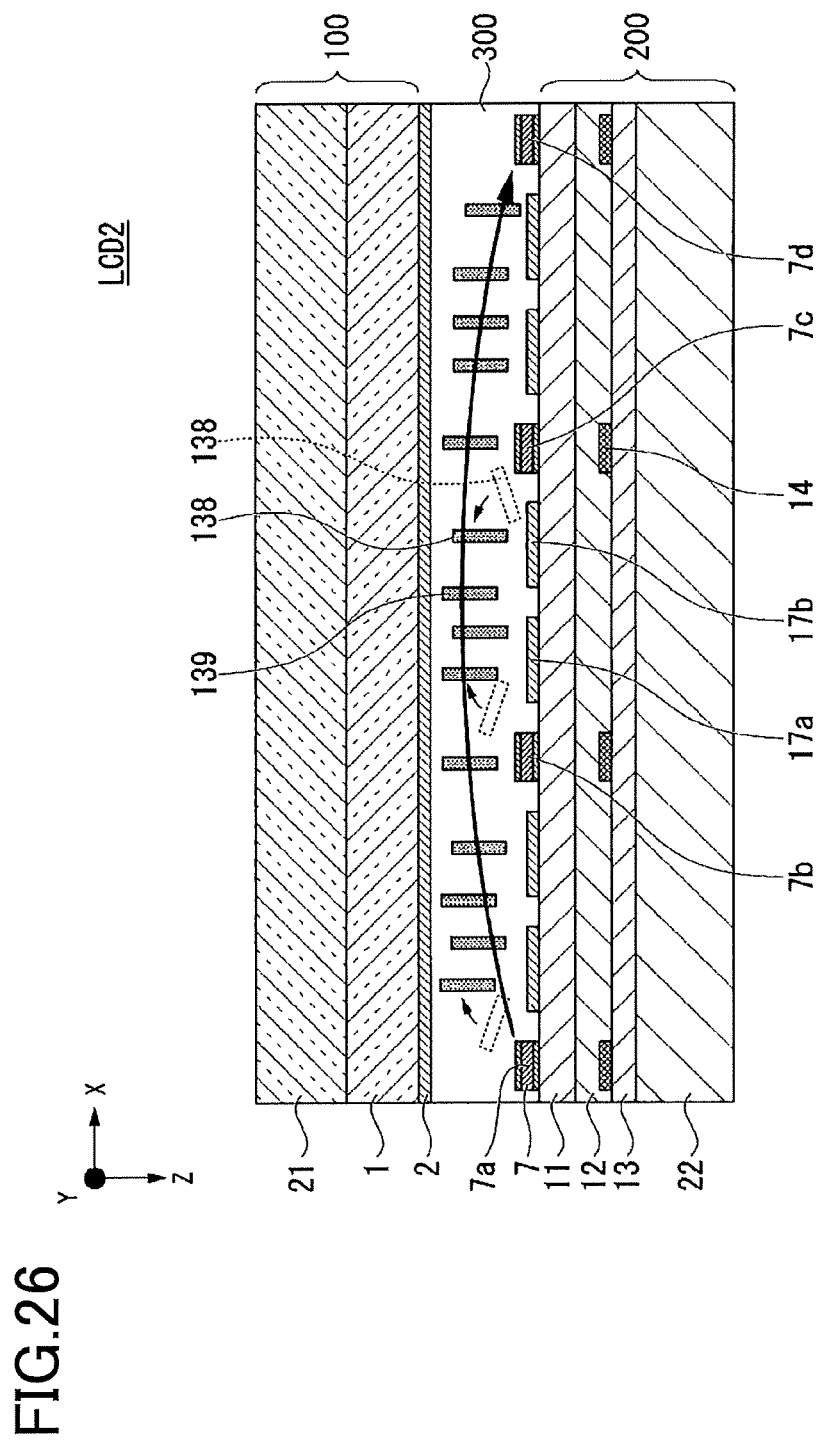
FIG. 26 is a cross-sectional view showing a part of the liquid crystal display device according to the second embodiment of the present invention, that is, illustrating recovery of the liquid crystal molecules when the reset voltage is applied between the second touch sensing wirings, immediately after stopping the application of the liquid crystal drive voltage (when liquid crystal drive voltage is off), and partially illustrating a state where the liquid crystals rapidly turn to a black display state when the electric field is applied in an opposite direction to the electric field direction shown in FIG. 25.

Similar to FIG. 25, FIG. 26 is a cross-sectional view showing a state where liquid crystal molecules are restored when the reset voltage is applied to liquid crystal molecules immediately after application of the liquid crystal drive voltage is stopped between the transparent electrode 2 and the pixel electrode 17. In FIG. 26, the reset voltage is applied between the first wiring 7a and the second wiring 7d after the liquid crystal drive voltage is OFF, so as to resume the alignment of the inclined liquid crystal molecules 138 and 139 to be the vertical alignment as the initial alignment, and a black display is performed on the liquid crystal display device LCD2. However, FIG. 26 differs from FIG. 25 in that the reset voltage is applied to the first wiring 7a, and the second wiring 7d is set to be 0 volts (grounded). In other words, in FIG. 26, the reset voltage in which the polarity of the reset voltage is inverted as shown in FIG. 25, is applied between two wirings 7a and 7d (conductive wiring). Thus, electric field is produced between the first wiring 7a and the second wiring 7d (a direction towards the second wiring 7d from the first wiring 7a) such that the alignment of the liquid crystal molecules fallen in parallel to the substrate surface of the array substrate 200 is rapidly resumed to the vertical alignment. As a result, the liquid crystal display turns to a black display state from a white display state.

As shown in FIGS. 25 and 26, polarity of the reset voltage is alternately inverted between the positive voltage and the negative voltage for the driving, so that electric field produced in a direction from the second wiring 7d toward the first wiring 7a and electric field produced in a direction from the first wiring 7a toward the second wiring 7d alternately appear over time. As a result, electric charges accumulated in the liquid crystal cells can be neutralized so that the cause of display sticking can be eliminated.

The timing for applying the reset voltage to the second touch sensing wiring 7 is determined based on the timing diagram shown in the above described FIG. 12. The control unit 120 controls the invert driving that inverts the voltage polarity between positive and negative.

(3. Touch Sensing Operation Using Second Touch Sensing Wiring 7)

Figure 28:
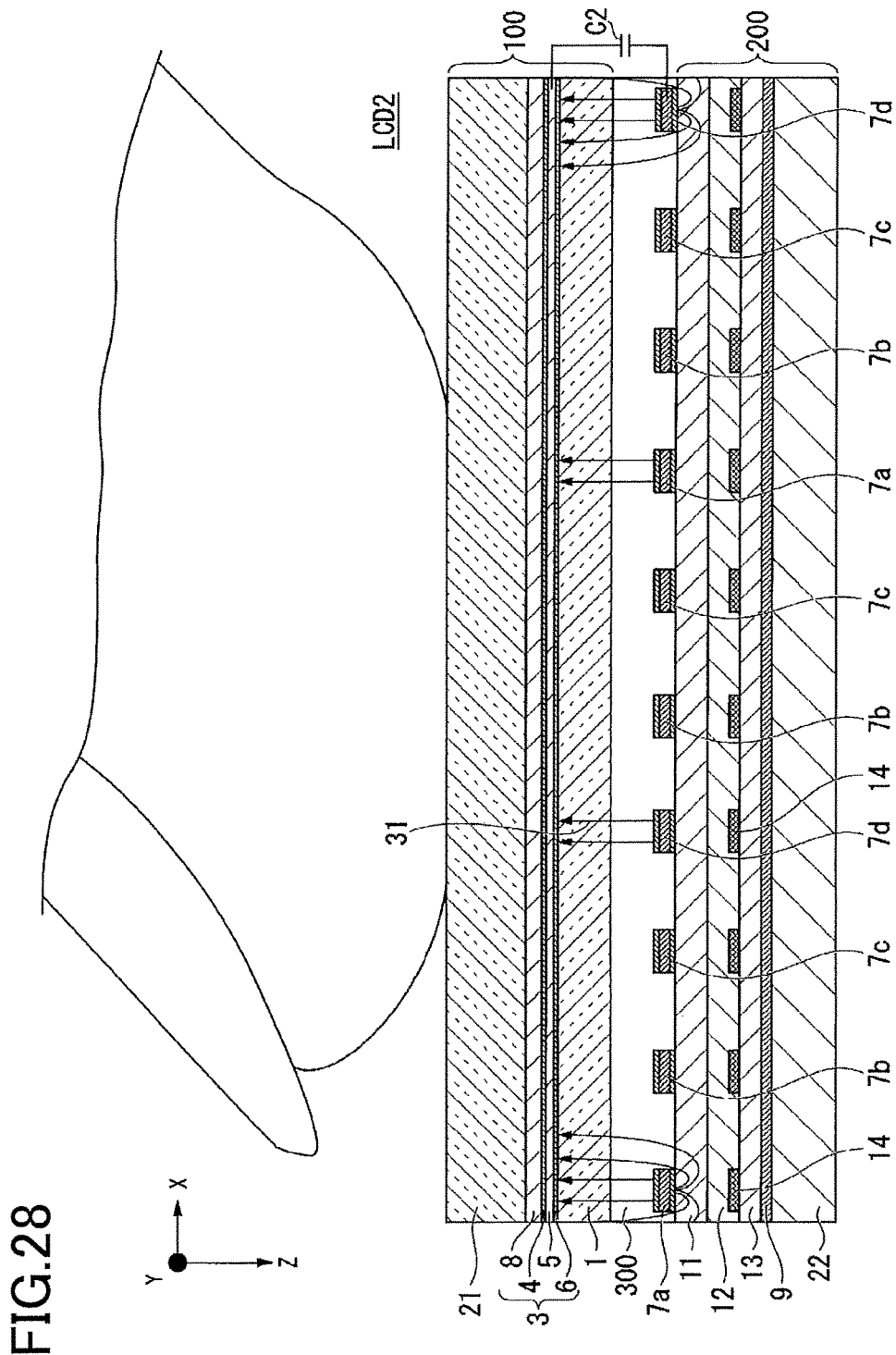
FIG. 28 is a cross-sectional view sectioned across the line I-I' of FIG. 17, showing a part of the liquid crystal display device according to the second embodiment of the present invention, that is, illustrating a change in the fringe electric field when the touch sensing drive voltage is applied between the first touch sensing wiring and the second touch sensing wiring, and a pointer such as a finger approaches or contacts the display device substrate.

FIGS. 27 and 28 are diagrams each being sectioned across the I-I' line shown in FIG. 17.

FIG. 27 partially illustrates a state of fringe electric field produced when the drive voltage is applied across the second touch sensing wiring 7 and the first touch sensing wiring.

FIG. 28 partially illustrates a change in the fringe electric field when the pointer such as a finger contacts or approaches the surface of the display device substrate 100 which faces the viewer, while the drive voltage is being applied between the second touch sensing wiring 7 and the first touch sensing wiring 3.

In FIGS. 27 and 28, the first wiring 7a, the dummy wiring 7b, the dummy wiring 7c, the second wiring 7d, the dummy wiring 7b, the dummy wiring 7c, the first wiring 7a, the dummy wiring 7b, the dummy wiring 7c and the second wiring 7d are arranged from the right side to the left side, so as to correspond to the wiring pattern shown in FIG. 21. In FIGS. 27 and 28, the first touch sensing wiring 3 serves as a touch detection wiring (touch sensing detection wiring) that detects the touch sensing signal. The first wiring 7a and the second wiring 7d serve as a touch drive wiring (touch sensing drive wiring). Each potential of the dummy wiring 7b and the dummy wiring 7c is a floating potential.

In FIG. 27, a fringe electric field is produced between the second touch sensing wiring 7 (7a and 7d) and the first touch sensing wiring 3 (touch detection wiring), when applying the touch sensing drive voltage, and the line of electric force 31 and 32 is produced extending to the first touch sensing wiring 3 from the second touch sensing wiring 7. At this moment, electrostatic capacitance C2 is held between the second touch sensing wiring 7 and the first touch sensing wiring 3.

As shown in FIG. 28, when the pointer such as a finger contacts or approaches the transparent substrate 21, the first touch sensing wiring 3 detects a change in the electrostatic capacitance as the touch sensing signal.

In FIGS. 27 and 28, the first touch sensing wiring 3 serves as touch detection wiring. However, the first touch sensing wiring 3 may serve as a touch drive wiring. In this case, the second touch sensing wiring 7 serves as a touch detection wiring. Thus, the role of the first touch sensing wiring 3 can be changed.

Moreover, an organic film or an inorganic film having visible light absorbing properties may be laminated on the second touch sensing wiring 7 (7a, 7b, 7c, 7d). When the inorganic film having visible light absorbing properties is used, the inorganic film is constituted, for example, of a metal oxide film or a multilayer structure including the oxide film. When using an organic film having visible light absorbing properties, a black layer which will be described later can be used as an inorganic film. A part of the second touch sensing wiring 7 (7a, 7b, 7c, 7d) or the entire second touch sensing wiring 7 (7a, 7b, 7c, 7d) can be used as a touch drive wiring. Alternatively, part of the second touch sensing wiring 7 (7a, 7b, 7c, 7d) or the entire second touch sensing wiring 7 (7a, 7b, 7c, 7d) can be used as a touch detection wiring.

In the present embodiment, when the second touch sensing wiring 7 (7a, 7d) is used as the touch drive wiring, the reset voltage Vr and the touch sensing drive voltage $V_{touch}$ are applied to the second touch sensing wiring 7 in a time-sharing manner.

On the other hand, when the second touch sensing wiring 7 is used as the touch detection wiring, the first touch sensing wiring 3 serves as the touch drive wiring. In this case, the touch sensing drive voltage $V_{touch}$ is applied to the first touch sensing wiring 3, and the reset voltage Vr is applied to the second touch sensing wiring 7, and the second touch sensing wiring 7 detects the touch sensing signal.

Potential at a part of wirings in a plurality of second touch sensing wirings 7 may be set to floating potential. Also, when the polarity of the reset voltage is inverted between positive and negative (for example, state of produced electric field (electric field direction) is changed to a state shown in FIG. 26 from a state shown in FIG. 25), either one of the two second touch sensing wirings 7 may be grounded. Using switching elements selection for the second touch wiring 7 can be made such as from application of the reset voltage to the second touch sensing wiring 7, change of potential of the second touch sensing wiring 7 to floating potential, and connection of the second touch sensing wiring 7 to the ground (grounding). In the touch sensing operation, the above-mentioned thinning driving may be performed. The drive frequency of the touch sensing operation is similar to that of the above-described embodiments.

(4. Time Sharing Driving for Applying Voltage to Conductive Wiring and Touch Sensing Operation)

According to the present embodiment, the reset voltage Vr and the touch sensing drive voltage are applied to the second touch sensing wiring 7 based on the signal timing diagram shown in FIG. 12 described in the first embodiment.

As shown in FIG. 12, touch sensing signal is detected with high frequency, during a black display stable period Er shown in FIG. 12. In a black display stable period Er, emission of the light emitting elements such as LEDs in the backlight unit can be stopped. A stable white display period Wr is, for example, a period where the transmittance $T_{rance}$ after applying the image signal is stable (constant). Similarly, a black display stable period Er is a period where the transmittance $T_{rance}$ is stable (constant). The touch sensing operation is performed at a time when 1 msec to 3 msec elapsed, at least after the image signal is applied to the source wiring, or the reset signal (reset voltage Vr) is applied to the second touch sensing wiring 7.

Also in the liquid crystal display device LCD2 using the vertical electric field type, effects similar to the first embodiment can be obtained.

Third Embodiment

Hereinafter, with reference to FIGS. 29 to 33, a liquid crystal display device according to a third embodiment of the present invention will be described.

In a liquid crystal display device LCD3 according to the present embodiment, the color filter is disposed in the display device substrate 100 of the liquid crystal display device LCD2 according to the above-described second embodiment, the liquid crystal layer is configured by liquid crystal molecules having negative dielectric anisotropy, and the common electrode having a protrusion is disposed in the array substrate 200. Therefore, in the liquid crystal display device LCD3, a vertical electric field type configuration is employed in which a vertical electric field is applied to the liquid crystal layer 300 sandwiched between the transparent electrode and the pixel electrode, thereby driving the liquid crystal layer 300. Further, in the liquid crystal display device LCD3, the liquid crystal layer 300 is driven by not only the vertical field, but also the fringe electric field produced between the pixel electrode and the common electrode.

Figure 29:
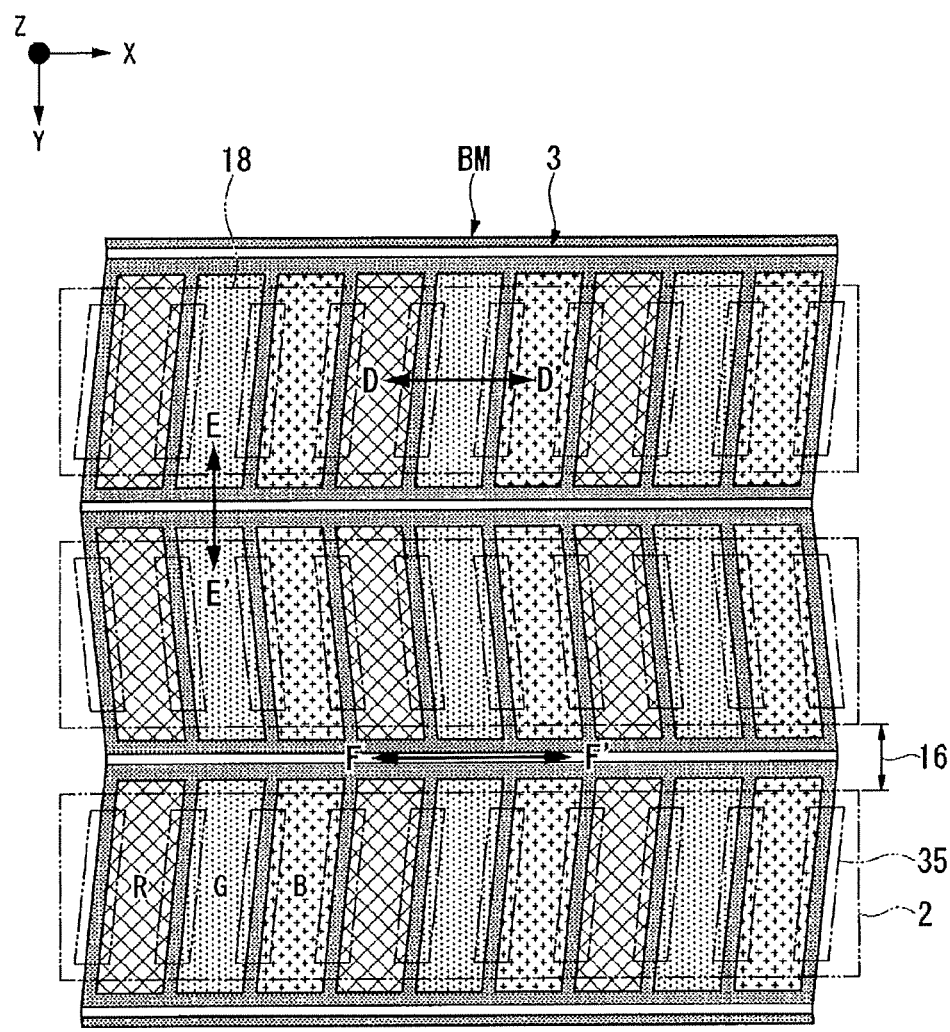
FIG. 29 is a plan view showing a part of the liquid crystal display device according to a third embodiment of the present invention, as viewed from a surface where the display device substrate and the liquid crystal layer contact, towards the display surface of the display device substrate, and illustrating an arrangement of red filters, green filters and blue filters, and an arrangement of a black matrix which is provided on positions on the display device substrate corresponding to the pixel openings.

FIG. 29 is a plan view showing a part of the liquid crystal display device LCD3 according to the third embodiment of the present invention, when the display surface of the display device substrate 100 is viewed from a surface where the display device substrate 100 and the liquid crystal layer 300 are in contact with each other.

Figure 30:
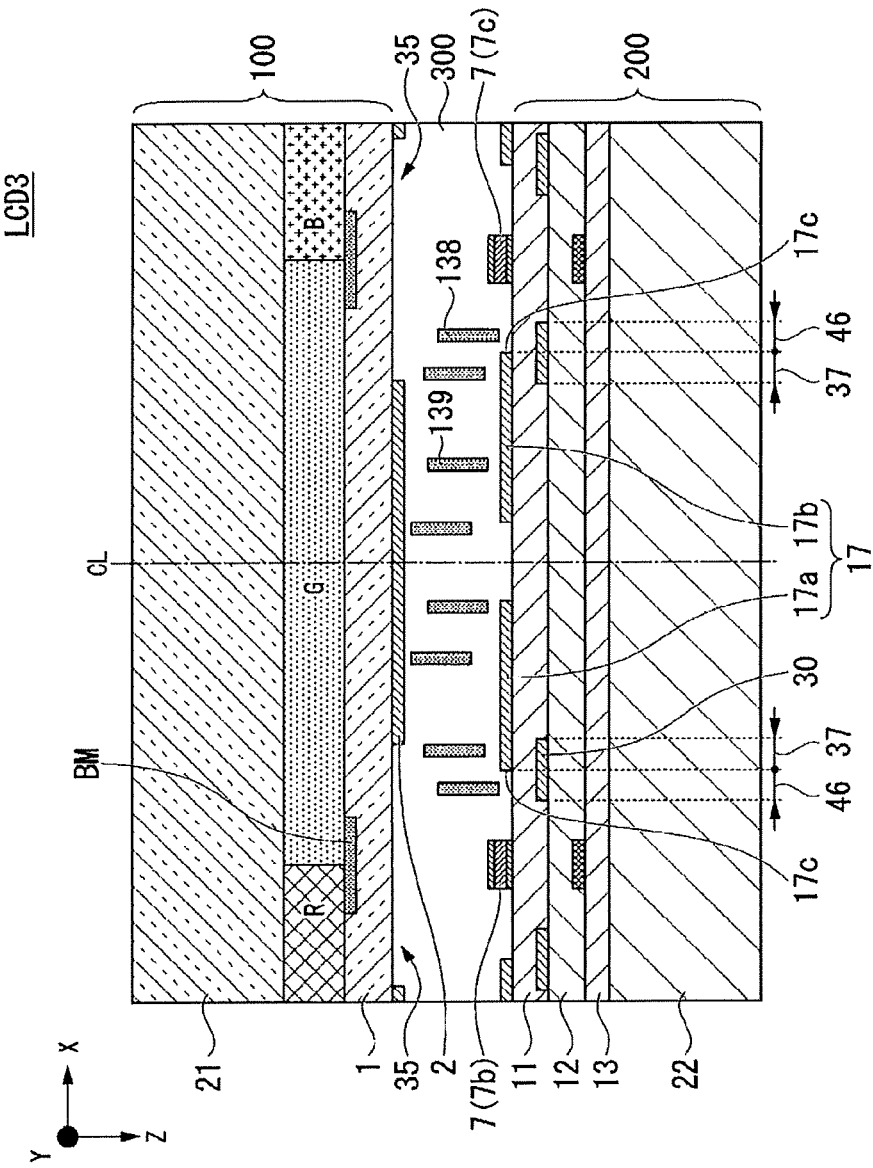
FIG. 30 is a cross-sectional view showing a part of the liquid crystal display device according to the third embodiment of the present invention, that is, illustrating an array substrate provided with a common electrode under the pixel electrodes, an arrangement of a red filter, a green filter and a blue filter, and an arrangement of the black matrix provided on positions on the display device substrate corresponding to the pixel openings.

FIG. 30 is a cross-sectional view sectioned across the D-D' line of FIG. 29, showing a part of the liquid crystal display device according to the third embodiment of the present invention.

As shown in FIG. 29, red filters R, green filters G, and blue filters B constituting the color filter are arranged corresponding to respective positions of the plurality of pixel openings 18. The shape of the pixel opening is a parallelogram, for example. As the shape of the pixel openings, polygons having at least two parallel sides such as a square, or a dog-legged pattern is used.

As shown in FIGS. 29 and 30, in the display device substrate 100, the red filters R, the green filters G, and the blue filers are arranged on the transparent substrate 21, and a black matrix BM (black matrix layer) is provided on the filters R, G, B. In plan view, the black matrix BM is located at a boundary portion between two filters selected from the red filter R, the green filter G and the blue filter B.

The transparent resin layer 1 is formed to cover the black matrix BM, the red filter R, the green filter G, and the blue filter B. The black matrix BM divides the pixel openings 18.

The transparent electrode 2 is formed on the transparent resin layer 1 to have a stripe pattern in parallel to the X-direction, overlapping the plurality of pixel openings 18 arranged in the X-direction. In the transparent electrode 2, ITO openings 35 are formed at portions between adjacent pixel openings (red filters R, green filters G and bluer filters B). In the ITO openings 35, transparent electrodes made of ITO or the like are not formed. The ITO openings 35 are slits provided in the transparent electrode, in which the center of each of the ITO openings 35 corresponds to the pixel center CL.

Since the transparent electrode 2 has a stripe pattern, in the transparent resin layer 1, a plurality of belt-shaped transparent electrodes 2 are arranged in the Y-direction. A slit 16 is formed between adjacent transparent electrodes 2. No transparent electrode made of ITO or the like is formed in portions of the slit 16. In plan view, the black matrix BM or the first touch sensing wiring 3 is arranged in the slit 16.

As shown in FIG. 30, the array substrate 200 is provided with a second insulation layer 12 disposed under the first insulation layer 11, and a common electrode 30 disposed between the second insulation layer 12 and the pixel electrode 17 (electrodes 17a and 17b). In plan view, the common electrode 30 includes an overlapped portion 37 overlapped with the pixel electrode 17, a protrusion 46 (protruded portion) protruding from the end portion 17c of the pixel electrode 17 in the X-direction.

The electrode 17a, the protrusion 46 (first protrusion) located in the left side of the paper surface and the overlapped portion 37 (first overlapped portion) located in the left side of the paper surface; and the electrode 17b, the protrusion 46 (second protrusion) located in the right side of the paper surface and the overlapped portion 37 (second overlapped portion) are line symmetrically arranged with respect to the pixel center CL. The protrusion 46 may be arranged in the short side direction in addition to the longitudinal direction of the pixel.

The black matrix BM is arranged closer to the liquid crystal layer 300, thereby reducing light leakage due to stray light or re-reflected light in a liquid crystal alignment defect region occurring in the vicinity of the black matrix BM. Similar to the second embodiment, the liquid crystal layer 300 includes liquid crystal molecules of which the initial alignment is vertical.

Also, in the liquid crystal display device LCD3 according to the present embodiment, similar to the above-described embodiments, a plurality of second touch sensing wirings 7 (7a, 7b, 7c, 7d) are formed on the first insulation layer 11. Since the functions of the plurality of second touch sensing wirings 7 according to the present embodiment are the same as the above-described embodiments, description is omitted. According to the present embodiment, the second touch sensing wiring 7a (first wiring 7a) and the second touch sensing wiring 7d (second wiring 7b) are not shown, but the second touch sensing wirings 7b and 7c which are dummy wirings are shown in FIGS. 30 to 33. The second touch sensing wirings 7b and 7c are in an electrically floating state (floating state).

In the following description, an electric field is produced by applying voltage to the second touch sensing wiring so that the alignment of the liquid crystal molecules fallen in parallel to the substrate surface of the array substrate 200 is rapidly resumed to the vertical alignment. However, only the direction of the electric field is illustrated and the conductive wirings to which the voltage is applied are omitted. The second touch sensing wiring 7, to which the reset voltage is applied, is provided in a pixel adjacent to the pixel shown in FIGS. 30 to 33.

Figure 31:
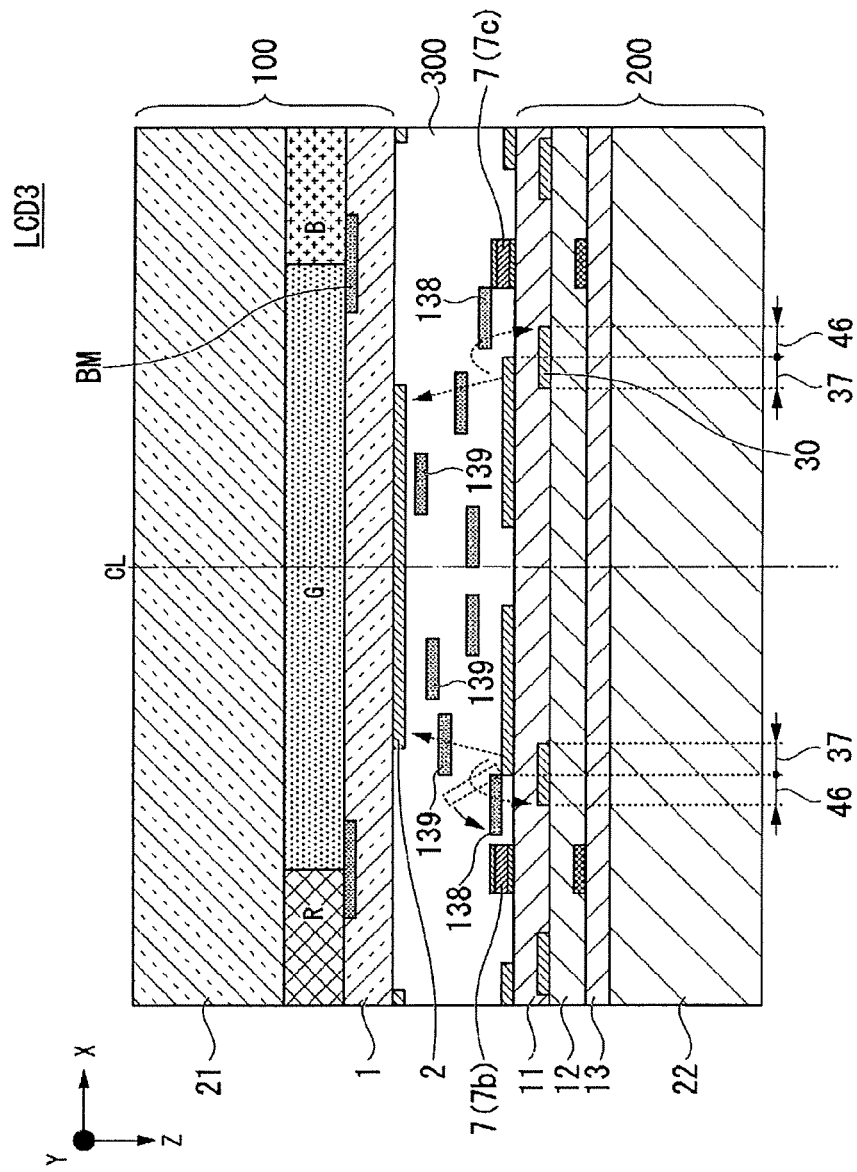
FIG. 31 is a cross-sectional view showing a part of the liquid crystal display device according to the third embodiment of the present invention, that is, illustrating a part of a white display state when a liquid crystal display drive voltage is applied between the transparent electrode and the pixel electrodes and between the pixel electrodes and the common electrode.

FIG. 30 illustrates a state where no liquid crystal drive voltage is applied between the transparent electrode 2 and the pixel electrode 17, and a state where the liquid crystal molecules 138 and 139 are in the vertical alignment, that is, a black display state. FIG. 31 is a cross-sectional view partly showing a state of a white display state when the liquid crystal display voltage is applied between the transparent electrode 2 and the pixel electrode 17 (liquid crystal drive voltage is ON).

When the liquid crystal drive voltage is ON, the liquid crystal drive voltage is applied between the pixel electrode 17 and the transparent electrode 2, and between the pixel electrode 17 and the common electrode 30. When the voltage is applied, the liquid crystal molecules 138 located close to the protrusions 46 are greatly inclined at once because of the strong electric field produced between the pixel electrode 17 and the common electrode 30, and aligned to be in parallel to the pixel electrode 17. The remaining liquid crystal molecules 139 are fallen towards a line-symmetric direction with respect to the pixel center CL, as the behavior of the liquid crystal molecules 138 aligned in the vicinity of the protrusion 46 is propagated.

Therefore, the liquid crystal molecules 138 and 139 are aligned so as to be arranged (have an arrangement) in line-symmetry with respect to the pixel center CL. Hence, a wide viewing angle is secured.

Figure 32:
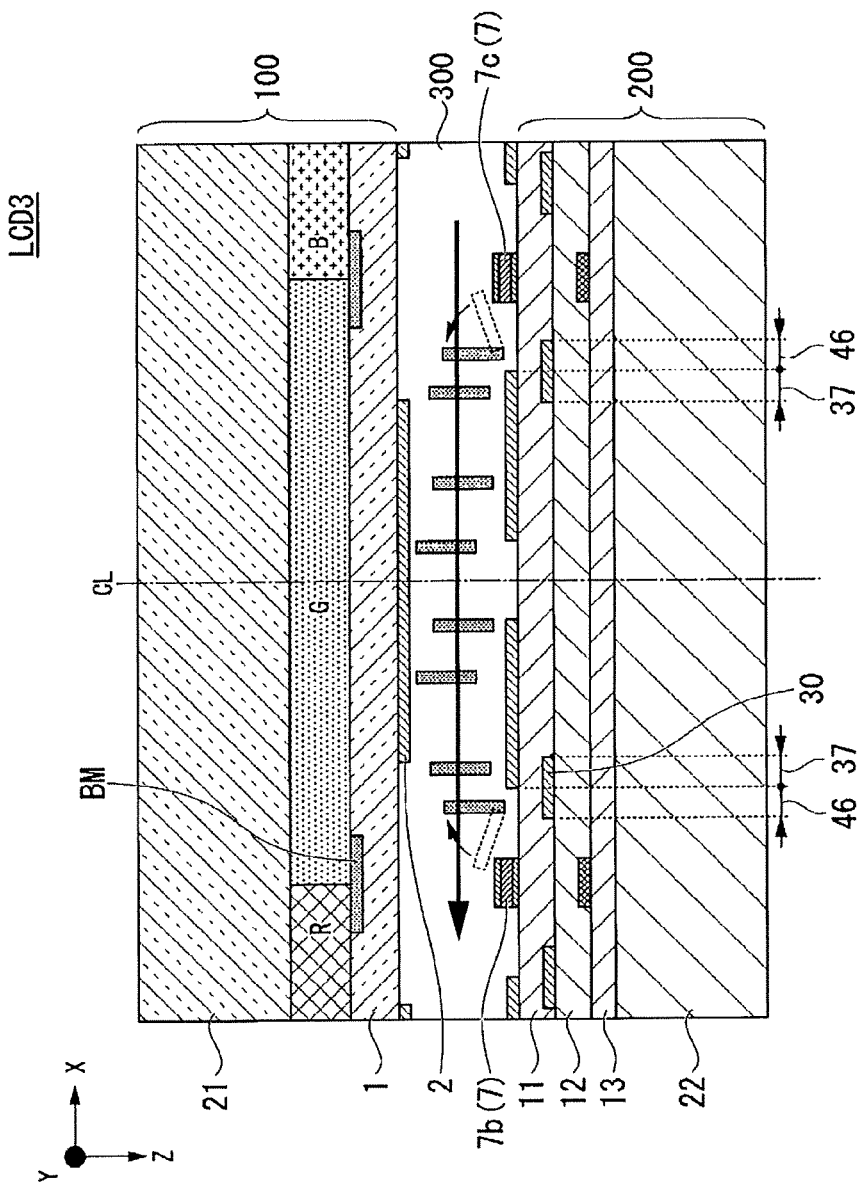
FIG. 32 is a cross-sectional view showing a part of the liquid crystal display device according to the third embodiment of the present invention, that is, illustrating behavior of the liquid crystal molecules to rapidly turn to a black display state, where the reset voltage is applied to the second touch sensing wiring immediately after stopping the application of the liquid crystal drive voltage (when liquid crystal drive voltage is off), and an electric field is applied to the liquid crystal layer in a direction traversing the liquid crystal layer.

FIG. 32 illustrates a black display state in which the reset voltage is applied to the first wiring 7a and the second wiring 7d of the adjacent pixel immediately after the application of the liquid crystal drive voltage is stopped (when liquid crystal drive voltage is OFF), so that the liquid crystal molecules 138 and 139 are restored to the vertical alignment.

When an electric field is produced (towards left side from right side) by applying the reset voltage, the alignment of the liquid crystal molecules fallen in parallel to the substrate surface of the array substrate 200 is rapidly resumed to the vertical alignment. As a result, the liquid crystal display turns to a black display state from a white display state. The reset voltage is applied so that the fall time $\tau_{OFF}$ is significantly shortened. Since the black display stable period Er becomes longer because of the shortened fall time $\tau_{OFF}$, the light emission of the backlight unit BU may be terminated.

Figure 33:
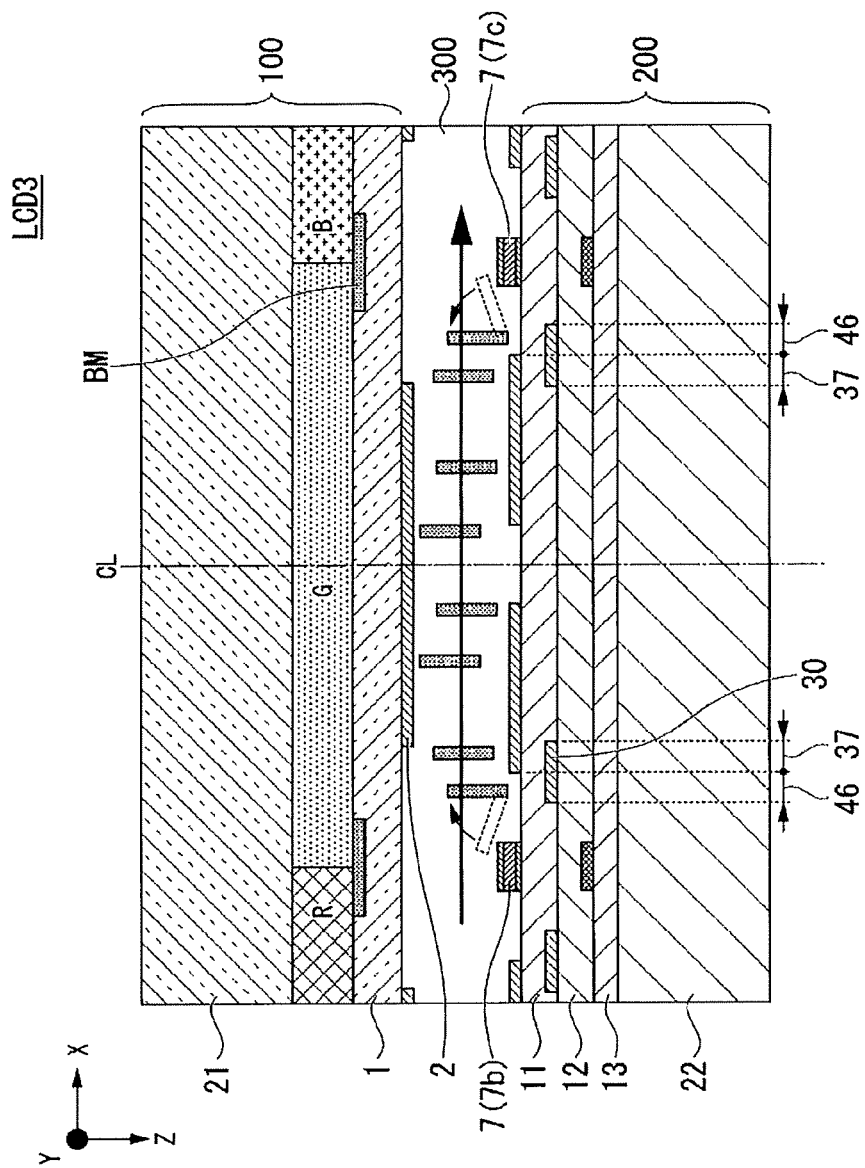
FIG. 33 is a cross-sectional view showing a part of the liquid crystal display device according to the third embodiment of the present invention, that is, illustrating behavior of the liquid crystal molecules to rapidly turn to a black display state, where the reset voltage is applied to the second touch sensing wiring immediately after stopping the application of the liquid crystal drive voltage (when liquid crystal drive voltage is off), and electric field is applied to the liquid crystal layer in a direction traversing the liquid crystal layer and a direction opposite to the direction of the electric field shown in FIG. 32.

FIG. 33 illustrates a black display state in which the reset voltage is applied to the first wiring 7a and the second wiring 7d of the adjacent pixel immediately after the application of the liquid crystal drive voltage is stopped (when liquid crystal drive voltage is OFF), so that the liquid crystal molecules 138 and 139 are restored to the vertical alignment. However, the direction of the electric field produced by applying the reset voltage shown in FIG. 33 differs from that of FIG. 32.

According to the behavior shown in FIG. 33, effects similar to FIG. 32 can be obtained. Further, the electric field shown in FIG. 32 and the electric field shown in FIG. 33 are alternately produced, whereby electric charges accumulated in the liquid crystal cells can be neutralized so that the cause of display sticking can be eliminated.

According to the present embodiment, in addition to the similar effects of the second embodiment, the liquid crystal molecules located close to the protrusion 46 can be greatly inclined at once because of the strong electric field produced between the pixel electrode 17 and the common electrode 30. In other words, the rise time (hereinafter referred to as $\tau_{ON}$) at a time when the liquid crystal drive voltage is applied to the liquid crystal molecules (liquid crystal layer) can be shortened. Further, behavior of the liquid crystal molecules 138 aligned in the vicinity of the protrusion 46 can be propagated to fall the liquid crystal molecules in the entire liquid crystal layer 300 towards a line-symmetric direction with respect to the pixel center CL. As a result, wide viewing angle can be secured.

Modification of Third Embodiment

Figure 34:
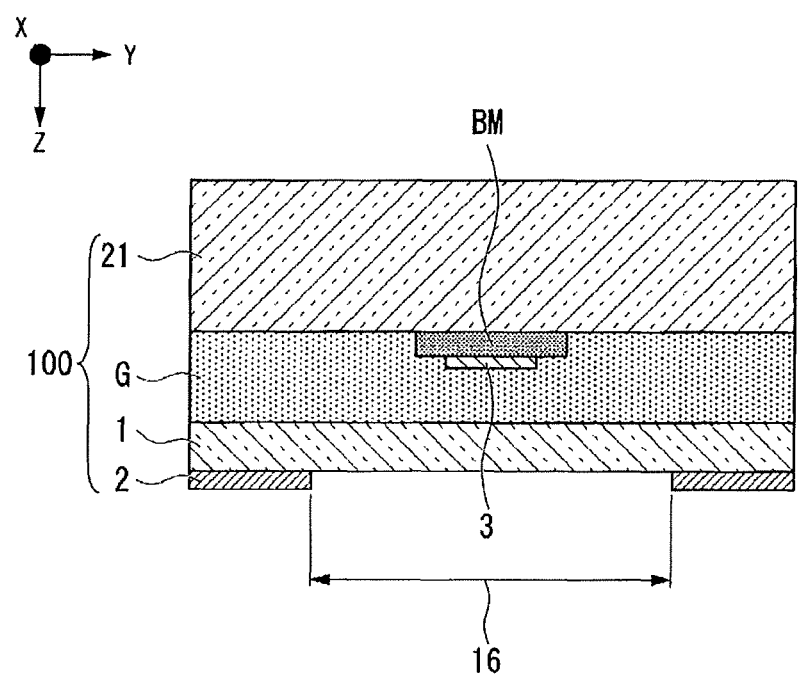
FIG. 34 is a cross-sectional view sectioned across the E-E' line of FIG. 29, showing a part of the liquid crystal display device according to a modification of the third embodiment of the present invention.
Figure 35:
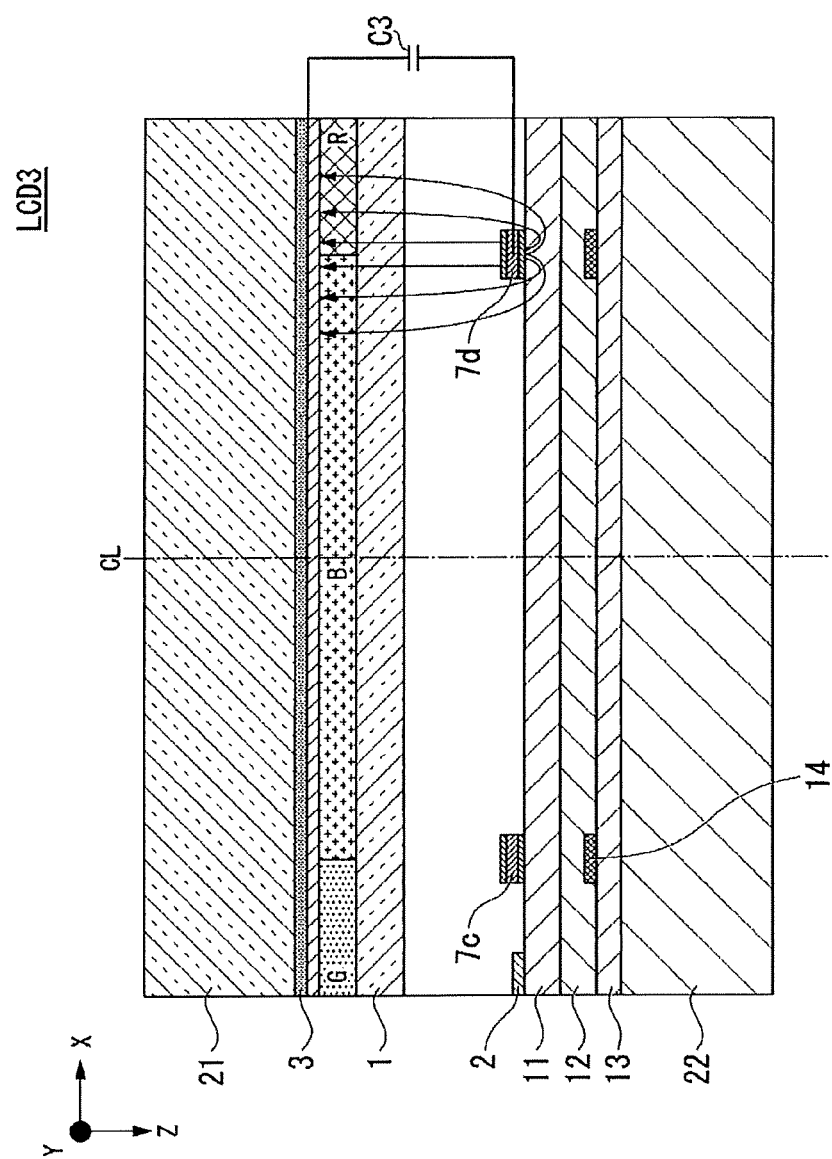
FIG. 35 is a cross-sectional view sectioned across line F-F' of FIG. 29, showing a part of the liquid crystal display device according to a modification of the third embodiment of the present invention, that is, illustrating an array substrate provided with a common electrode under the pixel electrodes, an arrangement of a red filter, a green filter and a blue filter, and an arrangement of the black matrix which are provided on positions on the display device substrate corresponding to the pixel openings.

Next, modification of the liquid crystal display device according to the third embodiment of the present invention will be described with reference to FIGS. 29, 30, 34 and 35. FIG. 34 is a cross-sectional view sectioned across the E-E' line of FIG. 29. FIG. 35 is a cross-sectional view sectioned across the F-F' line of FIG. 29, partly showing a modification of the liquid crystal display device according to the third embodiment of the present invention, and illustrating an electrostatic capacitance C3 produced between the first touch sensing wiring 3 serving as the touch detection wiring and the second touch sensing wiring 7 serving as the touch drive wiring.

The modification of the third embodiment differs from the third embodiment in the locations of the black matrix BM with respect to the color filter.

As shown in FIG. 34, the first touch sensing wiring 3 is provided on the black matrix BM, and at a location corresponding to the ITO opening 35 of the transparent electrode 2.

Similarly to FIGS. 29 and 30, the array substrate 200 is provided with the common electrode 30 disposed between a second insulation layer 12 and the pixel electrode 17 (electrodes 17a and 17b). The common electrode 30 has an overlapped portion 37 overlapping the pixel electrode 17 and a protrusion 46 (protruded portion) protruding in the X-direction from the end portion 17c of the pixel electrode 17.

Similarly to the third embodiment, the liquid crystal layer 300 has liquid crystal molecules of which the initial alignment is a vertical alignment.

According to the present modification, the behavior of the liquid crystal molecules 138 and 139 when the liquid crystal drive voltage is applied to the pixel electrode 17 and the behavior of the liquid crystal molecules 138 and 139 when the reset voltage is applied to the second touch sensing wiring 7 are the same as that of the third embodiment.

An electrode structure in which the common electrode 30 has a protrusion 46 improves the viewing angle and the half tone display. By applying the liquid crystal drive voltage between the electrodes 17a and 17b of the pixel electrode 17 and the transparent electrode 2, the liquid crystal molecules 138 and 139 are fallen so that a white display state can be obtained (see FIG. 31).

After performing the white display state, the liquid crystal drive voltage is OFF and the reset voltage is applied to the second touch sensing wiring 7, whereby an electric field is produced so as to cross the liquid crystal layer 300 and the source wiring in plan view. Because of the effect of this electric field, the alignment of the liquid crystal molecules 138 and 139 is rapidly resumed to vertical alignment (initial alignment) (see to FIG. 32).

Similarly, after performing the white display state, the liquid crystal drive voltage is OFF and the reset voltage is applied to the second touch sensing wiring 7, whereby an electric field is produced so as to cross the liquid crystal layer 300 and the source wiring. Because of this effect of the electric field, the alignment of the liquid crystal molecules 138 and 139 is rapidly resumed to vertical alignment (initial alignment) (see to FIG. 33). Here, the positive voltage and the negative voltage of the reset voltage are inverted and the inverted reset voltage is applied to the second touch sensing wiring 7. As a result, an electric field having different direction can be applied to the liquid crystal layer 300 so that similar effects to the cases shown in FIGS. 32 and 33 can be obtained.

With reference to FIG. 35, a touch sensing technique will be described in which the second touch sensing wiring 7 is used as a touch sensing wiring.

As shown in FIG. 35, in the liquid crystal display device LCD3 and in plan view, the dummy wiring 7c is provided to overlap a boundary portion between the green filter G and the blue filter B, and the second conductive wiring 7d is provided to overlap a boundary portion between the blue filter B and the red filter R.

A fringe electric field is produced by applying the touch sensing drive voltage between the second wiring 7d and the first touch sensing wiring 3. The state of the fringe electric field is shown by the lines of electric force 31 and 32. The electrostatic capacitance C3 is retained between the second wiring 7d and the first touch sensing wiring 3. As described in the first embodiment, when the pointer such as a finger contacts or approaches the transparent substrate 21, the electrostatic capacitance C3 changes, and the change in the electrostatic capacitance is detected, as the touch sensing signal, by the first touch sensing wiring 3. Meanwhile, since the dummy wiring 7c has an electrically floating potential (floating potential), the fringe electric field is not produced.

The second touch sensing wiring 7 (second wiring 7d and dummy wiring 7c) may be formed of aluminum alloy.

Fourth Embodiment

Next, the fourth embodiment of the liquid crystal display device according to the present invention will be described, with reference to FIG. 36.

The drawing is a circuit diagram showing a part of the liquid crystal display device according to the fourth embodiment of the present invention, in which an array structure provided with two active elements for one pixel.

Figure 36:
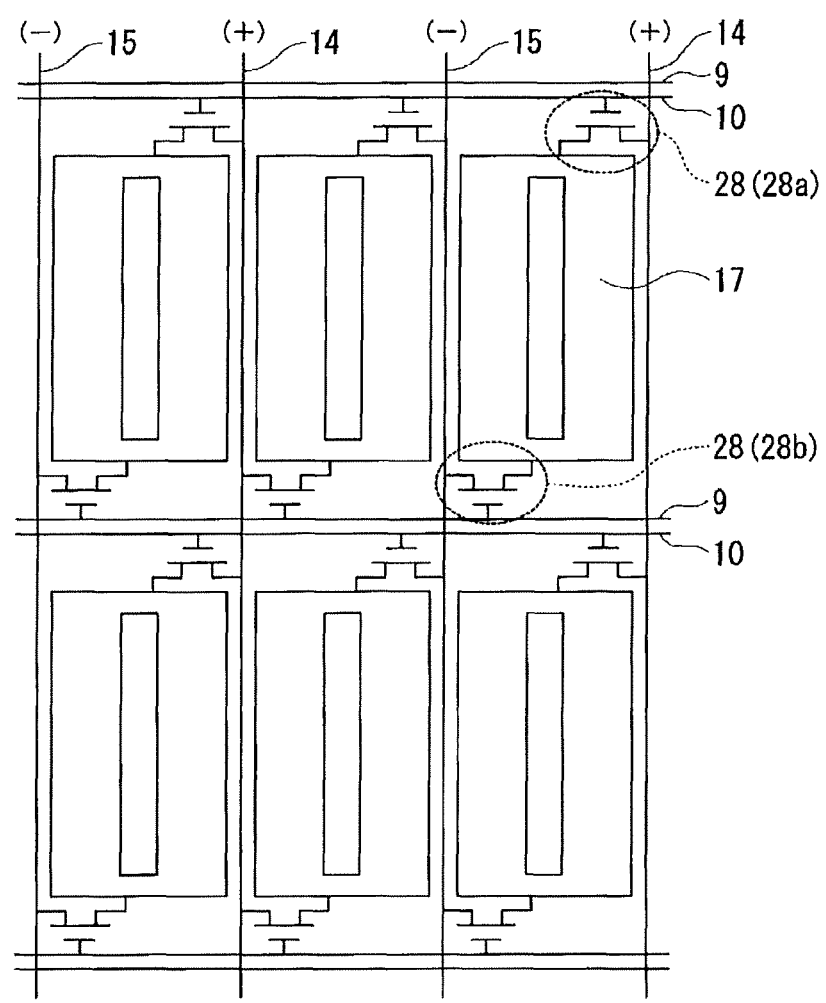
FIG. 36 is a circuit diagram showing a part of the liquid crystal display device according to a fourth embodiment of the present invention, that is, illustrating an array substrate provided with two active elements in one pixel.

As shown in FIG. 36, each of the pixels corresponding to the pixel opening has a pixel electrode 17. For the pixel electrode 17, two TFTs, that is, the first active element 28a and the second active element 28b are connected. The first gate wiring 10 and the second gate wiring 9 which extend in the X-direction are provided between mutually adjacent two pixels (between two mutually adjacent pixel openings), and the second source wiring 15 of an odd column and the first source wiring 14 of an even column extending in the Y-direction are provided. Each of the second source wiring 15 and the first source wiring 14 has a source electrode connected thereto, the source electrode constituting a part of the active element.

For example, when the image signal is outputted from the mage signal timing control unit 121 and input to the source wiring, the negative voltage as an image signal is supplied to the second source wiring 15 of the odd column, and the positive voltage as an image signal is supplied to the first source wiring 14 of the even column.

Thus, the second active element 28b has a source electrode electrically connected to the second source wiring 15 to which the negative voltage as the image signal is supplied. The first active element 28a has a source electrode electrically connected to the first source wiring 14 to which the positive voltage as the image signal is supplied.

For the first gate wiring 10 and the second gate wiring 9, for example, for every frame of image display, either one of the gate wiring is applied with the gate voltage. This gate voltage is synchronized with either the second source wiring 15 of odd column or the source wiring of even column.

The first active element 28a is activated when the first source wiring 14 of the even column accepts an image signal under a state where the gate signal is being supplied to the first gate wiring 10. At this time, the potential of the pixel electrode 17 becomes positive.

For example, in the next timing, the second active element 28b is activated when the image signal is inputted to the second source wiring 15 of the odd column under a state where the gate signal is being inputted to the second gate wiring 9. At this time, the potential of the pixel electrode 17 becomes negative.

In the array structure shown in FIG. 36, by using the above-described TFT operation, dot inversion driving or column inversion driving can be performed. In this array structure shown in FIG. 36, the above-described TFT operation is used so that dot inversion driving or column inversion driving can be performed. In this array structure, without inverting the output polarity of the source wiring, the potential of the pixel electrode 17 can be positive or negative.

According to a pixel structure in which the pixel is formed so that one pixel electrode 17 corresponds to one active element, power consumption may increase or noise occurs because of the output inversion. On the other hand, according to the array structure shown in FIG. 36, power consumption is reduced and occurrence of noise can be greatly reduced. Therefore, sensitivity of touch sensing can be improved.

In the case where the array structure shown in FIG. 36 is employed, the potential of the pixel electrode 17 can be set to positive or negative. In this case, the transparent electrode 2 included in the display device substrate 100 can be constant such as zero volts or the like. Since the potential of the transparent electrode 2 is not necessarily changed, noise affecting the touch sensing driving can be further suppressed. Moreover, the potentials of the second source wiring 15 and the first source wiring 14 can be fixed to a negative or positive potential so that noise can be prevented from being produced when the polarity of signal applied to the source wiring is changed.

Further, when the touch sensing function is included in the liquid crystal display device having the structure according to the present embodiment, polarity of the potentials for the second source wiring 15 and the first source wiring 14 are fixed, whereby adverse effects on the touch sensing can be eliminated.

To obtain fast response, the touch drive electrodes can be scanned by a touch sensing (thinning driving) using selected wirings among a plurality of touch sensing wirings. Also, the drive electrode and the detection electrode are switched in the touch sensing operation, and the transparent electrode may be used as a drive electrode (scanning electrode) to which a voltage having a specified frequency is applied.

For the touch sensing or the liquid crystal driving, an inversion driving method may be used in which the voltage (AC signal) applied to the drive electrode can be inverted to be positive or negative. The touch driving and the liquid crystal driving may be performed in a time sharing manner, or other than a time sharing manner.

As a voltage (AC signal) applied to the drive electrode, voltage width (amplitude) of the applied AC signal is set to be small so that an influence on the liquid crystal display can be reduced.

As described, according to the liquid crystal display device according to the present embodiment, when the potential of the second touch sensing wiring 7 is set to the specified potential, the driving frequency of the touch sensing wirings and the signal detection timing can be set without depending on the liquid crystal drive frequency or the timing. The drive frequency of the touch drive electrode can be set to be different from the liquid crystal drive frequency or to be higher frequency than the liquid crystal drive frequency.

Generally, the liquid crystal drive frequency is set to 60 Hz or integral multiple frequencies thereof. Usually, the touch sensing electrode is likely to be affected by noise associated with the liquid crystal drive frequency. Usually, the domestic power source is an AC power source having 50 Hz or 60 Hz. Hence, the touch sensing electrode is likely to pick up noise produced from electric equipment operated with such an external power source.

Accordingly, the touch drive frequency is set to be different frequency which is shifted from 50 Hz or 60 Hz or integral multiples thereof, whereby the influence of noise produced by the liquid crystal driving operation or the external electrical equipment can be significantly reduced. Alternatively, the signal application timing may be shifted in the time axis shown in FIG. 12. The amount of shift may be small, for example, ranging from ±3% to ±17% relative to the noise frequency. Accordingly, interference by the noise frequency can be reduced.

For example, the frequency of the touch driving can be selected from a frequency range from several KHz to several hundreds of KHz, to be different from the above-described liquid crystal drive frequency or the power source frequency, thereby avoiding interference with these frequencies. By selecting a different frequency to avoid interference with the liquid crystal drive frequency and the power source frequency, the influence of noise such as coupling noise produced in dot inversion driving can be reduced.

On the other hand, in the case where a display device using 3D (stereo image) is used, a plurality of image signals (e.g., an image signal for the right eye and an image signal for the left eye) are required in order to three-dimensionally display a front side image and a depth side image, which is different to display of the two-dimensional image. Therefore, high speed driving using the liquid crystal drive frequency, for example, 240 Hz or 480 Hz and many image signals are required.

In this case, the advantages of the present embodiment are significant, because the touch sensing drive frequency can be different from the liquid crystal drive frequency. For example, according to the present embodiment, fast response and high precision touch sensing can be accomplished in 3D-display gaming equipment.

Also in the displays of gaming equipment or automatic teller machines, where frequent touch inputs such as by a finger are used, the present embodiment is particularly useful. The black display stable period Er after applying the reset voltage Vr may be used for a black display used with a 3D (stereo image) display when the right eye image and the left eye image are switched.

In the touch sensing driving, the drive voltage is not supplied to all of the touch sensing wirings, but thinning driving is performed to detect the touch position. Hence, power consumption in the touch sensing driving can be reduced.

In the liquid crystal display device according to the embodiments of the present invention, the liquid crystal layer of the vertical alignment is driven by vertical electric field.

The liquid crystal drive methods applicable to the vertical electric filed type include the VA (vertical alignment) method, HAN (hybrid-aligned nematic) method, TN (twisted nematic) method, OCB (optically compensated bend) method, CPA (continuous pinwheel alignment) method, ECB (electrically controlled birefringence) method, TBA (Transverse Bent Alignment) method or the like, from which an appropriate method can be selected and used. It should be noted that the VA mode accomplishes an excellent normally black display so that the VA mode may preferably be employed for utilizing a black display.

The VA mode that drives the liquid crystals of the vertical alignment is superior in a degree of front luminance and a degree of black level of a black display compared to the FFS mode which drives the horizontally aligned crystal displays. As a liquid crystal material used for the VA mode, for example, a high purity material that provides a liquid crystal layer having specific resistivity of $1 \times 10^{13}$ Ωcm or more. The liquid crystal driving may be a column inversion driving (source inversion driving) in which the transparent electrode as the common electrode is set to specified potential, instead of dot inversion driving. Alternatively, column inversion driving in which the transparent electrode is set to a specified potential, and dot inversion driving in which the transparent electrode is set to a specified potential, may be combined.

According to the vertical electric field method such as VA, for example, the frame inversion or the dot inversion liquid crystal driving is performed to apply a positive/negative liquid crystal drive voltage between the pixel electrode 17 and the transparent electrode 2. Accordingly, compared to the FFS method, a deviation of electrostatic capacitance in the in-cell touch is small and the display sticking is small as well. Moreover, the positive or negative reset voltage is applied, after images are written for the respective cells, for every horizontal line inversion or every frame inversion of the one screen, whereby the deviation of the electrostatic capacitance accumulated in the touch sensing operations is mitigated as well, and the accuracy of touch sensing using the in-cell technique can be improved.

The display device according to the embodiments of the present invention can be modified in various ways. Electronic equipment to which the display device according to the embodiments of the present invention can be applied includes cellular phones, portable game equipment, portable information terminals, personal computers, electronic books, video cameras, digital still cameras, head-mounted displays, navigation systems, sound-reproducing systems (car audios, digital audio players or the like), copy machines, facsimiles, printers, printer-composite machines, vending machines, automatic teller machines (ATM), personal authentication devices, and optical communication equipment. The above-described embodiments can be arbitrarily combined and used.

The preferred embodiments of the present invention have been described previously. These embodiments are examples and should not be construed as limitations. Any additions, omissions, replacements and other changes can be made without departing the scope of the present invention. Accordingly, the present invention is not limited by the above descriptions and defined by the scope of claims.

In an in-cell type display device provided with a touch sensing function, countermeasures against noise due to liquid crystal driving are necessary to improve the sensitivity of the device.

As described, to avoid sticking of the display because of accumulated electric charges, polarity inversion driving is generally employed as liquid crystal driving. However, the source wiring transmitting the image signal is a noise source that produces noise due to the polarity inversion. In addition, the source wiring is likely to include a change in stray capacitance caused by polarity change of the image signal. Therefore, in the in-cell type display device provided with a touch sensing function, it is important to reduce occurrence of noise caused by the source wiring through which the image signal is transmitted.

Regarding liquid crystal driving, for example, according to a liquid crystal display device of a vertical electric filed method combined with the fringe electric field as disclosed in PTL 2, the rise time $\tau_{ON}$ can be greatly reduced, when the liquid crystal drive voltage is applied to the liquid crystal molecules (when the liquid crystal drive voltage is ON), so that fast driving is performed. Also in the above-mentioned liquid crystal driving using the FFS mode, similarly, the horizontal electric field driving using the fringe electric field is employed so that the rise time $\tau_{ON}$ can be greatly reduced. However, when the drive voltage is turned OFF, since the electric field to be applied to the liquid crystal molecules disappears, long time is required for the liquid crystal molecules to return to the initial vertical alignment, which makes it difficult to reduce the fall time $\tau_{OFF}$ of the liquid crystal molecules. The response time of the liquid crystal is defined as sum of the rise time $\tau_{ON}$ and the fall time $\tau_{OFF}$. Accordingly, the fall time $\tau_{OFF}$ is required to be reduced to improve the responsiveness.

A thin film transistor has been known in which oxide semiconductor made of a composite oxide such as IGZO is used for the channel layer, IGZO being composed of indium oxide, gallium oxide, zinc oxide or the like. Such a thin film transistor has electron mobility which is 50 times higher than that of a conventional thin film transistor using an amorphous silicon semiconductor as a channel layer, so that writing into pixel electrodes (writing of an image signal) can be faster. Further, the thin film transistor provided with a channel layer formed of the oxide semiconductor has extremely low leakage current, whereby favorable voltage retention can be accomplished after writing of an image signal into the pixel electrode. Hence, a rewrite operation to retain image display is not required. However, when using a liquid crystal display device, the feature of the favorable voltage retention may cause a problem in that sticking of pixels is likely to occur.

An aspect of the present invention is to provide a liquid crystal display device in which the response time of the horizontal electric field type or the vertical electric field type liquid display device is reduced, sticking of pixels is improved, and occurrence of noise is reduced, where the noise is caused by the source wiring through which the image signal is transmitted and affects the touch sensing operation.

A liquid crystal display device according to a first aspect of the present invention includes:

a display device substrate including a first touch sensing wiring;

an array substrate including a plurality of pixel openings each having a polygonal shape, a pixel electrode provided for each of the plurality of pixel openings, first and second active elements electrically connected to the pixel opening, a first gate wiring that electrically associates with the first active element, a second gate wiring that electrically associates with the second active element, a first source wiring that electrically associates with the first active element, orthogonally intersecting the first gate wiring in plan view, a second source wiring that electrically associates with the second active element, orthogonally intersecting the second gate wiring in plan view, a first insulation layer formed under the pixel electrode, second insulation layer formed under the first insulation layer, a common electrode formed between the first insulation layer and the second insulation layer, and a second touch sensing wiring orthogonally intersecting the first touch sensing wiring in plan view;

a liquid crystal layer disposed between the display device substrate and the array substrate; and a control unit configured to supply a positive first image signal to the first source wiring, supply a negative second image signal to the second source wiring, apply a liquid crystal drive voltage between the pixel electrode and the common electrode being synchronized to the first image signal and the second image signal supplied to the first source wiring and the second source wiring respectively, thereby driving the liquid crystal layer, performing an image display, and applying a voltage to the second touch sensing wiring after performing the image display.

The pattern shape of the pixel openings having polygonal shape includes a square pattern, a rectangular pattern, a parallelogram pattern and a doglegged pattern, for example.

The display substrate may be provided with a transparent substrate, a transparent resin layer disposed on the transparent substrate. In this case, the first touch sensing wiring is provided between the transparent substrate and the transparent resin layer. Also, the display device substrate may include a plurality of transparent resin layers (first transparent resin layer, second transparent resin layer).

As described above, the control unit applies the liquid crystal drive voltage between the pixel electrode and the common electrode, thereby driving the liquid crystal layer, performing an image display, and applying a voltage to the second touch sensing wiring after performing the image display. Thus, an electric field is produced between the second touch sensing wirings in a direction that traverses the liquid crystal layer (a direction parallel to the transparent substrate) in plan view. By this electric field, the liquid crystal alignment is able to rapidly turn to a black display state.

"Turning to a black display state" means that the liquid crystal alignment returns to the initial alignment state of the liquid crystal in a normally black liquid crystal display device. In the following description, a voltage producing an electric field where the liquid crystal alignment rapidly turns to a black display, that is, a voltage applied to the second touch sensing wiring, may be referred to as "reset voltage" or "reset signal". The second touch sensing wiring (conductive wiring) to which the reset voltage is applied, may be referred to as "reset wiring". An electric field produced by applying the reset voltage may be referred to as "reset electric field". Further, driving of the liquid crystal molecules causing the initial alignment in the liquid crystal molecules by occurrence of the above electric field may be referred to as "reset driving".

Further, the reset voltage is referred to as a voltage, applied to the second touch sensing wiring in order to shorten the fall time (hereinafter referred to as $\tau_{OFF}$) of the liquid crystal molecules. To reset the liquid crystal molecules refers to returning to the alignment state of the liquid crystal molecules to be an alignment state (initial alignment) of a black display state.

In the liquid crystal display device according to the first aspect of the present invention, the pixel openings may be divided by the first gate wiring, the second gate wiring, the first source wiring, and the second source wiring, in plan view.

In the liquid crystal display device according to the first aspect of the present invention, long sides of the pixel openings may extend along the first source wiring and the second source wiring.

In the liquid crystal display device according to the first aspect of the present invention, one of either the first touch sensing wiring or the second touch sensing wiring may be provided so as to overlap the first gate wiring and the second gate wiring in plan view; and the other one of either the first touch sensing wiring or the second touch sensing wiring may be provided so as to overlap the first gate wiring and the second gate wiring, in plan view.

In the liquid crystal display device according to the first aspect of the present invention, the display device substrate may have a display surface; a distance from the display surface to the second touch sensing wiring is larger than a distance from the display surface to the first touch sensing wiring, in cross-sectional view; and the second touch sensing wiring may be provided corresponding to any of a location on the first insulation layer, a location on the second insulation layer, and a location under the second insulation layer.

In the liquid crystal display device according to the first aspect of the present invention, the first gate wiring and the second gate wiring may be arranged to be located between two mutually adjacent pixel openings in the plurality of pixel openings, and may be in parallel from each other.

In the liquid crystal display device according to the first aspect of the present invention, the device may include a backlight unit provided on a back surface or a side surface of the array substrate; and emission of the backlight unit may be stopped when the voltage is applied to the second touch sensing wiring.

In the liquid crystal display device according to first aspect of the present invention, the liquid crystal layer may be driven by a fringe electric field produced between the pixel electrode and the common electrode.

In the liquid crystal display device according to the first aspect of the present invention, the display device substrate may include a transparent electrode; and the liquid crystal layer may be driven by a fringe electric field produced between the pixel electrode and the common electrode, and driven by an electric field in the thickness direction of the liquid crystal layer produced between the pixel electrode and the transparent electrode.

The transparent electrode may be provided above the transparent substrate of the display device substrate and provided on the transparent resin layer to cover the first touch sensing wiring. In other words, the transparent electrode may be provided on any one of the transparent resin layers disposed between the display device substrate and the liquid crystal layer.

Also, since the liquid crystal layer may be driven by an electric field produced between the pixel electrode and the transparent electrode, in the liquid crystal layer, liquid crystal molecules having negative dielectric anisotropy and a vertical alignment as the initial alignment are used. In other words, a liquid crystal display device using a vertical electric field is accomplished. The vertical electric field method refers to a method of driving a liquid crystal layer by applying the liquid crystal drive voltage to the liquid crystal layer arranged between the transparent electrode included in the display device substrate and the pixel electrode included in the array substrate.

In the liquid crystal display device according to the first aspect of the present invention, in plan view, the common electrode includes an overlapped portion overlapping the pixel electrode, and a protrusion protruding from an end portion of the pixel electrode.

According to this configuration, an electrode structure is accomplished in order to shorten the rise time of the liquid crystal molecules (hereinafter referred to as $\tau_{ON}$). Specifically, a liquid crystal drive voltage applied between the protrusion of the common electrode and the pixel electrode is utilized as a fringe electric field so that $\tau_{ON}$ can be shortened.

In the liquid crystal display device according to the first aspect of the present invention, the control unit may apply the voltage to the second touch sensing wiring, when the liquid crystal drive voltage is not being applied to the pixel electrode, after applying the liquid crystal drive voltage to the pixel electrode.

In the liquid crystal display device according to the first aspect of the present invention, the voltage (reset voltage) applied to the second touch wiring may include a positive voltage and a negative voltage; and the voltage may be inverted to positive or negative at every period of an image display.

In the liquid crystal display device according to the first aspect of the present invention, each of the first touch sensing wiring and the second touch sensing wiring may include a metal layer.

In the liquid crystal display device according to the first aspect of the present invention, the display device substrate may include a first transparent substrate; and the first touch sensing wiring may include a black layer formed above the first transparent substrate, and a two layer structure in which the metal layer is laminated on the black layer.

In the liquid crystal display device according to the first aspect of the present invention, the array substrate may include a second transparent substrate; and the second touch sensing wiring may include a black layer formed above the second transparent substrate, and a two layer structure in which the metal layer is laminated on the black layer.

In the liquid crystal display device according to the first aspect of the present invention, the metal layer may be a copper containing layer; and the metal layer may be configured such that the copper containing layer is disposed between conductive metal oxide layers.

In this respect, the copper containing layer includes a copper layer or a copper alloy layer.

In the liquid crystal display device according to the first aspect of the present invention, each of the conductive metal oxide layers may be composed of a composite oxide containing zinc oxide, indium oxide, and tin oxide.

In the liquid crystal display device according to the first aspect of the present invention, the first and second active elements may be thin film transistors each having a channel layer composed of a semiconductor; and a part of the metal layer of the second touch sensing wiring may form a light shielding layer that covers the channel layer, in plan view.

In the liquid crystal display device according to the first aspect of the present invention, the channel layer may be composed of an oxide semiconductor. The oxide semiconductor applied to the channel layer may be formed of a composite metal oxide containing two or more types of elements selected from a group consisting of zinc, indium, tin, tungsten, magnesium, gallium, and germanium.

The structure of the channel layer formed of the oxide semiconductor may be any of single crystal, poly crystal, microcrystal, mixed crystal containing crystal and amorphous and amorphous. The thickness of the oxide semiconductor may be within a range from 5 nm to 50 nm.

In the liquid crystal display device according to the first aspect of the present invention, at least any one of a red filter, a green filter and a blue filter may be provided at a position corresponding to the pixel openings on the display device substrate.

In the liquid crystal display device according to the first aspect of the present invention, a black matrix layer may be provided on the display device substrate, the black matrix layer dividing the pixel openings.

The liquid crystal display device according to the second aspect of the present invention includes:

a display device substrate including a first touch sensing wiring;

an array substrate including: a plurality of pixel openings each having a polygonal shape, a pixel electrode provided for each of the plurality of pixel openings, first and second active elements electrically connected to the pixel opening, a first gate wiring that electrically associates with the first active element, a second gate wiring that electrically associates with the second active element, a first source wiring that electrically associates with the first active element, orthogonally intersecting the first gate wiring in plan view, a second source wiring that electrically associates with the second active element, orthogonally intersecting the second gate wiring in plan view, a first insulation layer formed under the pixel electrode, a second insulation layer formed under the first insulation layer, a common electrode formed between the first insulation layer and the second insulation layer, and a second touch sensing wiring orthogonally intersecting the first touch sensing wiring in plan view;

a liquid crystal layer disposed between the display device substrate and the array substrate; and a control unit configured to supply a positive first image signal to the first source wiring, supply a negative second image signal to the second source wiring, apply a liquid crystal drive voltage between the pixel electrode and the common electrode being synchronized to the first image signal and the second image signal supplied to the first source wiring and the second source wiring respectively, thereby driving the liquid crystal layer, and performing touch sensing driving using the first touch sensing wiring and the second touch sensing wiring, during at least one of either the stable period of an image display or the stable period of a black display after the image display.

In the liquid crystal display device according to the second aspect of the present invention, the control unit may be configured to apply a touch sensing drive voltage to either one of the first touch sensing wiring and the second touch sensing wiring, and detect a touch sensing signal via the other one of the first touch sensing wiring and the second touch sensing wiring, when performing the touch sensing driving.

In the liquid crystal display device according to the second aspect of the present invention, the touch sensing drive voltage may be applied to the second touch sensing wiring, and the first touch sensing wiring may detect the touch sensing signal.

In this case, the second touch sensing wiring serves as a touch drive wiring (touch drive electrode, touch sensing drive wiring) and the first touch sensing wiring serves as a touch detection wiring (touch detection electrode, touch sensing detection wiring).

The first touch sensing wiring may serve as the touch drive wiring. In this case, the second touch sensing wiring may serve as the touch detection wiring.

Thus, the second touch sensing wiring is not only configured to be applied with the reset voltage, but can serve as the touch sensing drive wiring or the touch sensing detection wiring.

When the reset voltage is applied to the second touch sensing wiring and the touch sensing drive voltage is applied to the second touch sensing wiring, a drive operation of the touch sensing and a reset driving of the liquid crystal molecules can be performed in a time sharing manner, during the image display period.

Also, when the reset voltage is applied to the second touch sensing wiring, and the second touch sensing wiring detects the touch sensing signal, a detection of the touch sensing and a reset driving of the liquid crystal molecules can be performed in a time sharing manner, during the image display period.

The above-described touch sensing function is an electrostatic capacitance method that detects a change in electrostatic capacitance between the first touch sensing wiring and the second touch sensing wiring. A function of the touch sensing drive wiring to which the drive voltage is applied and a function of the touch sensing detection wiring used for detecting the signal can be exchanged with each other.

It should be noted that all of the plurality of touch sensing wirings are not necessarily used. For example, a wiring group may be configured of a plurality of touch sensing wirings. In this case, a plurality of wiring groups are provided for the liquid crystal display device. In a wiring group, potentials corresponding to some wirings among the entire wirings, of which the number of wirings is less than the entire number of wirings may be set to be floating potentials, and the rest of the wirings may be used for touch sensing (thinning-out driving).

In the liquid crystal display device according to the second aspect of the present invention, the device may include a backlight unit provided on a back surface or a side surface of the array substrate, and the black display stable period may be a period where emission of the backlight unit is stopped.

In this case, during the display unit period (described later), after performing the image display such as a white display, the backlight unit constituted by LED or the like turns OFF (emission is OFF).

In the liquid crystal display device according to the second aspect of the present invention, at least any one of a red filter, a green filter and a blue filter may be provided at a position corresponding to the pixel openings on the display substrate.

In the liquid crystal display device substrate according to the second aspect of the present invention, a black matrix layer may be provided on the display device substrate, the black matrix layer dividing the pixel openings.

The liquid crystal display device according to aspects of the present invention is able to rapidly turn to the alignment state of the liquid crystals to be a black display state (dark state) so that a response time of the liquid crystals can be shortened. Further, in the liquid crystal display device according to the aspects of the present invention, noise can be prevented from occurring because of the source wiring through which the image signal is transmitted. Hence, high sensitivity touch sensing can be provided.

According to the aspects of the liquid crystal display device, as the first touch sensing wiring and the second touch sensing wiring, a metal layer containing an alloy of copper or aluminum having good conductivity can be used so that the time constant when using the metal layer can be small and the S/N ratio of the touch sensing function can be improved.

Further, in the liquid crystal display device according to the aspects of the present invention, each of the plurality of source wirings is fixed to either a negative potential (image signal having negative polarity) or a positive potential (image signal having positive polarity) so that the electric potential which is either positive or negative is not inverted. Accordingly, distortion of the image signal can be avoided, when the polarity of potential of an image signal supplied to the source wiring is inverted. Therefore, the liquid crystal display device according to the present invention can accomplish not only touch sensing but also improve the display image quality.

As a semiconductor used for the channel layer of the active elements, oxide semiconductor such as IGZO is used so that writing to the pixel electrode (writing of the image signal) can be achieved with a speed several tens of times faster than that of the amorphous silicon semiconductor. Accordingly, the quality of the display image can be further improved. In the active elements using an oxide semiconductor such as IGZO, since the leakage current is a few orders of magnitude lower than that of polysilicon semiconductor, the voltage can be favorably retained after a writing operation to the pixel electrode. Accordingly, there is no need for a repeated writing operation of the image in order to retain the image quality for a specified period, which is necessary for the active elements using polysilicon semiconductors. Therefore, the oxide semiconductor such as IGZO is used for the channel layers of the active elements, whereby occurrence of noise accompanied by the image signal repeatedly supplied to the pixel electrode can be further reduced.

In the liquid crystal display device according to the aspects of the present invention, the second touch sensing wiring is formed on the array substrate. According to this configuration, by using a metal layer that constitutes the second touch sensing wiring, a light shielding layer that is electrically isolated from the second touch sensing wiring can be formed so that a light shielding pattern of the light shielding layer can be overlapped above the channel layer of the active element such as TFT (thin film transistor). Forming such a light shielding layer, stray light such as re-reflected light can be prevented from entering the channel layer, thereby contributing to improvement of the image quality.

REFERENCE SIGNS LIST

1: Transparent resin layer
2: Transparent electrode
3: First touch sensing wiring
4: Second conductive metal oxide layer
5: Copper alloy layer
6: First conductive metal oxide layer
7: Second touch sensing wiring
8: Black layer (first black layer)
9: Second gate wiring
10: First gate wiring
11: First insulation layer
12: Second insulation layer
13: Third insulation layer
14: First source wiring (source wiring in even column)
15: Second source wiring (source wiring in odd column)
16: Slit
17: Pixel electrode
17a, 17b: Electrode (pixel electrode)
18: Pixel opening
19: Black layer (second black layer)
20, 30: Common electrode
21: First transparent substrate (transparent substrate)
22: Second transparent substrate (transparent substrate)
23: Light shielding layer (light shielding pattern)
24: Source electrode
25: Gate electrode
26: Drain electrode
27: Channel layer
28, 28a: First active element
28, 28b: Second active element
29: Contact hole
30: Common electrode
31, 32: Line of electric force
33: Terminal portion
36: Common wiring
38, 39: Liquid crystal molecules
100: Display device substrate (counter substrate)
138, 139: Liquid crystal molecules
200: Array substrate
300: Liquid crystal layer
R: Alignment direction (direction in alignment process, alignment direction in initial alignment state)
θ: Angle (incline with respect to longitudinal direction Y of pixel opening)

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display device, comprising:
a display device substrate including a first touch sensing wiring;
an array substrate including an insulation layer structure including a first insulation layer and a second insulation layer foil led on one another, a pixel electrode positioned in each of pixel openings formed in the insulation layer structure and having a polygonal shape, a common electrode formed between the first and second insulation layers, a wiring structure including a first gate wiring, a second gate wiring, a first source wiring and a second source wiring such that the first gate and source wirings orthogonally intersect with one another and the second gate and source wirings orthogonally intersect with one another in a plan view, and a second touch sensing wiring orthogonally intersecting the first touch sensing wiring in the plan view, the second touch sensing wiring being formed on the first insulation layer, between the first and second insulation layers, or on the second insulation layer away from the first insulation layer;
a liquid crystal layer formed between the display device substrate and the array substrate; and
a controller configured to supply a positive first image signal to the first source wiring, supply a negative second image signal to the second source wiring, apply a liquid crystal drive voltage between the pixel electrode and the common electrode being synchronized to the first image signal and the second image signal supplied to the first source wiring and the second source wiring respectively, thereby driving the liquid crystal layer, performing an image display, and applying a voltage to the second touch sensing wiring after performing the image display.

2. The liquid crystal display device of claim 1, wherein the first and second gate wirings and the first and second source wirings define the pixel openings in the plan view.

3. The liquid crystal display device of claim 1, wherein the first and second source wirings are formed such that longitudinal sides of the pixel openings extend along the first and second source wirings.

4. The liquid crystal display device of claim 1, wherein one of the first and second touch sensing wirings overlaps with the first and second gate wirings in the plan view, and the other of the first and second touch sensing wirings overlaps with the first and second source wirings in the plan view.

5. The liquid crystal display device of claim 1, wherein the second touch sensing wiring is formed on the first insulation layer, between the first and second insulation layers, or on the second insulation layer away from the first insulation layer, such that the second touch sensing wiring is positioned at a greater distance from a display surface of the display device substrate than a distance of the first touch sensing wiring from the display surface, in a cross-sectional view.

6. The liquid crystal display device of claim 1, wherein the first and second gate wirings are parallel to each other and located between two adjacent ones of the pixel openings.

7. The liquid crystal display device of claim 1, further comprising:
a backlight unit formed on a back surface or a side surface of the array substrate and configured such that emission of the backlight unit is stopped when the voltage is applied to the second touch sensing wiring.

8. The liquid crystal display device of claim 1, wherein the controller is configured to drive the liquid crystal layer by a fringe electric field produced between the pixel electrode and the common electrode.

9. The liquid crystal display device of claim 8, wherein the display device substrate includes a transparent electrode, and the liquid crystal layer is driven by the fringe electric field and an electric field in a thickness direction of the liquid crystal layer produced between the pixel electrode and the transparent electrode.

10. The liquid crystal display device of claim 1, wherein the common electrode includes a portion overlapping with the pixel electrode, and a protrusion protruding from an end portion of the pixel electrode.

11. The liquid crystal display device of claim 1, wherein the controller is configured to apply the voltage to the second touch sensing wiring after the liquid crystal drive voltage is applied to the pixel electrode and when the liquid crystal drive voltage is not applied to the pixel electrode.

12. A liquid crystal display device, comprising:
a display device substrate including a first touch sensing wiring;
an array substrate including an insulation layer structure including a first insulation layer and a second insulation layer formed on one another, a pixel electrode positioned in each of pixel openings formed in the insulation layer structure and having a polygonal shape, a common electrode formed between the first and second insulation layers, a wiring structure including a first gate wiring, a second gate wiring, a first source wiring and a second source wiring such that the first gate and source wirings orthogonally intersect with one another and the second gate and source wirings orthogonally intersect with one another in a plan view, and a second touch sensing wiring orthogonally intersecting the first touch sensing wiring in the plan view;
a liquid crystal layer formed between the display device substrate and the array substrate; and
a controller configured to supply a positive first image signal to the first source wiring, supply a negative second image signal to the second source wiring, apply a liquid crystal drive voltage between the pixel electrode and the common electrode being synchronized to the first image signal and the second image signal supplied to the first source wiring and the second source wiring respectively, thereby driving the liquid crystal layer, performing an image display, and applying a voltage to the second touch sensing wiring after performing the image display,
wherein the controller is configured such that the voltage applied to the second touch wiring includes a positive voltage and a negative voltage, and that the voltage is inverted to positive or negative for each fixed period of an image display.

13. The liquid crystal display device of claim 1, wherein each of the first and second touch sensing wirings includes a metal layer.

14. The liquid crystal display device of claim 13, wherein the display device substrate includes a first transparent substrate, and the first touch sensing wiring has a two layer structure including a black layer foil led over the first transparent substrate, and the metal layer formed on the black layer.

15. The liquid crystal display device of claim 13, wherein the array substrate includes a second transparent substrate, the second touch sensing wiring includes a black layer formed over the second transparent substrate, and a two layer structure in which the metal layer is laminated on the black layer.

16. The liquid crystal display device of claim 13, wherein the metal layer includes a copper containing layer formed between conductive metal oxide layers.

17. The liquid crystal display device of claim 16, wherein each of the conductive metal oxide layers comprises a composite oxide containing zinc oxide, indium oxide, and tin oxide.

18. The liquid crystal display device of claim 13, further comprising:
first and second active elements electrically connected to the pixel electrode,
wherein the first and second active elements are thin film transistors each having a channel layer comprising a semiconductor, and the metal layer of the second touch sensing wiring has a portion forming a light shielding layer that covers the channel layer in a plan view.

19. The liquid crystal display device of claim 18, wherein the channel layer comprises an oxide semiconductor.

20. The liquid crystal display device of claim 1, wherein the display device substrate has at least one of a red filter, a green filter and a blue filter at each of positions corresponding to the pixel openings.

21. The liquid crystal display device of claim 20, further comprising:
a black matrix layer formed on the display device substrate such that the black matrix layer defines the pixel openings.

22. A liquid crystal display device, comprising:
a display device substrate including a first touch sensing wiring;
an array substrate including an insulation layer structure including a first insulation layer and a second insulation layer formed on one another, a pixel electrode positioned in each of pixel openings formed in the insulation layer structure and having a polygonal shape, a common electrode formed between the first and second insulation layers, a wiring structure including a first gate wiring, a second gate wiring, a first source wiring and a second source wiring such that the first gate and source wirings orthogonally intersect with one another and the second gate and source wirings orthogonally intersect with one another in a plan view, and a second touch sensing wiring orthogonally intersecting the first touch sensing wiring in a plan view, the second touch sensing wiring being formed on the first insulation layer, between the first and second insulation layers, or on the second insulation layer away from the first insulation layer;
a liquid crystal layer formed between the display device substrate and the array substrate; and
a controller configured to supply a positive first image signal to the first source wiring, supply a negative second image signal to the second source wiring, apply a liquid crystal drive voltage between the pixel electrode and the common electrode being synchronized to the first image signal and the second image signal supplied to the first source wiring and the second source wiring respectively, thereby driving the liquid crystal layer, and performing a touch sensing driving by the first touch sensing wiring and the second touch sensing wiring, during at least one of a stable period of an image display and a stable period of a black display after displaying an image.

23. The liquid crystal display device of claim 22, wherein the controller is configured to apply a touch sensing drive voltage to one of the first and second touch sensing wirings, and detect a touch sensing signal via the other of the first and second touch sensing wirings, when performing the touch sensing driving.

24. The liquid crystal display device according to claim 23, wherein the touch sensing drive voltage is applied to the second touch sensing wiring, and the first touch sensing wiring detects the touch sensing signal.

25. The liquid crystal display device according to claim 22, further comprising:
a backlight unit formed on a back surface or a side surface of the array substrate,
wherein emission of the backlight unit is stopped in the black display stable period.

26. The liquid crystal display device according to claim 22, wherein the display device substrate has at least one of a red filter, a green filter and a blue filter at each of positions corresponding to the pixel openings.

27. The liquid crystal display device according to claim 26, further comprising:
a black matrix layer formed on the display device substrate such that the black matrix layer defines the pixel openings.

* * * * *